United States Patent [19]
Aiba

[11] Patent Number: 6,088,704
[45] Date of Patent: Jul. 11, 2000

[54] PARALLEL MANAGEMENT SYSTEM FOR A FILE DATA STORAGE STRUCTURE

[75] Inventor: Yuichi Aiba, Tokyo, Japan

[73] Assignee: NEC Corporation, Tokyo, Japan

[21] Appl. No.: 08/954,309

[22] Filed: Oct. 20, 1997

[30] Foreign Application Priority Data

Oct. 18, 1996 [JP] Japan .................................. 8-297338

[51] Int. Cl.[7] .................................................. G06F 17/30
[52] U.S. Cl. .................................. 707/200; 707/8; 707/10
[58] Field of Search ............................. 707/8, 10, 200;
395/671, 675, 800.01, 500.01

[56] References Cited

U.S. PATENT DOCUMENTS

| | | | |
|---|---|---|---|
| 5,361,363 | 11/1994 | Wells et al. ........................ | 395/800.22 |
| 5,404,520 | 4/1995 | Sonobe ..................................... | 395/671 |
| 5,463,772 | 10/1995 | Thompson et al. ..................... | 707/101 |
| 5,737,549 | 4/1998 | Hersch et al. ........................... | 345/309 |
| 5,742,812 | 4/1998 | Baylor et al. ............................ | 707/8 |
| 5,745,915 | 4/1998 | Cooper et al. .......................... | 711/114 |

FOREIGN PATENT DOCUMENTS 3-259320  11/1991  Japan .
6-332625  12/1994  Japan .

*Primary Examiner*—Hosain T. Alam
*Assistant Examiner*—Frantz Coby
*Attorney, Agent, or Firm*—Foley & Lardner

[57] ABSTRACT

A data is distributed and recorded across in each of a plurality of secondary storage devices. The data constitutes a file data storage structure. A plurality of control units are provided in one or more of the secondary storage devices. Each control unit generates control data by structuring the distributed data of the file data storage structure recorded on the corresponding secondary storage device. Each control unit records the generated control data on the corresponding secondary storage device.

6 Claims, 37 Drawing Sheets

PARALLEL MANAGEMENT SYSTEM FOR A FILE DATA STORAGE STRUCTURE

BACKGROUND OF THE INVENTION

The present invention relates to a parallel management system (data structure construction, use start/end, state display, data structure check, and data structure recovery) for a file data storage structure in managing data in a computer system, and, more particularly, a parallel management system for a file data storage structure in which an improvement of the speed of operations on a file data storage structure with a large capacity composed of a plurality of secondary storage devices is made by parallel processing.

An operating system (OS) typically used for a current computer system is arranged to divided a storage area in one secondary storage device into a plurality of logical storage areas each of which acts as an independent storage area into or from which data can be written or read. Each such logical storage area is called a file. The secondary storage area can be flexibly managed by increasing or decreasing the capacity of each file as long as the total capacity of all files on one secondary storage device does not exceed the storage capacity of the secondary storage device. To make possible such flexible management of the secondary storage area, a file management of an ordinary OS constructs on one secondary storage device a data storage structure (typically called a "file system") for managing files. Since the data storage structure is constructed on one secondary storage device, the capacity of each file cannot exceed the capacity of this secondary storage device, and performance accessing a file cannot exceed the performance one secondary storage device has.

A striping area assignment scheme disclosed in Japanese Patent Application Laid-Open No. 3-259320, or a file data multiplex method and a data processing system disclosed in Japanese Patent Application Laid-Open No. 6-332625 assigns the storage area for a file to a plurality of secondary storage devices, and causes one processor to manage a data structure.

Referring to FIG. 37, in such system, a plurality of secondary storage devices can be viewed as one secondary storage device, so that an application reading and/or writing data can be handled as though only one storage device is enhanced for its capacity. In addition, increasing the number of secondary storage device allows it to easily increase the capacity of file data storage structures, and to dramatically increase the capacity of secondary storage device. However, since the capacity of secondary storage device subject to the file data storage structure also becomes huge, processing time is dramatically increased for the management operation. For example, when it is intended to construct a data structure for a file data storage structure, it is necessary to prepare control data for a data structure to the capacity of secondary storage device, and to write the prepared control data on the secondary storage device. Since, if the capacity is increased for the secondary storage device, amount of control data to be prepared is also increased accordingly, amount of processing in constructing the data structure increases in proportional to the capacity of secondary storage device. Since the conventional system constructs a data structure with one processor, it requires a very long processing time when it constructs a data structure on a huge secondary storage device. Similarly, a very long time is necessary for checking a data structure of the file data storage structure and processing recovery of a data structure in proportional to increase of the capacity of secondary storage device. Thus, there have existed problems in the prior art such that, as the capacity is being increased for a file data storage structure, amount of processing and I/O increases in construction, checking, or recovery of a data structure for the file data storage structure in proportional to the capacity of file data storage structure, thereby the processing time being lengthened.

SUMMARY OF THE INVENTION

In view of such problems in the prior art, an object of the present invention is to shorten processing time necessary for construction, checking, or recovery of a data structure for a file data storage structure by performing parallel processing using a plurality of secondary storage devices and a plurality of processors in parallel.

Another object of the present invention is to provide a technique wherein control data for a file data storage structure is distributed among a plurality of secondary storage devices and a plurality of processors, and the control data for respective file data storage structures is unnatural managed by using a plurality of processors.

According to an aspect of the present invention, there is provided a parallel management system for a file data storage structure which comprises a plurality of secondary storage devices recording respective distributed data and a plurality of control means each of which is connected to at least one corresponding one of said secondary storage devices, for generating control data by structuring the distributed data stored in at least one corresponding one of the secondary storage device, and for storing the control data into at least one corresponding one of the secondary storage device.

BRIEF DESCRIPTION OF THE DRAWINGS

Other structures and advantages of the invention will be made more apparent by the detailed description hereunder taken in conjunction with the accompanying drawings, wherein.

In the drawings, the same reference numerals represent the same structural elements.

DETAILED DESCRIPTION OF THE PREFERRED EMBODIMENTS

Figure 1:
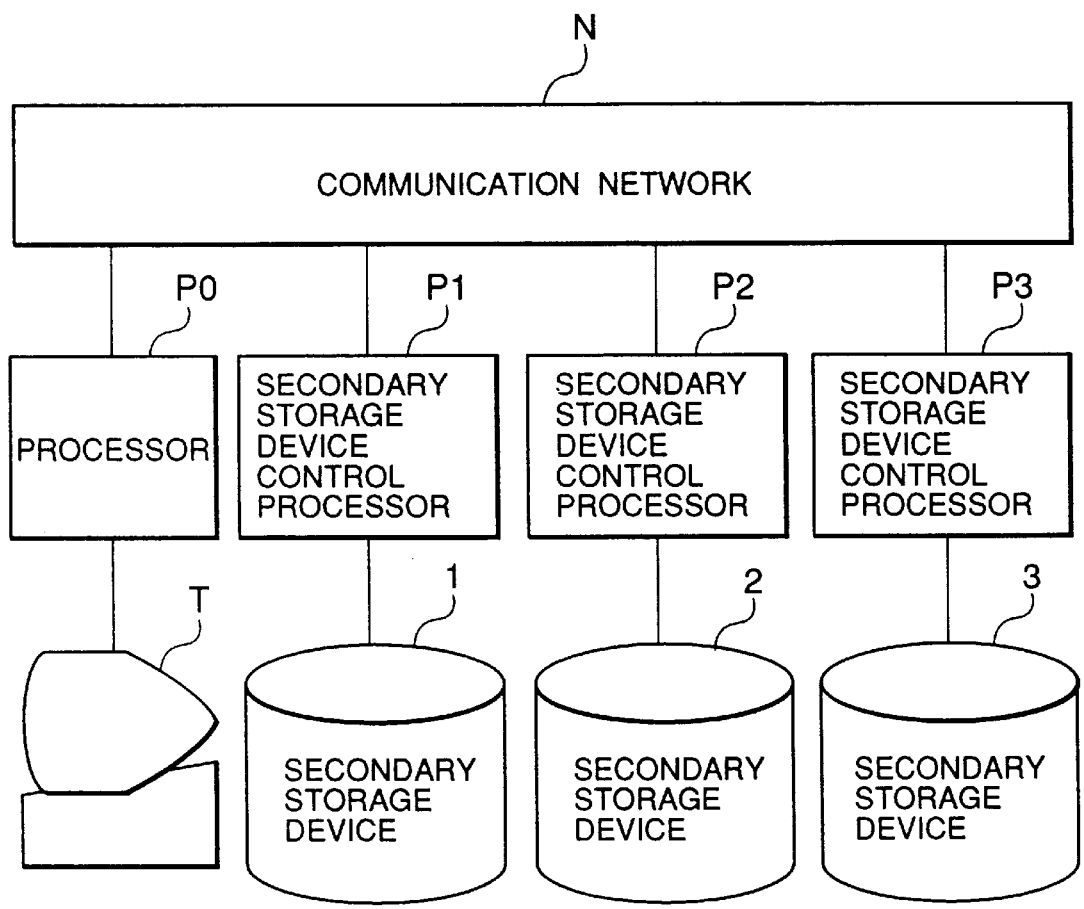
FIG. 1 is a block diagram showing an example of multiprocessor computer system to which the present invention is applied.

Now, the present invention will be explained in detail by referring to the drawings.

Referring to FIG. 1, a multiprocessor computer system comprises a plurality of secondary storage devices 1, 2 and 3 for recording file data and file control data, a plurality of secondary storage device management processors P1, P2 and P3 accessible to the secondary storage devices 1, 2 and 3, a processor P0 connected to a terminal T having an input device and a display device, and a communication network N allowing communication between any of the processors. Although, in the example of FIG. 1, one secondary storage device is connected to one secondary storage device management processor, it may be possible to connect two or more secondary storage devices to one secondary storage device management processor.

Figure 2:
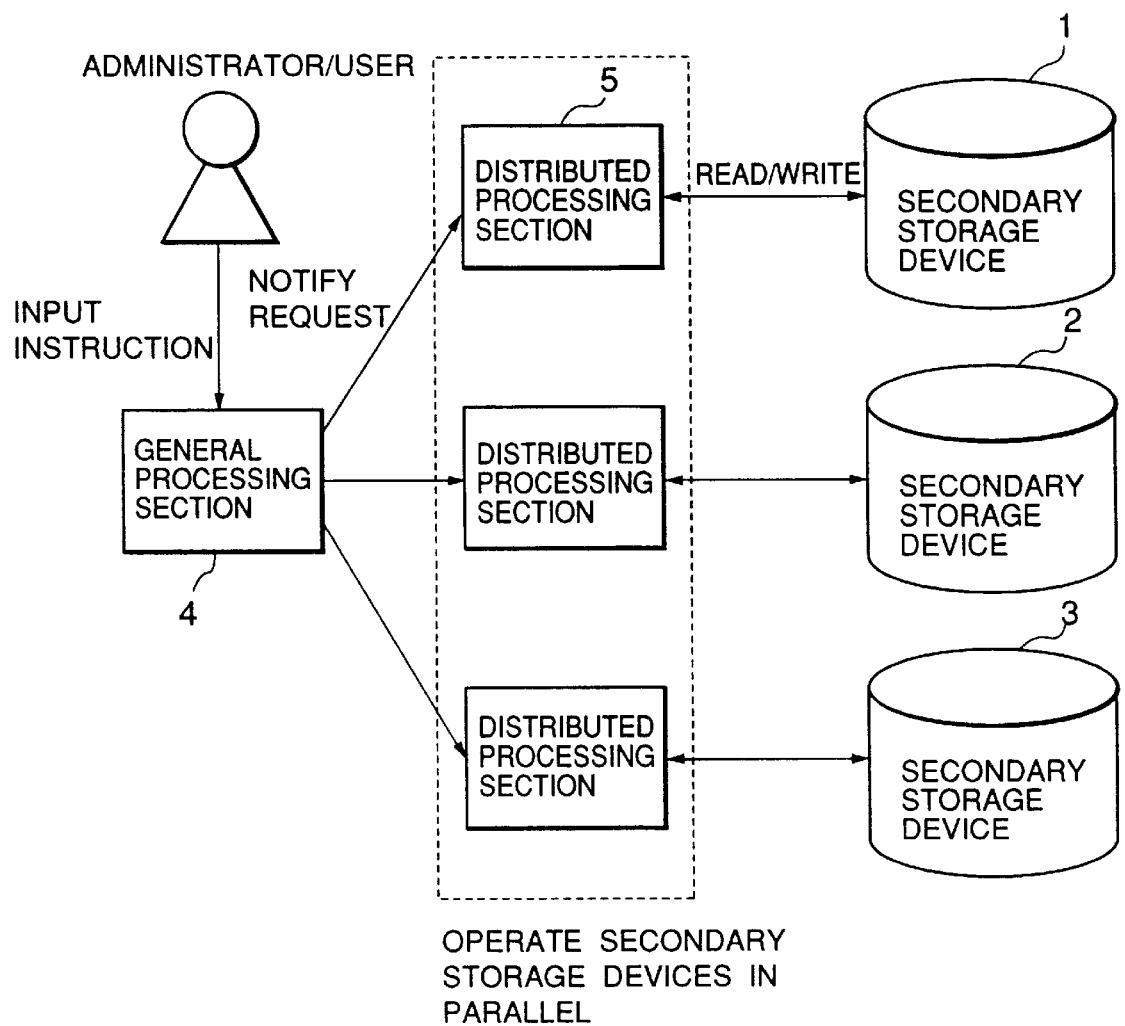
FIG. 2 is a block diagram schematically showing the arrangement of the present invention.

Referring to FIG. 2, in this embodiment, a general processing section 4 runs on one processor PO in the multiprocessor computer system, while distributed processing sections 5 operate on respective secondary storage device management processor P1, P2 and P3. The general processing section 4 receives an instruction entered by an administrator or user of the computer system, and issues a suitable request to respective distributed processing sections 5 according to content of the instruction. When each distributed processing section 5 receives the request, it executes requested processing on the secondary storage device 1, 2 or 3 that the distributed processing section 5 should manage. The general processing section 4 may be started as a process when the administrator or user of the computer system enters an instruction, or may be implemented as a resident process such as demon in UNIX is that is continuously running on the background. In the latter case, it is necessary to have a network for passing an entered instruction to the resident process that implements the general processing section 4. The distributed processing section 5 may be started as a process when the general processing section 4 notifies a request, or implemented as a resident process. In the latter case, it is necessary to provide a communication network for transmitting a request or result of processing between the general processing section 4 and the distributed processing sections 5. Respective means featuring the present invention are distributed and implemented among the general processing section 4 and the distributed processing sections 5. While, in the above example, the general processing section 4 is provided on the specific processor P0 to which no secondary storage device is attached, it may be provided on any one of the secondary storage device management processors P1, P2, and P3. In this case, such secondary storage device management processor would implement both the general processing section 4 and the distributed processing section 5.

Figure 3:
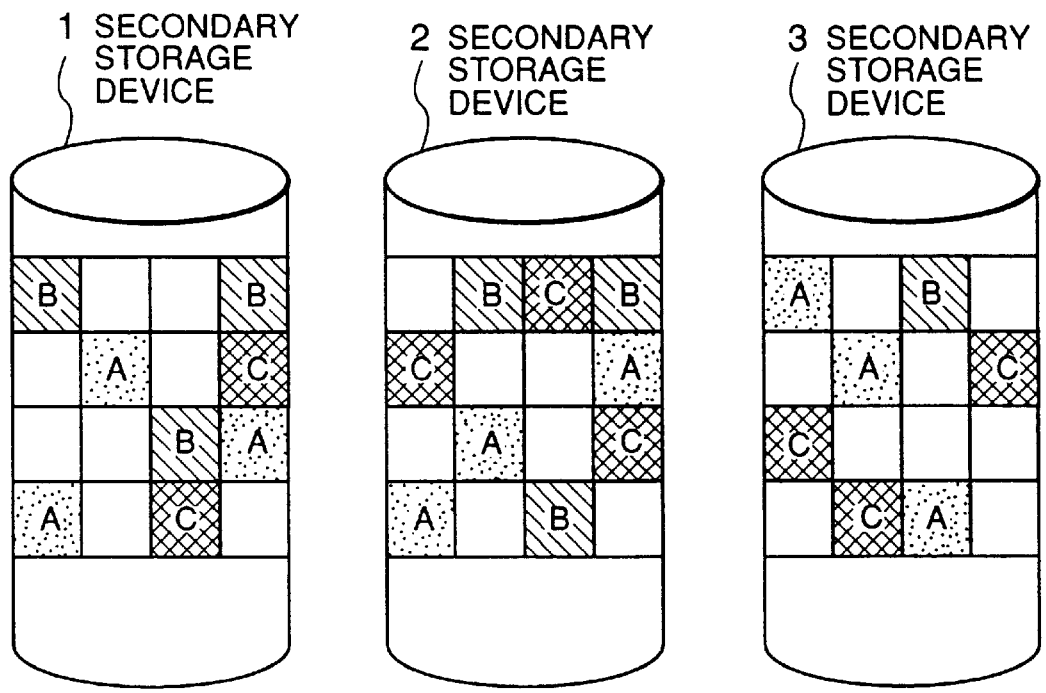
FIG. 3 is diagram schematically showing storage area structures on a secondary storage device.

Referring to FIG. 3, a storage area on the secondary storage device is divided into blocks with a predetermined size. The blocks include blocks for storing control data for managing the data structure of the file data storage structure, and blocks for storing file data. The file data storage blocks are constituted by assigning blocks in the number necessary for each file to respective secondary storage devices 1, 2, and 3, and record file data therein. Accordingly, data in one file would be recorded across a plurality of secondary storage devices 1, 2 and 3. When one secondary storage device is viewed, it would contains partial files.

Figure 4:
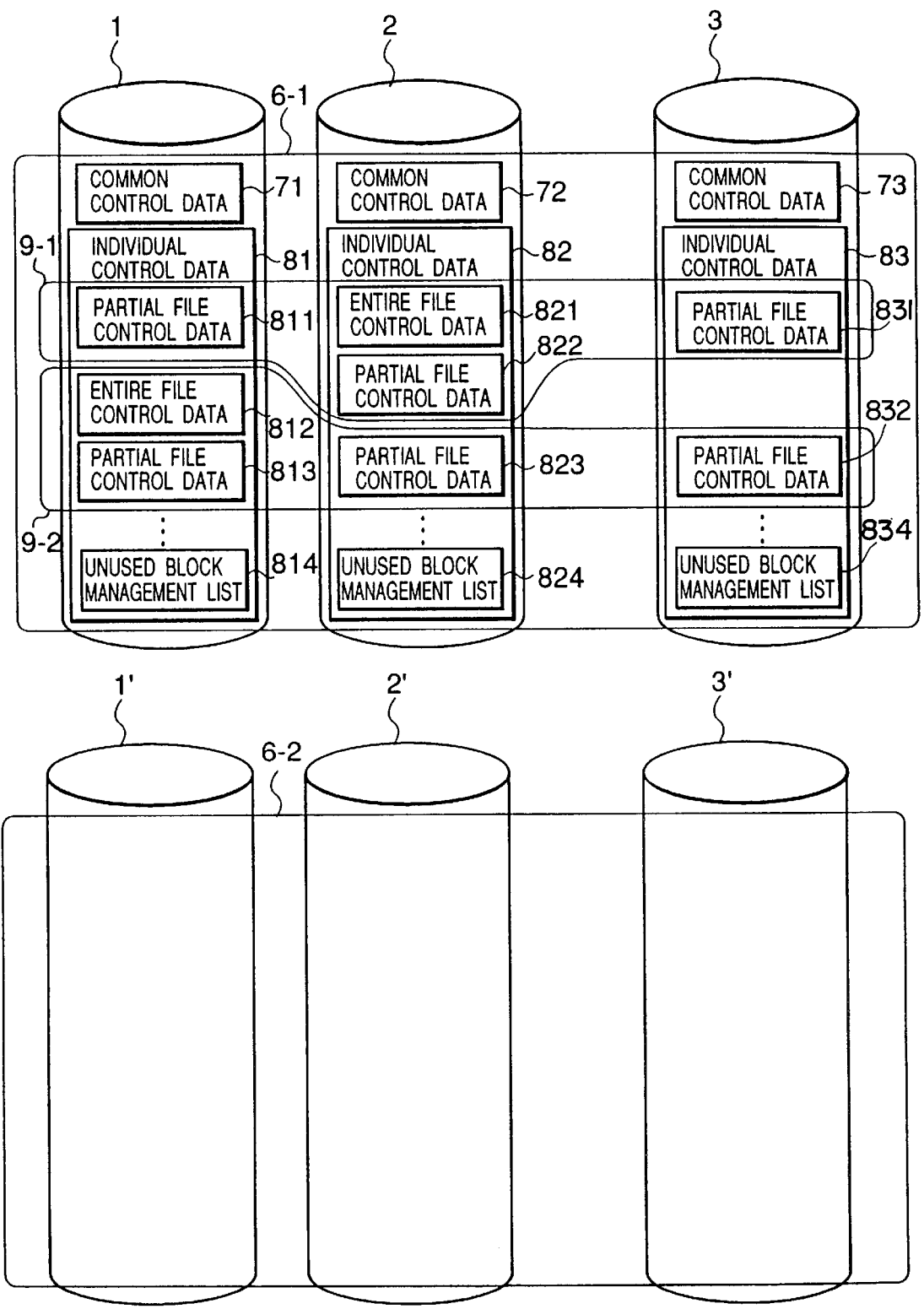
FIG. 4 is an example of configuration of file control data in the present invention.

Referring to FIG. 4, the file data storage structure includes a plurality of file system control data. In this embodiment, for example, it includes file system control data 6-1 for a file system FS1, file system control data 6-2 for a file system FS2, and so on. The file system control data 6-1 for the file system FS1 consists of common control data 71, 72, and 73, and individual control data 81, 82, and 83. The common control data 71, 72, and 73 are control data for the entire file, and include, for example, identification information (name) for the file data storage structure, and the number of secondary storage devices constituting the file data storage structure. The common control data 71, 72, and 73 are recorded on the secondary storage devices 1, 2, and 3, respectively. The individual control data 81, 82, and 83 are control data specific for respective secondary storage devices, and include, for example, partial file control data for each file that manages information on blocks used by that file, and an unused block management list for managing information of blocks not used by any file. The unused block management list is used to assign a new block when file data is stored. The individual control data 81, 82, and 83 are recorded on the corresponding secondary storage devices 1, 2, and 3, respectively. The individual control data 81 includes partial file control data 811 for a file A, entire file control data 812 and partial file control data 813 for a file B, and an unused block management list 814. The individual control data 82 includes entire file control data 821 and partial file control data 822 for the file A, partial file management data 823 for the file B, and an unused block management list 824. The individual control data 83 includes partial file control data 831 for the file A, partial file control data 832 for the file B, and an unused block management list 834.

The file control data consists of the entire file control data and the partial file control data. The file control data is formed across a plurality of individual control data 81, 82, and 83. The entire file control data is sufficient to be recorded in any one of individual control data. The file control data 9-1 for the file A consists of the partial file control data 811, the entire file control data 821, the partial file control data 822, and the partial file control data 831. The file control data 9-2 for the file B consists of the entire file control data 812, the partial file control data 813, the partial file control data 823, and the partial file control data 832.

The present invention achieves parallel processing by processing in parallel production of these control data and recording on the secondary storage devices on the respective secondary storage device processors. In addition, two states, the available state and the unavailable state, are prepared as states to be managed by the respective secondary storage devices. The available state means a state of the file data storage structure where it can write or read data in or from a file. On the other hand, the unavailable state means a state where data cannot be written in or from a file. In the present invention, each state of a plurality of secondary storage devices can be changed from the unavailable state to the available state at once. Moreover, in the present invention, each state of a plurality of secondary storage devices can also be changed from the available state to the unavailable state at once.

Figure 5:
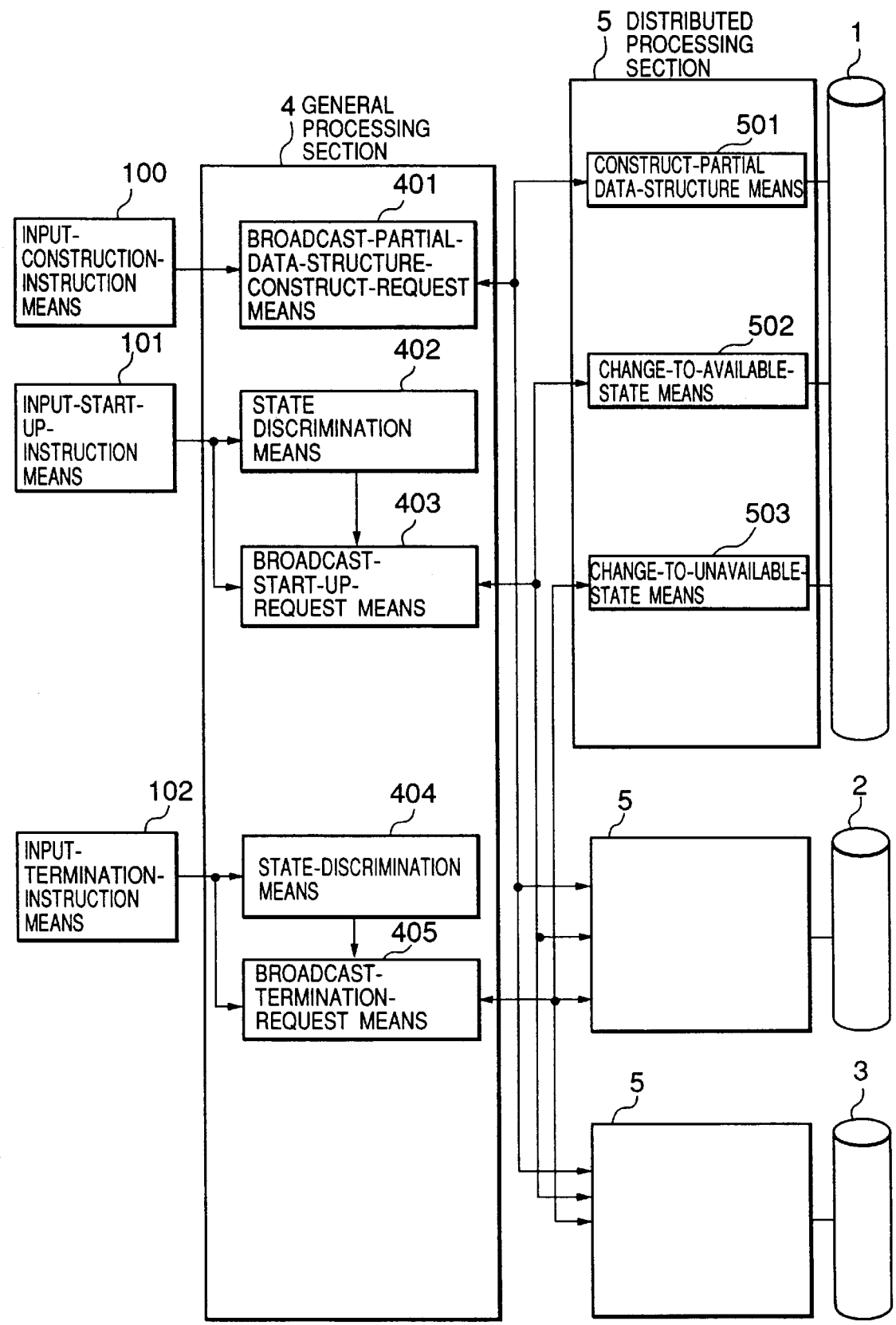
FIG. 5 is a block diagram of a first embodiment of the present invention.

Referring to FIG. 5, the general processing section 4 comprises broadcast-partial-data-structure-construct-request means 401, state discrimination means 402, broadcast-start-up-request means 403, state discrimination means 404, and broadcast-termination-request means 405. Each of distributed processing sections 5 comprises construct-partial-data-structure means 501, change-to-available-state means 502, and change-to-unavailable-state means 503. In addition, as means for providing an instruction to the general processing section 4, there is provided input-construction-instruction means 100, input-start-up-instruction means 101, and input-termination-instruction means 102.

When the administrator of the computer system constructs the file data storage structure, he or she needs necessary to specify on which secondary storage device the data structure is constructed, and to input an instruction for construction into the computer system. In this embodiment, the input-construction-instruction means 100 provides the administrator with an interface for specifying a plurality of secondary storage devices.

When the administrator of the computer system inputs a construction instruction, the instruction causes the system to perform a control data production process for constructing a data structure, and a process for storing the constructed control data into the secondary storage devices. This embodiment reduces the entire processing time by performing the control data production process on a plurality of distributed processing sections 5 in parallel, and writing the constructed control data into a plurality of secondary storage devices in parallel. The construct-partial-data-structure means 501 runs on each distributed processing section 5, and constructs a partial data structure on the secondary storage device when it receives a partial data construct request. The partial data construct request contains information for producing common control data, and first produces and records the common control data. Subsequently, individual control data is produced for each secondary storage device. Since these processes are independent on each construct-partial-data-structure means 501, it is possible to construct the partial data structure on separate distributed processing sections 5 in parallel.

The broadcast-partial-data-structure-construct-request means 401 broadcasts a partial data construct request to all of the construct-partial-data-structure means 501. This causes all the construct-partial-data-structure means 501 to simultaneously start processing. That is, a construction process of the file data storage structure is performed on a plurality of distributed processing sections in parallel, so that the processing time can be further reduced when the number of the distributed processing sections 5 is increased. In addition to provision of one distributed processing section 5 on each secondary storage device, it may be possible to provide one distributed processing section 5 for a plurality of secondary storage device, while it would somewhat degrade operating speed because of less parallelism.

The constructed file data storage structure becomes available to another user of the computer system once the administrator of the computer system changes it to the available state. Change of the file data storage structure to the available state means to perform a process such as mount in UNIX. The embodiment causes the input-start-up-instruction means 101 to provide the administrator of the computer system with an interface for start-up. The administrator of the computer system specify a file data storage structure that he or she starts to use with the input-start-up-instruction means 101.

The state discrimination means 402 determines whether the file data storage structure has become available. If the state discrimination means 402 determines the file data storage structure is available, the process terminates here. Such a case occurs when a start-up instruction is issued again to the file data storage structure that has become available. If the state discrimination means 402 determines the file data storage structure is in the unavailable state, a process that change it to the available state is started.

The change-to-available-state means 502 runs on each distributed processing section 5, and changes the state of the unavailable secondary storage device to the available state. The change-to-available-state means 502 is activated when a start-up request is issued to each distributed processing section 5, and changes the state of corresponding secondary storage device to the available state. Since this process is independent for each change-to-available-state means 502, it can be processed in parallel on separate distributed processing sections 5.

The broadcast-start-up-request means 403 broadcasts the start-up request to all of the change-to-available-state means 502. This causes all change-to-available-state means 502 to simultaneously start the processing, and causes all secondary storage devices to change to the available state, so that they become available as the file data storage structure.

The file data storage structure that becomes available can be prevented from reading/writing by another user of the computer system when the administrator of the computer system changes it to the unavailable state. Change of the file data storage structure to the unavailable state means to perform a process such as unmount in UNIX. This management operation is an operation being performed when the computer system is terminated for use. In this embodiment, the input-termination-instruction means 102 provides the administrator of the computer system with an interface for termination. The administrator of the computer system specifies a file data storage structure to be terminated by the input-termination-instruction means 102.

The state discrimination means 404 determines whether or not the file data storage structure has been in the unavailable state. If the state discrimination means 404 determines the file data storage structure is in the unavailable state, the process terminates here. If the state discrimination means 404 determines the file data storage structure is in the available state, it starts a process for change to the unavailable state.

The change-to-unavailable-state means 503 runs on each distributed processing section 5, and changes the available secondary storage device to the unavailable state. The change-to-unavailable-state means 503 is activated when a termination request is issued to each distributed processing section 5, and causes the state of applicable secondary storage devices to the unavailable state. Since this process is independent for each change-to-unavailable-state means 503, it can be processed in parallel on separate distributed processing sections 5.

The broadcast-termination-request means 405 broadcasts a termination request to all of the change-to-unavailable-state means 503. This causes all the change-to-unavailable-state means 503 to simultaneously start processing, and causes all secondary storage device to change to the unavailable state, so that they become unavailable as the file data storage structure.

Now, the operation of the embodiment will be described.

The administrator of the computer system instructs construction by specifying with the input-construction-instruction means 100 all secondary storage devices constituting the file data storage structure to be constructed. The broadcast-partial-data-structure-construct-request means 401 in the general processing section 4 interprets the instruction, and, at the same time, issues a partial data structure construct request to the construct-partial-data-structure means 501 in all distributed processing sections 5. Each construct-partial-data-structure means 501 receives the partial data structure construct request, and constructs the partial data structure on respective secondary storage devices 1, 2, and 3 specified by the request. This constructs a file data storage structure.

Then, the administrator of the computer system instructs with the input-start-up-instruction means 101 start-up of a file data storage structure that he or she wants to use. The state discrimination means 402 in the general processing section 4 determines whether the file data storage structure instructed for start-up is in the available state or in the unavailable state at that moment. If it is discriminated to be in the unavailable state, the broadcast-start-up-request means 403 in the general processing section 4 broadcasts a start-up request to the change-to-available-state means 502 in each distributed processing section 5. Each change-to-available-state means 502 receives the start-up request, and changes the state of the secondary storage devices 1, 2, and 3 belonging to the file data storage structure specified by the request to the available state. Thus, the file data storage structure becomes available.

Thereafter, the administrator of the computer system instructs termination of the file data storage structure with the input-termination-instruction means 102. The state discrimination means 404 in the general processing means 4 determines whether the file data storage structure instructed for termination is in the available stare or in the unavailable state at that moment. If it is discriminated to be in the available state, the broadcast-termination-request means 405 in the general processing section 4 broadcasts a termination request to the change-to-unavailable-state means 503 in each distributed processing section 5. Each change-to-unavailable-state means 503 receives the termination request, and changes the state of the secondary storage devices belonging to the file data storage structure specified by the request to the unavailable state.

Now, the operation of each component of this embodiment will be described in detail.

Input-construction-instruction Means 100

The input-construction-instruction means 100 is implemented in a form like a command in UNIX, and input from a terminal T in a case of a multiprocessor computer system of FIG. 1. Information specified together with the command includes information common to all secondary storage devices such as a name of file data storage structure, size of block dividing a storage area, and identification information for all secondary storage devices (name or the like).

Broadcast-partial-data-structure-construct-request Means 401

Figure 6:
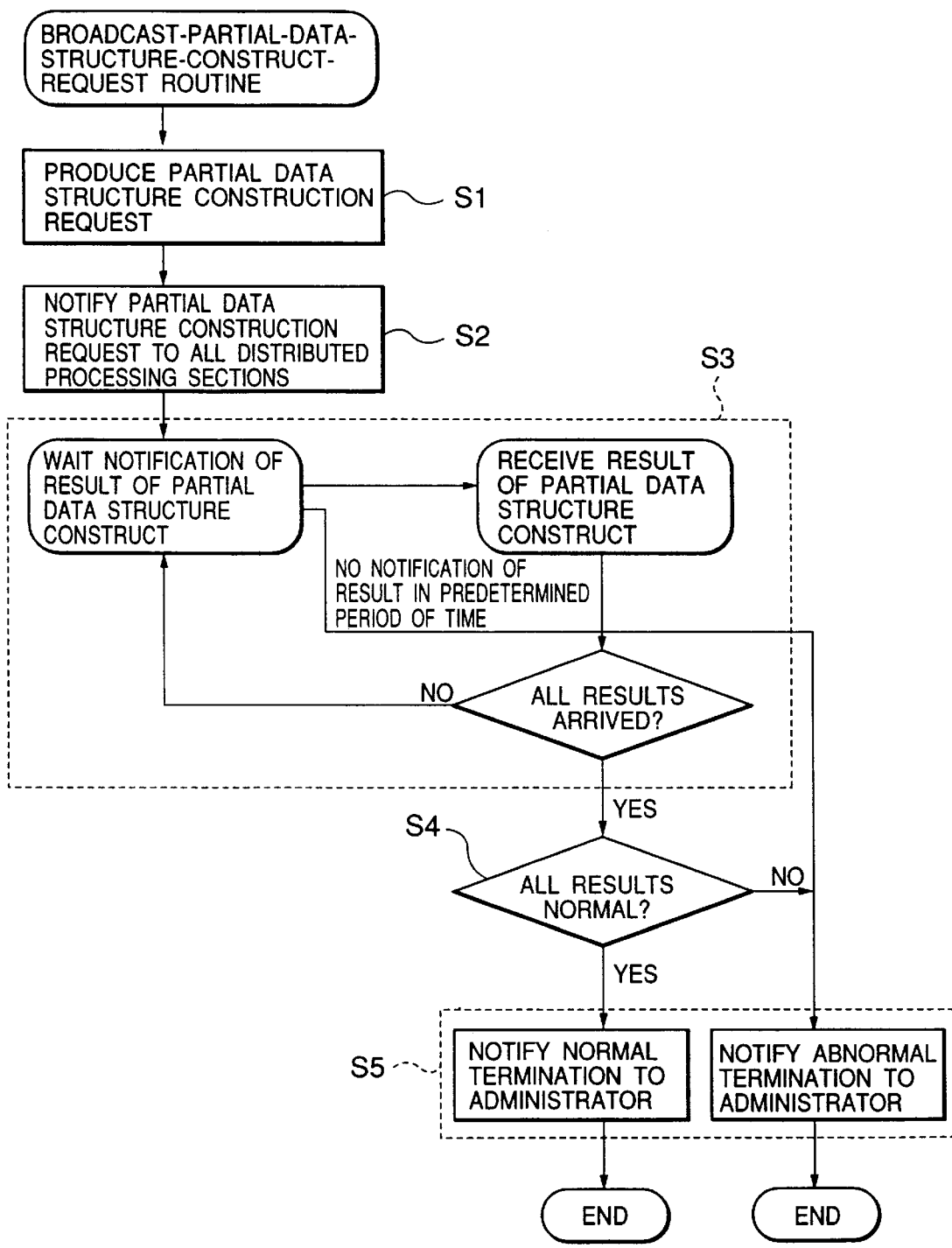
FIG. 6 is a flowchart showing an example of processing in broadcast-partial-data-structure-construct-request means 401.

After input of the command, the above-mentioned information by the input-construction-instruction means 100 is passed to the general processing section 4. Methods for passing information may include, as described above, a method in which the general processing section 4 is previously started as a resident process, and commands are passed in an inter-process communication from the command most recently started, and a method in which an input command is started as a process carrying the general processing section 4. Then, after information is passed from a command implementing the input-construction-instruction means 100, the broadcast-partial-data-structure-construct-request means 401 is activated in the general processing section 4. The broadcast-partial-data-structure-construct-request means 401 is implemented as a broadcast-partial-data-structure-construct-request routine for performing the processes, for example, as shown in FIG. 6. This routine performs the following processes:

Step S1: It interprets construction instruction information passed from the input-construction-instruction means 100, and produces a construct-partial-data-structure request. This request contains not only information for producing common control data, but also identification information for a secondary storage device.

Step S2: It notifies the produced construct-partial-data-structure request to all distributed processing sections 5 running on a secondary storage managing processor.

Step S3: It waits for all results of construct-partial-data-structure instruction notified. If all notifications are not received within a predetermined period, the process jumps to step S5 and causes abort.

Step S4: It checks the results of construct-partial-data-structure instruction to see whether or not all instructions are normally terminated.

Step S5: It notifies the administrator inputting the construct instruction of the results of check in step S4. In the case of the multiprocessor computer system of FIG. 1, the terminal T outputs the result of check.

Construct-partial-data-structure Means 501

Figure 7:
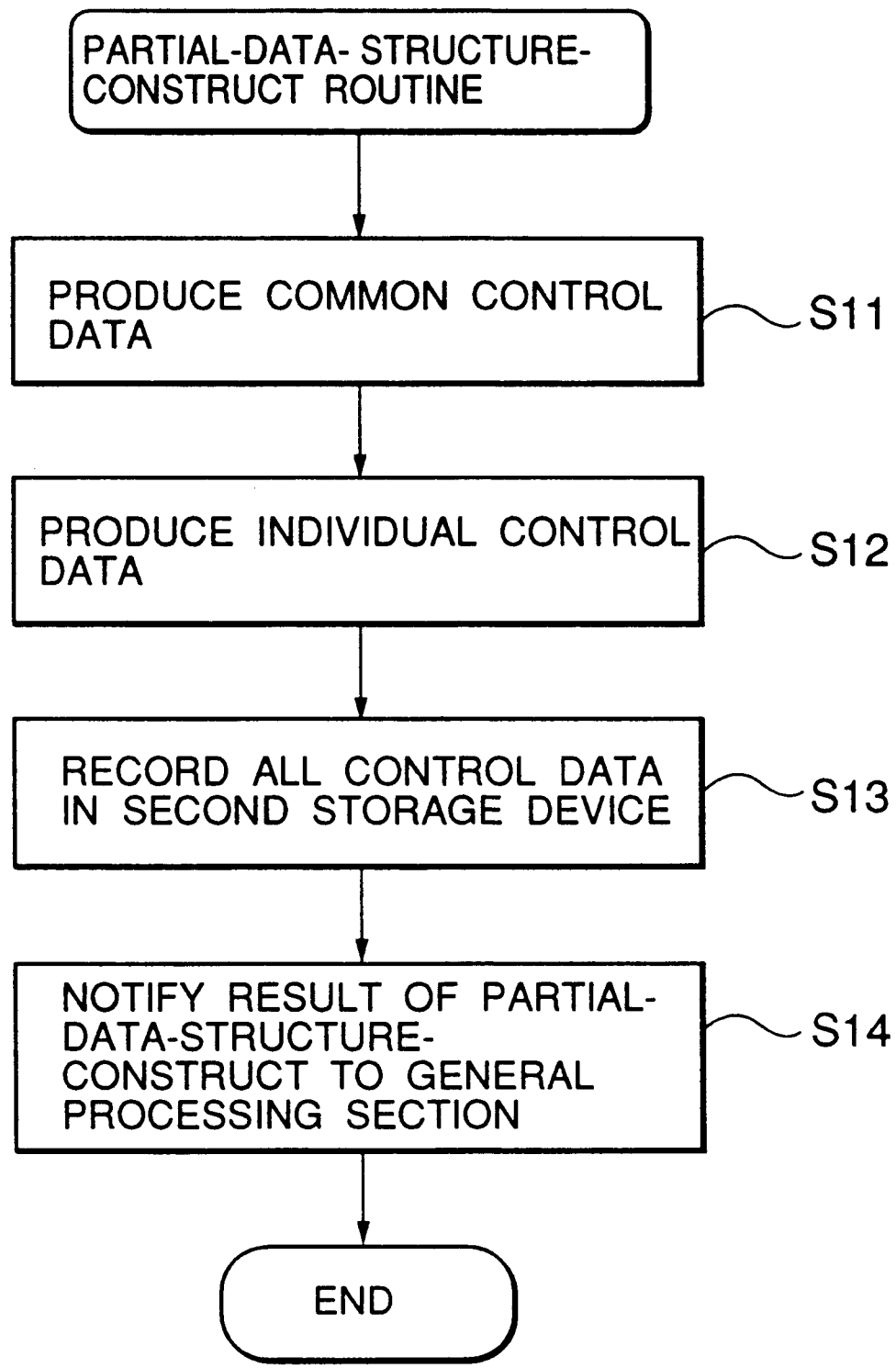
FIG. 7 is a flowchart showing an example of processing in construct-partial-data-structure means 501.

The construct-partial-data-structure means 501 is activated by a construct-partial-data-structure request output from step S2 of the broadcast-partial-data-structure-construct-request means 401. The construct-partial-data-structure means 501 is implemented as a construct-partial-data-structure routine for performing the process, for example, as shown, in FIG. 7. This routine performs the following processes:

Step S11: It retrieves necessary information from information for producing common control data contained in a construct-partial-data-structure request, and produces the common control data.

Step S12: It produces individual control data (an unused block control list, a partial file control data, or the like) for data structure different for each secondary storage device.

Step S13: It writes all control data produced in steps S11 and S12 in a secondary storage device. Instead of writing the control data after all of them are produced, it may be possible to write them one after another every time it is produced.

Step S14: It notifies the requesting general processing section 4 of the result of construct-partial-data-structure request. This notification is received by step S3 of the broadcast-partial-data-structure-construct-request means 401 in FIG. 6.

Input-start-up-instruction Means 101

The input-start-up-instruction means 101 is implemented in a form like a command in UNIX, and input from a terminal T in a case of a multiprocessor computer system of FIG. 1. Information specified together with a command includes identification information (name or the like) for the file data storage structure. After the command is input, the information is passed to the general processing section 4.

State Discrimination Means 402

The state discrimination means 402 is one of functions implemented in the general processing section 4. While it is necessary to know the state of file data storage structure to perform state discrimination, the state of file data storage structure may be controlled by the general processing section 4, or by the distributed processing section 5.

When the general processing section 4 is implemented as a resident process, the former approach can be attained. In this case, when information instructing start-up is passed to the general processing section 4, it can be immediately discriminated whether the file data storage structure is in the available state or in the unavailable state.

When the general processing section 4 is not implemented as a resident process, the distributed processing section 5 is implemented as a resident process. Then, the state of file data storage structure controlled by the distributed processing section 5 would be examined from the general processing section 4. Thus, a state investigation request and notification of result are exchanged between the general processing section 4 and the distributed processing section 5.

When the state of file data storage structure for which start-up is instructed is in the available state, the state discrimination means 402 terminates the process after notifying the administrator inputting the start-up instruction of the fact that it has been in the available state. The notification is output from the terminal T in the case of the multiprocessor computer system of FIG. 1. If it is in the unavailable state, the means activates the broadcast-start-up-request means 403.

Broadcast-start-up-request Means 403

Figure 8:
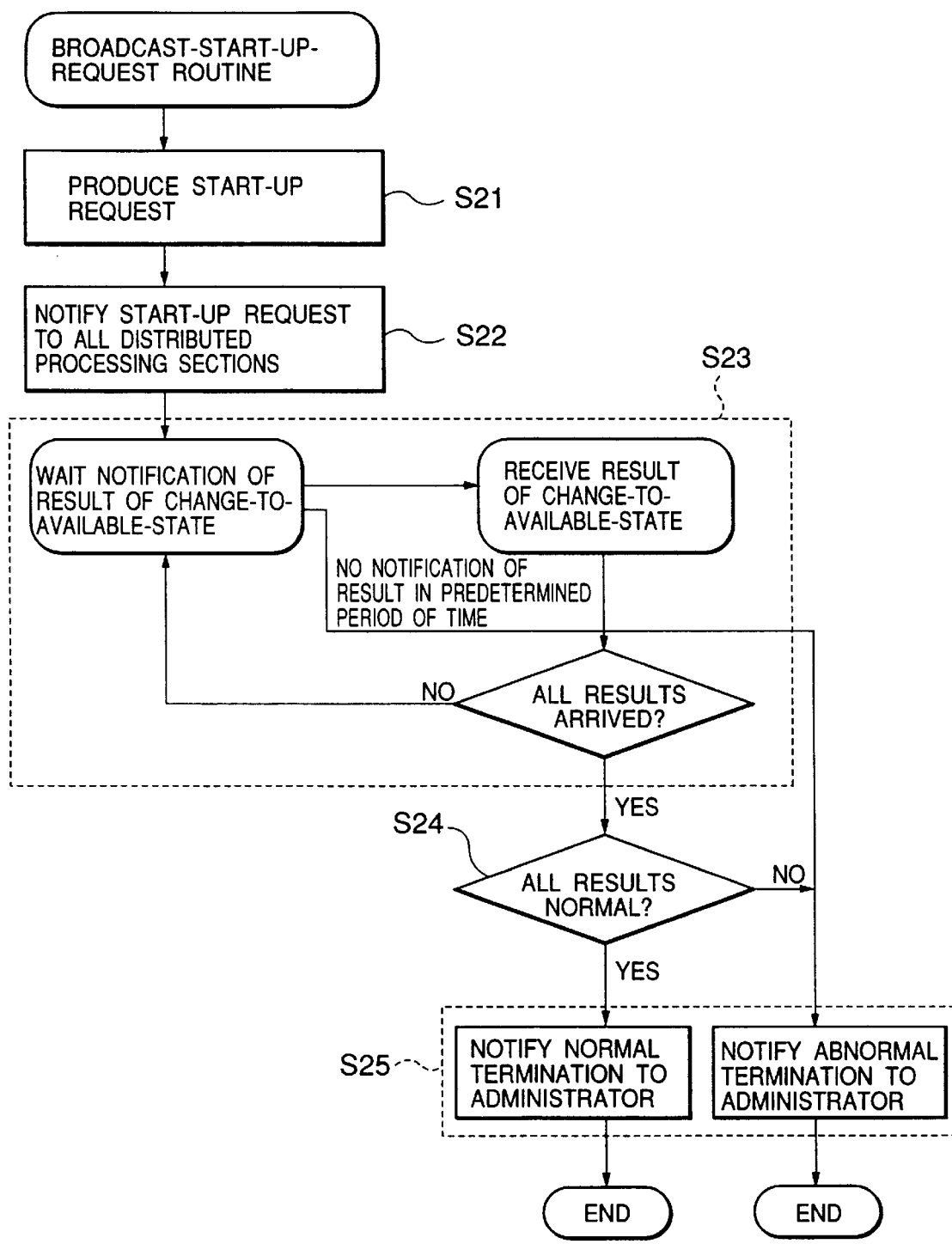
FIG. 8 is a flowchart showing an example of processing in broadcast-start-up-request means 403.

The broadcast-start-up-request means 403 is implemented as a broadcast-start-up-request routine for performing a process as shown in FIG. 8. This performs the following processes:

Step S21: It produces a start-up request including identification information for the file data storage structure based on identification information of the file data storage structure passed from the input-start-up-instruction means 101.

Step S22: It notifies the produced start-up request to all distributed processing sections 5 running on the secondary storage device control processor.

Step S23: It waits until all results of change-to-start-up instruction are notified. If all notifications are not received within a predetermined period, the process jumps to step S25 and causes abort.

Step S24: It checks the results of change-to-available-state instruction in step S23 to see whether or not all instructions are normally terminated.

Step S25: It notifies the administrator inputting the change-to-start-up instruction of the results of check in step S24. In this case, if the general processing section 4 is a resident process, it records the fact that the file data storage structure becomes the available state.

Change-to-available-state Means 502

Figure 9:
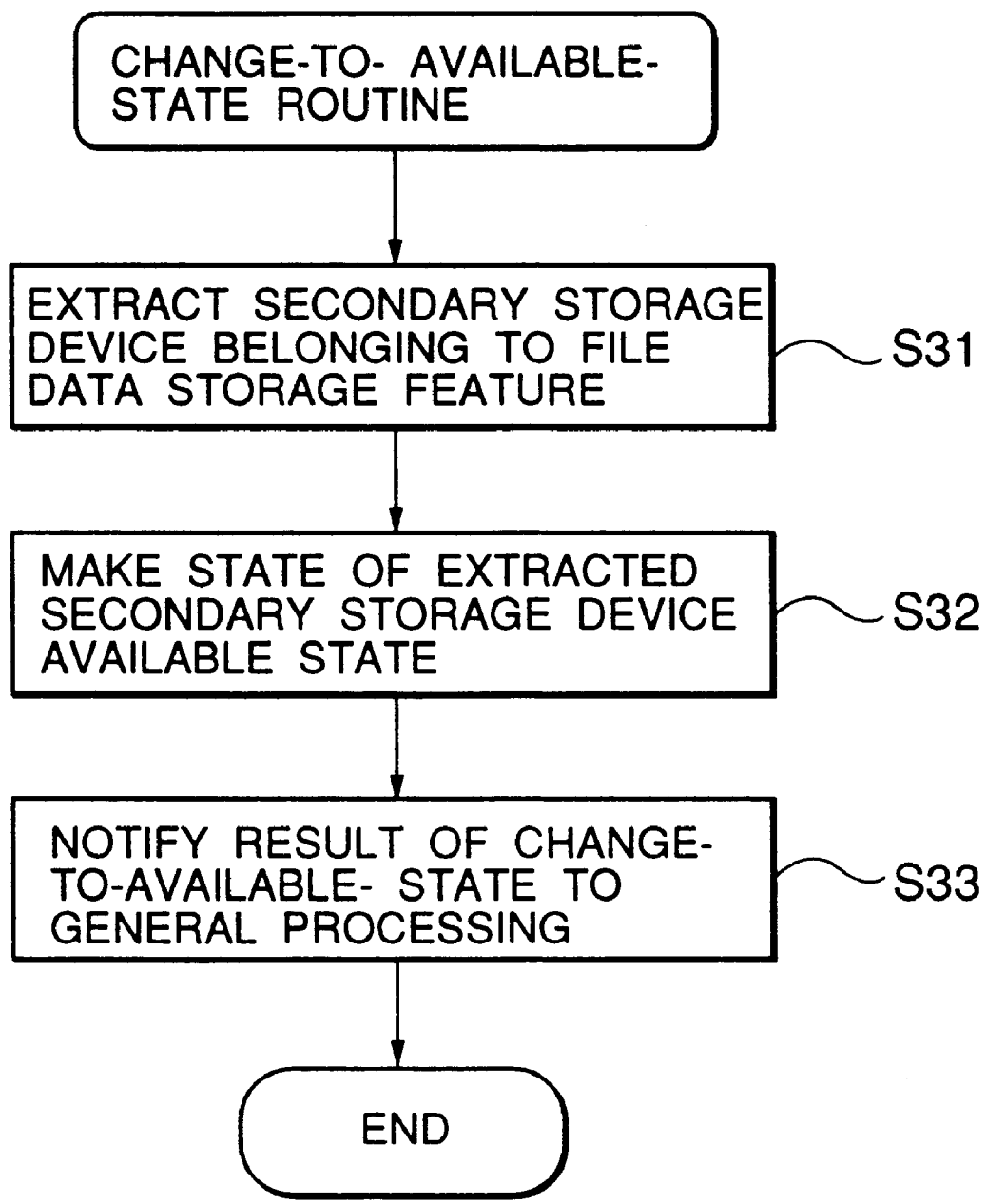
FIG. 9 is a flowchart showing an example of processing in change-to-available-state means 502.

The change-to-available-state means 502 is implemented as a change-to-available-state routine for performing the process as shown in FIG. 9. This routine performs the following processes:

Step S31: It retrieves control data from each secondary storage device, extracts identification information for the file data storage structure contained in a start-up request issued from the broadcast-start-up-request means 403 in the general processing section 4, and compares it with the control data read out from the secondary storage device, thereby extracting a secondary storage device belonging to the requested file data storage structure. The control data (partial data control data, unused block control list, or the like) read out from each secondary storage device is stored in the memory of the distributed processing section 5 during the period of available state, and utilized for actual control.

Step S32: It turns the state of secondary storage device extracted in step S31 to the available state. In this case, it records the fact that the file data storage structure becomes the available state.

Step S33: It notifies the requesting general processing section 4 of the result of change-to-available-state. This notification is received by step S23 of the broadcast-start-up-request means 403 in FIG. 8.

Input-termination-instruction Means 102

The input-termination-instruction means 102 is implemented in a form like a command in UNIX, and input from the terminal T in a case of a multiprocessor computer system of FIG. 1. Information specified together with the command includes identification information (name or the like) for the file data storage structure. After the command is input, the information is passed to the general processing section 4.

State discrimination Means 404

The state discrimination means 404 can be implemented in substantially same manner as the state discrimination means 402. It differs in the following points. If the file data storage structure is in the unavailable state, the state discrimination means 404 notifies the administrator inputting the termination instruction of the fact that it has been unavailable, and terminates the process. The notification is output from the terminal T in the case of the multiprocessor computer system of FIG. 1. If it is in the available state, the means activates the broadcast-termination-request means 405.

Broadcast-termination-request Means 405

Figure 10:
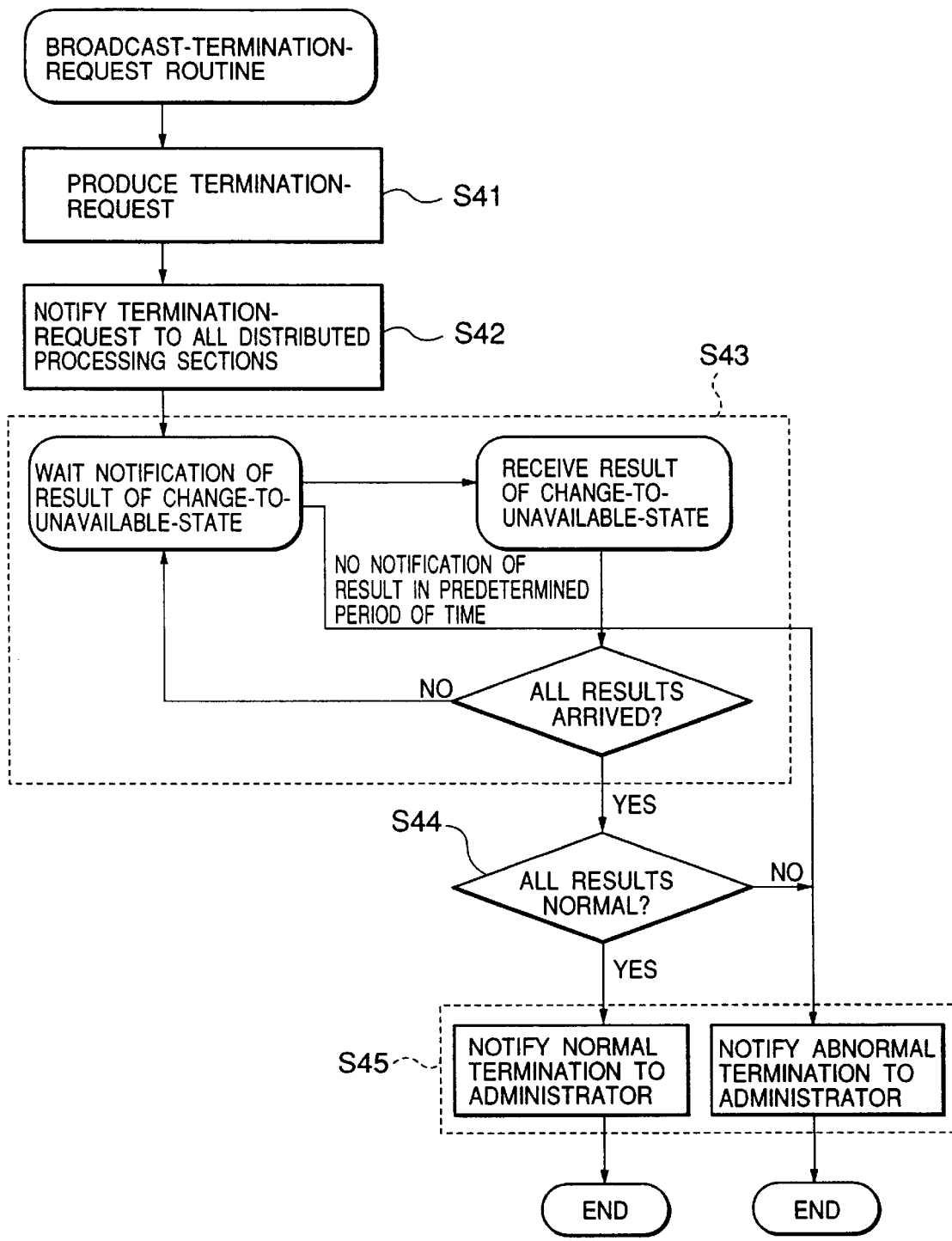
FIG. 10 is a flowchart showing an example of processing in broadcast-termination-request means 405.

The broadcast-termination-request means 405 is implemented as a broadcast-termination-request routine for performing the process as shown in FIG. 10. This routine performs the following processes:

Step S41: It produces a termination request including identification information for the file data storage structure based on identification information of the file data storage structure passed from the input-termination-instruction means 102.

Step S42: It notifies the produced termination request to all distributed processing sections 5 running on the secondary storage device control processor. In this case, if the general processing section 4 is a resident process, it records the fact that the file data storage structure becomes the unavailable state.

Step S43: It waits until all results of change-to-unavailable-state instruction are notified. If all notifications are not received within a predetermined period, the process jumps to step S45 and causes abort.

Step S44: It checks the results of change-to-unavailable-state instruction to see whether or not all instructions are normally terminated.

Step S45: It notifies the administrator inputting the change-to-termination instruction of the results of check in step S44. The notification is output from the terminal T in the case of the multiprocessor computer system of FIG. 1.

Change-to-unavailable-state Means 503

Figure 11:
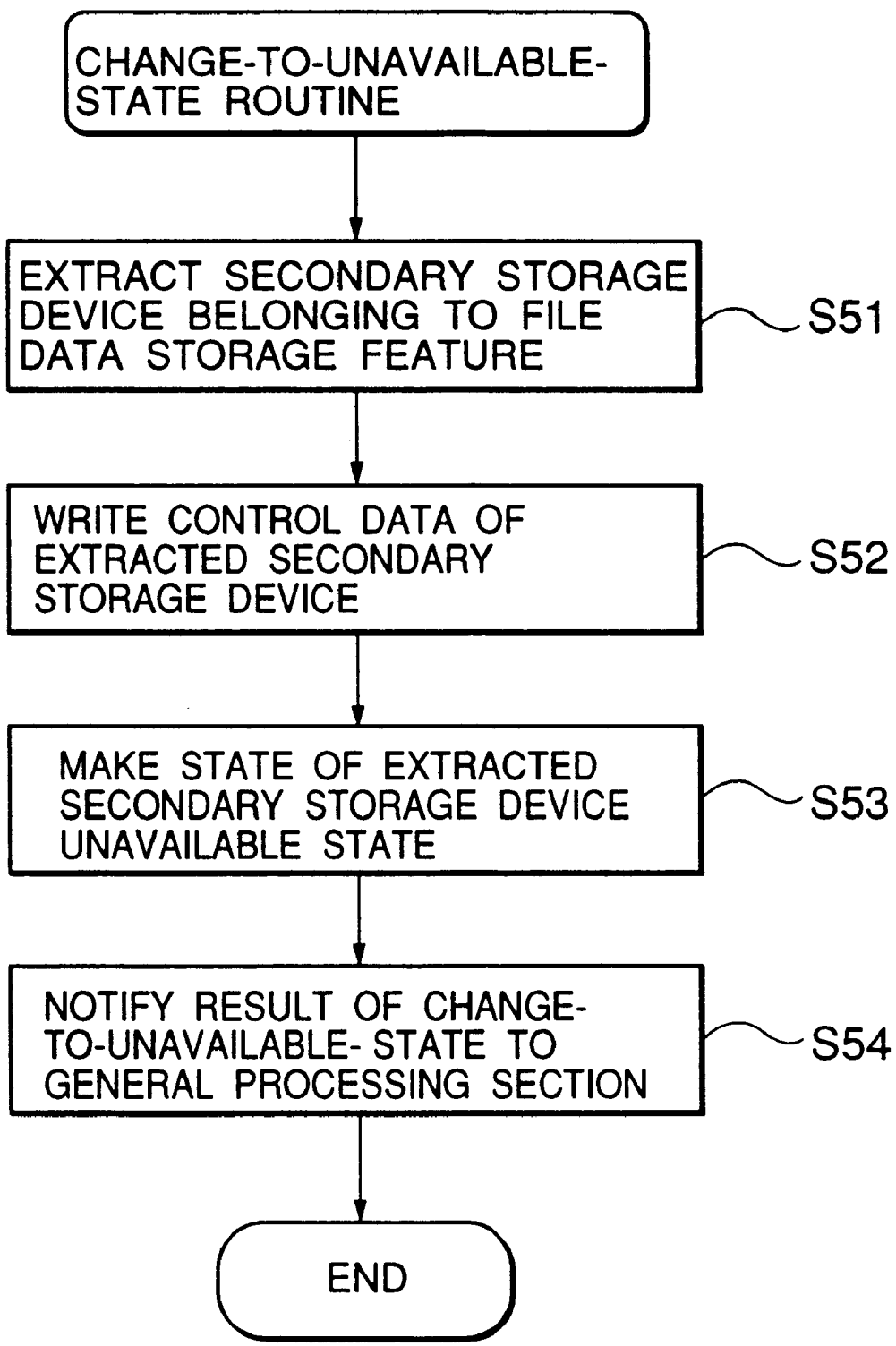
FIG. 11 is a flowchart showing an example of processing in change-to-unavailable-state means 503.

The change-to-unavailable-state means 503 is implemented as a change-to-unavailable-state routine for performing a process as shown in FIG. 11. This performs the following processes:

Step S51: It retrieves control data from each secondary storage device, extracts identification information for the file data storage structure contained in a termination request issued from the broadcast-termination-request means 405 in the general processing section 4, and compares it with the control data read out from the secondary storage device, thereby extracting a secondary storage device belonging to the requested file data storage structure.

Step S52: For each secondary storage device extracted in step S51, it writes in the second storage device the control data (partial file control data, unused block control list, or the like) read out to the memory of the distributed processing section 5 in the available state.

Step S53: It turns the state of secondary storage device to the unavailable state. In this case, it records the fact that the file data storage structure becomes the unavailable state.

Step S54: It notifies the requesting general processing section 4 of the result of change-to-unavailable-state. This notification is received by step S43 of the broadcast-termination-request means 405 in FIG. 10.

Now, a second embodiment of the present invention will be described by referring to the drawings. This embodiment changes a file data storage structure in the unavailable state to the available state as in the first embodiment. In addition, this embodiment changes the file data storage structure in the available state to the unavailable state, thereby excluding read or write of data by another user of the computer system. A structure of this embodiment lies in that there are provided three states of available state, unavailable state, and standby state as states to be controlled for each secondary storage device.

Figure 12:
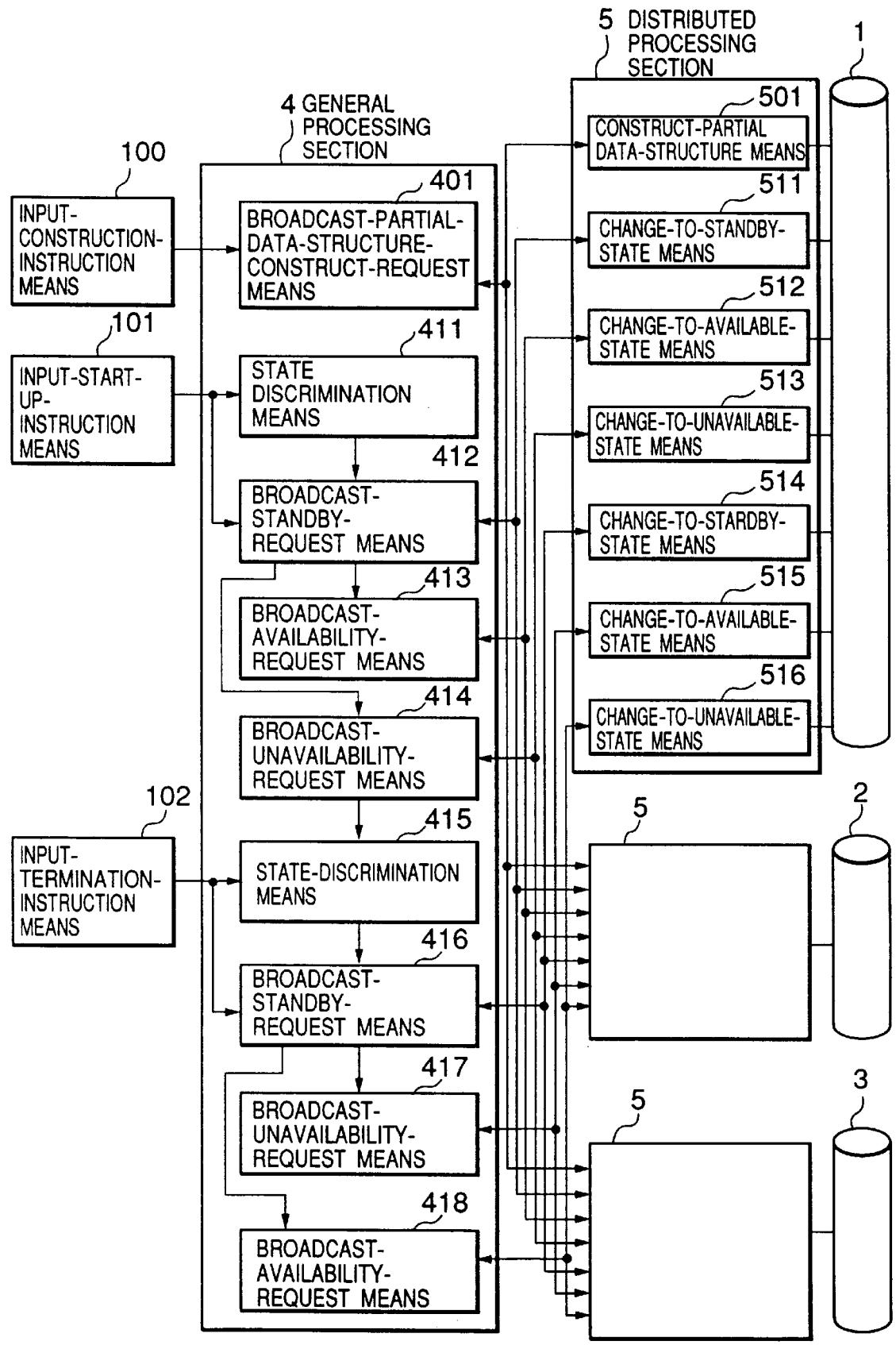
FIG. 12 is a block diagram of a second embodiment of the present invention.

Referring to FIG. 12, the general processing section 4 comprises broadcast-partial-data-structure-construct-request means 401, state discrimination means 411, broadcast-standby-request means 412, broadcast-availability-request means 413, broadcast-unavailability-request means 414, state discrimination means 415, broadcast-standby-request means 416, broadcast-unavailability-request means 417, and broadcast-availability-request means 418. Each of distributed processing sections 5 comprises construct-partial-data-structure means 501, change-to-standby-state means 511, change-to-available-state means 512, change-to-unavailable-state means 513, change-to-standby-state means 514, change-to-unavailable-state means 515, and change-to-available-state mean 516. In addition, as means for providing an instruction to the general processing section 4, there is provided input-construction-instruction means 100, input-start-up -instruction means 101, and input-termination-instruction means 102.

The file data storage structure of this embodiment is distributed across a plurality of distributed processing sections 5. Thus, it is desirable that the state of each secondary storage device is caused to change while synchronizing a plurality of distributed processing sections 5. Then, there are provided three states of available state, unavailable state, and standby state as states to be controlled for each secondary storage device. The available state is a state where, as the file data storage structure, data can be read and written from and in a file. On the other hand, the unavailable state is a state where data cannot be read and written from and in a file. The standby state is same as the unavailable state in term that data cannot be read and written from and in a file, but prepared as an intermediate state for synchronization (a state where parts of process necessary to change from the unavailable state to the available state). For example, to change from the unavailable state to the available state, control data is read from a secondary storage device to a memory, processed by processes such as checking, and made a state actually usable as software. In the standby state, it has been completed for reading of the control data from the secondary storage device, and processes such as checking. However, in the available state, it is suppressed not to accept processes other than the change to the available or unavailable state. Therefore, the secondary storage device in the standby state can immediately change to the available state. On the other hand, it can immediately change to the unavailable state.

The standby state is prepared under the following reason. When the state of secondary storage device is caused to change, the unavailable state may not change to the available state due to failure of the secondary storage device or some other reason. If even one such secondary storage device exists, that secondary storage device remains unavailable. Since the file data storage structure handles a plurality of secondary storage devices, if the available state and the unavailable state are intermixed, the structure becomes unstable, Therefore, there is provided an intermediate state that can immediately change to either the available or unavailable state, and synchronization is confirmed there. This make it easy to arrange all secondary storage devices in either the available or unavailable state.

The input-start-up-instruction means 101 is an interface allowing the administrator of the computer system to start usage. The administrator of the computer system specifies the file data storage structure that he or she starts to use with the input-start-up-instruction means 101. The state discrimination means 411 determines whether the file data storage structure has become available. If so, it means that the purpose has been attained, and the process terminates here. If it is in the unavailable state, a process is started to change it to the available state. The change-to-standby-state means 511 runs on each distributed processing sections 5, and causes the state of applicable secondary storage device to change from the unavailable state to the available state. Since this process is independent on each change-to-standby-state means 511, the process can be performed in parallel on separate distributed processing sections 5. The broadcast-standby-request means 412 broadcasts a standby request to all change-to-standby-state means 511. This causes all change-to-standby-state means 511 to start the process simultaneously. The broadcast-standby-request means 412 confirms whether or not all secondary storage devices can transfer to the standby state, and proceeds to the subsequent process after completing the confirmation. This synchronizes change of state.

Running on each distributed processing section 5 are the change-to-available-state means 512 causing the state of secondary storage device to change from the standby state to the available state, and the change-to-unavailable-state means 513 causing it to change from the standby state to the unavailable state. These means are activated when a start-up request or an unavailability request is issued to each distributed processing sections 5. Since either process is independent for each means, they can be processed in parallel on separate distributed processing sections 5. The broadcast-availability-request means 413 is activated when the broadcast-standby-request means 412 confirms that all secondary storage devices can transfer to the standby state, and broadcasts a start-up request to all change-to-available-state means 512. This causes all change-to-available-state means 512 to perform the process simultaneously, and all secondary storage devices in the standby state to change to the available state, so that they are available as the file data storage structure. The broadcast-unavailability-request means 414 is activated when the broadcast-standby-request means 412 confirms that parts of the secondary storage devices cannot change to the standby state, and broadcasts an unavailability request to all change-to-unavailable-state means 513. This causes all change-to-unavailable-state means 513 to perform the process simultaneously. The secondary storage devices that once become standby change to the standby state all at once, and are returned to a state where they cannot be used as the file data storage structure.

The input-termination-instruction means 102 is an interface for the administrator of the computer system to terminate the process. The state discrimination means 415 determines whether the file data storage structure has become unavailable. If so, it means that the purpose has been attained, and the process terminates here. If it is in the available state, it proceeds to a process causing the file data storage structure to transfer to the unavailable state. The change-to-standby-state means 514 runs on each distributed processing section 5, and causes the state of applicable secondary storage devices to transfer from the available state to the standby state. The change-to-standby-state means 514 checks whether data is being read or written from or to an applicable secondary storage device. Only if the data is not being read or written, the state of secondary storage device is caused to change from the available state to the standby state. If data is being read or written from or to the applicable secondary storage device, it is left in the available state.

Then, if the user is reading or writing the file data, the process by the user takes preference. Since this process is independent for each change-to-standby-state means 514, it can be performed in parallel on separate distributed processing sections 5. The broadcast-standby-request means 416 broadcasts a standby request to all change-to-standby-state means 514. Then, all change-to-standby-state means 514 starts the process simultaneously. The broadcast-standby-request means 416 checks whether or not all secondary storage devices can transfer to the standby state, and proceeds to the subsequent process after completing the confirmation. This synchronizes change of state.

Running on each distributed processing section 5 are the change-to-unavailable-state means 515 causing the state of secondary storage device to change from the standby state to the unavailable state, and the change-to-available-state means 516 causing it to change from the standby state to the available state. These means are activated when a start-up request or a termination request is issued to each distributed processing sections 5. Since either process is independent for each means, they can be processed in parallel on separate distributed processing section 5. The broadcast-unavailability-request means 417 is activated when the broadcast-standby-request means 416 confirms that all secondary storage devices can transfer to the standby state, and broadcasts a termination request to all change-to-unavailable-state means 515. This causes all change-to-unavailable-state means 515 to perform the process simultaneously, and all secondary storage devices in the standby state to change to the unavailable state, so that they are unavailable as the file data storage structure. The broadcast-availability-request means 418 is activated when the broadcast-standby-request means 416 confirms that parts of the secondary storage devices cannot change to the standby state, and broadcasts an availability request to all change-to-available-state means 516. This causes all change-to-available-state means 516 to perform the process simultaneously. The secondary storage devices that once become standby change to the available state all at once, and are returned to a state where they can be used as the file data storage structure.

Now, the operation of the embodiment will be described.

The administrator of the computer system instructs construction by specifying with the input-construction-instruction means 100 all secondary storage devices constituting the file data storage structure to be constructed. The broadcast-partial-data-structure-construct-request means 401 in the general processing section 4 interprets the instruction, and, at the same time, issues a partial data structure construct request to each construct-partial-data-structure means 501 in the distributed processing sections 5. Each construct-partial-data-structure means 501 receives the partial data structure construct request, and constructs the partial data structure on respective secondary storage devices 1, 2, and 3 specified by the request. This constructs a file data storage structure. These operations are same as those of the first embodiment.

Then, the administrator of the computer system instructs with the input-start-up-instruction means 101 start-up of a file data storage structure that he or she wants to use. The state discrimination means 411 in the general processing section 4 determines whether the file data storage structure instructed for start-up is in the available state or in the unavailable state at that moment. If it is discriminated to be in the unavailable state, the broadcast-standby-request means 412 broadcasts a standby request to the change-to-standby-state means 511 in each distributed processing section 5. Each change-to-standby-state means 511 receives the standby request, and changes the state of the secondary storage devices belonging to the file data storage structure specified by the request to the intermediate sate called the standby state.

Then, when all change-to-standby-state means 511 succeeds to change to the standby state, the broadcast-standby-request means 412 activates the broadcast-availability-request means 413. The broadcast-availability-request means 413 broadcasts a start-up request to the change-to-available-state means 512 in each distributed processing section 5. The change-to-available-state means 512 receives the request, and causes the state of secondary storage devices 1, 2, and 3 belonging to the file data storage structure specified by the request to change from the standby state to the available state. Thus, the file data storage structure becomes available.

On the other hand, if parts of the change-to-standby-state means 511 fails to change to the standby state, the broadcast-standby-request means 412 activates the broadcast-unavailability-request means 414. The broadcast-unavailability-request means 414 broadcasts an unavailability request to the change-to-unavailable-state means 513 in each distributed processing section 5. Each change-to-unavailable-state means 513 receives the unavailability request, and returns the state of secondary storage devices belonging to the file data storage structure specified by the request from the standby state to the unavailable state.

Thereafter, the administrator of the computer system instructs termination of the computer system with the input-termination-instruction means 102. The state discrimination means 415 in the general processing means 4 determines whether the file data storage structure instructed for termination is in the available stare or in the unavailable state at that moment. If it is discriminated to be in the available state, the broadcast-standby-request means 416 in the general processing section 4 broadcasts a standby request to the change-to-standby-state means 514 in each distributed processing section 5. Each change-to-standby-state means 514 receives the standby request, and changes the state of secondary storage devices belonging to the file data storage structure specified by the request to the standby state.

Then, when all change-to-standby-state means 514 succeeds to change to the standby state, the broadcast-unavailability-request means 417 is activated. The broadcast-unavailability-request means 417 broadcasts a termination request to the change-to-unavailable-state means 515 in each distributed processing section 5. The change-to-unavailable-state means 515 receives the termination request, and changes the state of secondary storage devices belonging to the file data storage structure specified by the request from the standby state to the unavailable state.

On the other hand, if parts of the change-to-standby-state means 514 fails to change to the standby state, the broadcast-availability-request means 418 is activated. The broadcast-availability-request means 418 broadcasts an availability request to the change-to-available-state mean 516 in each distributed processing section 5. The change-to-available-state mean 516 receives the request, and returns the state of secondary storage devices belonging to the file data storage structure specified by the request from the standby state to the available state.

Now, the operation of each component of this embodiment will be described in detail. Here, components identified by the same reference numerals as in FIG. 5, that is, the input-construction-instruction means 100, the input-start-up-instruction means 101, the input-termination-instruction means 102, the broadcast-partial-data-structure-construct-request means 401, and the construct-partial-data-structure means 501 perform the same operation as in FIG. 5, so that their detailed description is omitted.

State Discrimination Means 411

The state discrimination means 411 is substantially same as the state discrimination means 402 of FIG. 5. However, it differs in the following point. The state discrimination means 411 activates the broadcast-standby-request means 412 if the file data storage structure is in the unavailable state.

Broadcast-standby-request Means 412

Figure 13:
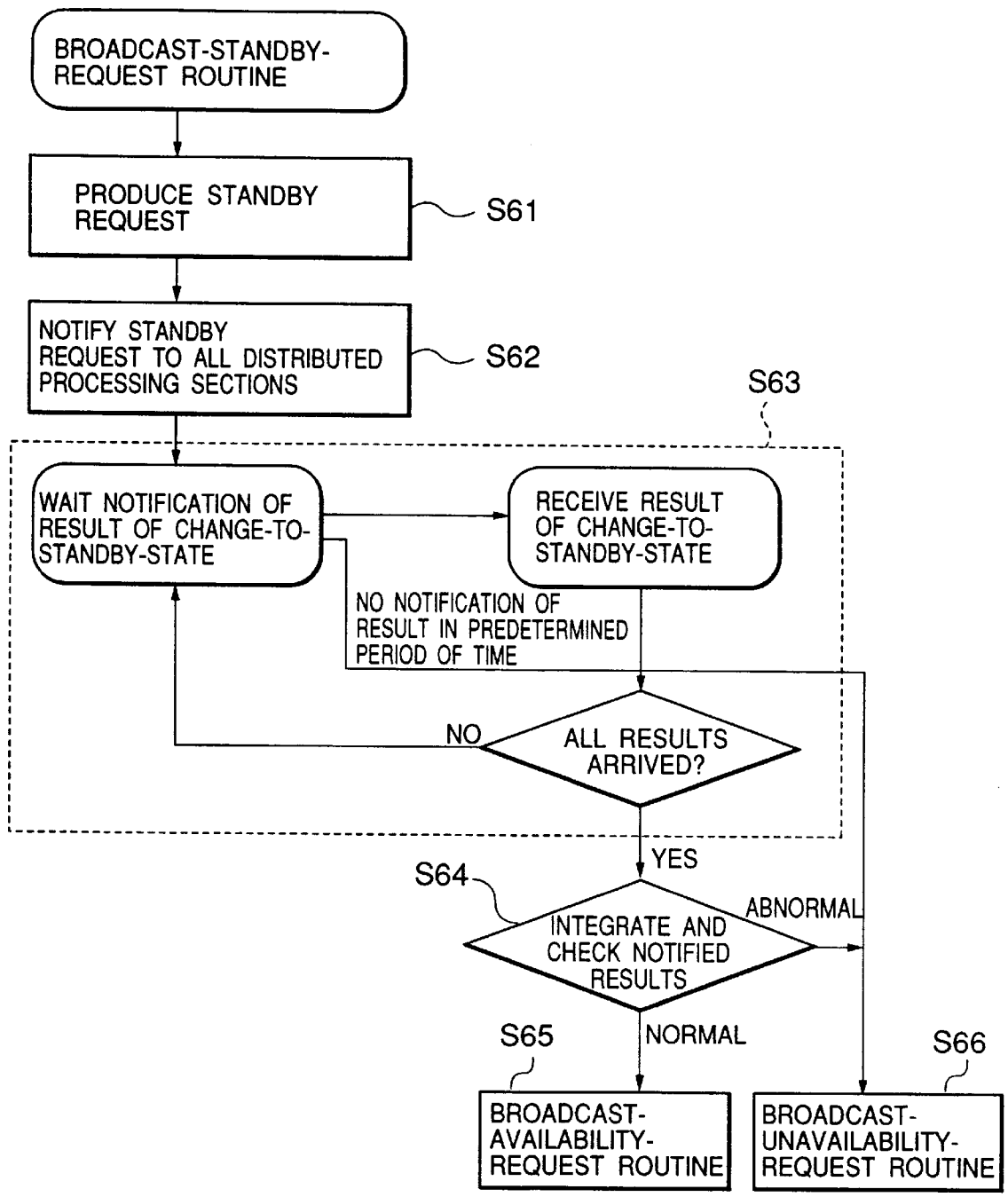
FIG. 13 is a flowchart showing an example of processing in broadcast-standby-request means 412.

The broadcast-standby-request means 412 is activated when the state discrimination means 411 determines that the file data storage structure instructed for start-up is in the unavailable state. The broadcast-standby-request means 412 is implemented as a broadcast-standby-request routine for performing the process, for example, as shown in FIG. 13. This routine performs the following processes:

Step S61: It produces a standby request including identification information for the file data storage structure based on identification information of the file data storage structure passed from the input-start-up-instruction means 101. The identification information of the file data storage structure is recorded in the general processing section 4 for the subsequent process.

Step S62: It notifies the produced standby request to all distributed processing sections 5 running on the secondary storage device control processor. In this case, if the general processing section 4 is a resident process, it records the fact that the file data storage structure is in the intermediate state.

Step S63: It waits until all results of change-to-standby instruction are notified. If all notifications are not received within a predetermined period, the process jumps to step S66, and activates the broadcast-unavailability-request routine (broadcast-unavailability-request means 414).

Step S64: It comprehensively checks all results of change-to-standby instruction notified in step S63. This checks to see whether or not individual notified results are normal, and whether or not all secondary storage devices complete change to the available state.

Step S65: As the result of step S64, if all change-to-standby has successfully completed, the process proceeds to step S65, and activates a broadcast-availability-request routine (broadcast-availability-request means 413).

Step S66: As the result of step S64, if an abnormal condition is detected in even part of the change-to-standby, the process proceeds to step S66, and activates the broadcast-unavailability-request routine (broadcast-unavailability-request means 414).

Change-to-standby-state Means 511

Figure 14:
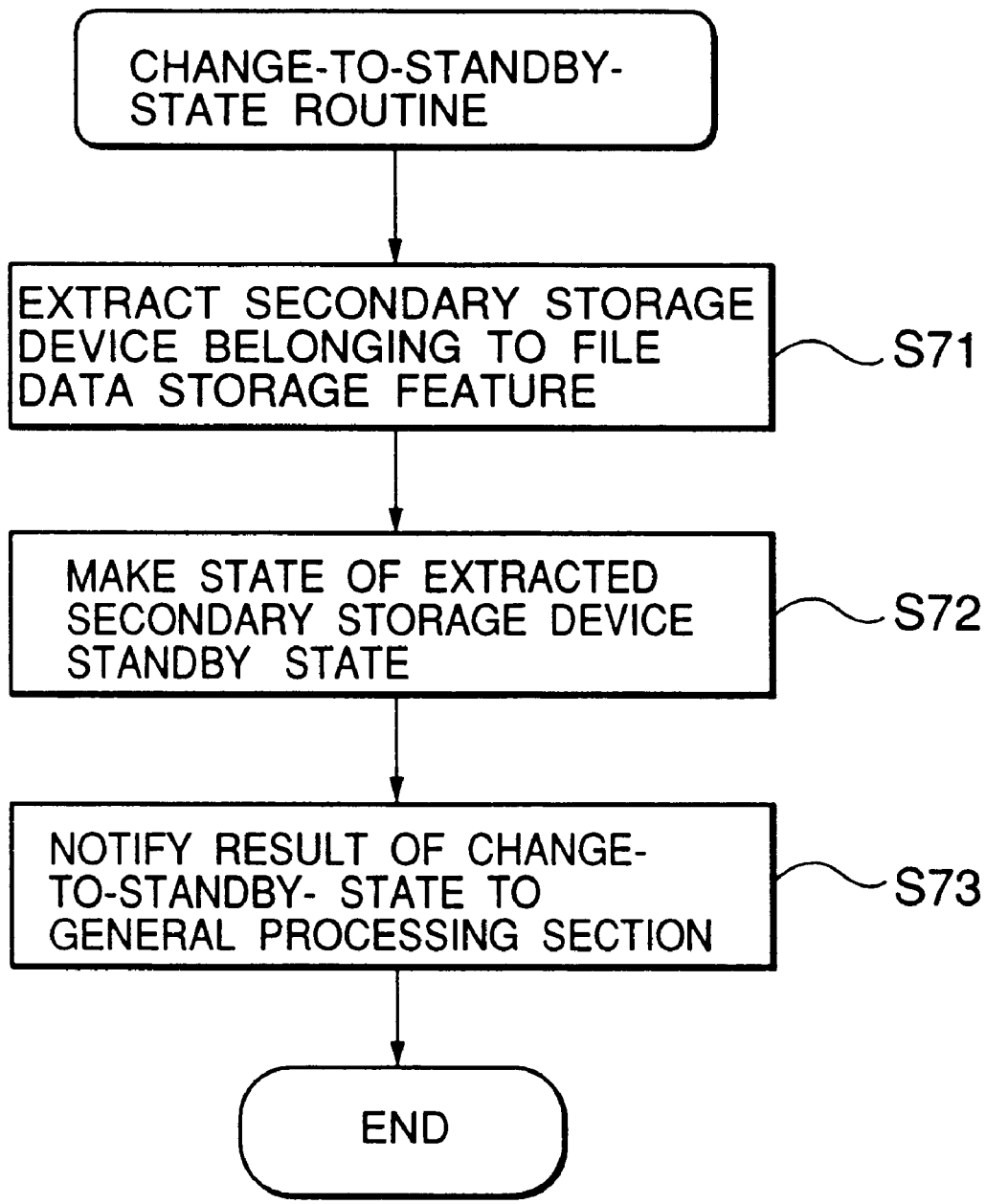
FIG. 14 is a flowchart showing an example of processing in change-to-standby-state means 511.

The change-to-standby-state means 511 is implemented as a change-to-standby-state routine for performing the processes, for example, as shown in FIG. 14. This routine performs the following processes:

Step S71: It retrieves control data from each secondary storage device, extracts identification information contained in a standby request issued from the broadcast-standby-request means 412 in the general processing section 4, and compares it with the control data read out from each secondary storage device, thereby extracting a secondary storage device belonging to the requested file data storage structure.

Step S72: It turns the state for each secondary storage device extracted in step S71 to the standby state. In this case, it records the fact that the file data storage structure becomes the intermediate state.

Step S73: It notifies the requesting general processing section 4 of the result of change-to-standby request. At the moment, it notifies which secondary storage device becomes available. This notification is received by step S63 of the broadcast-standby-request means 412 in FIG. 13.

Broadcast-availability-request Means 413

Figure 15:
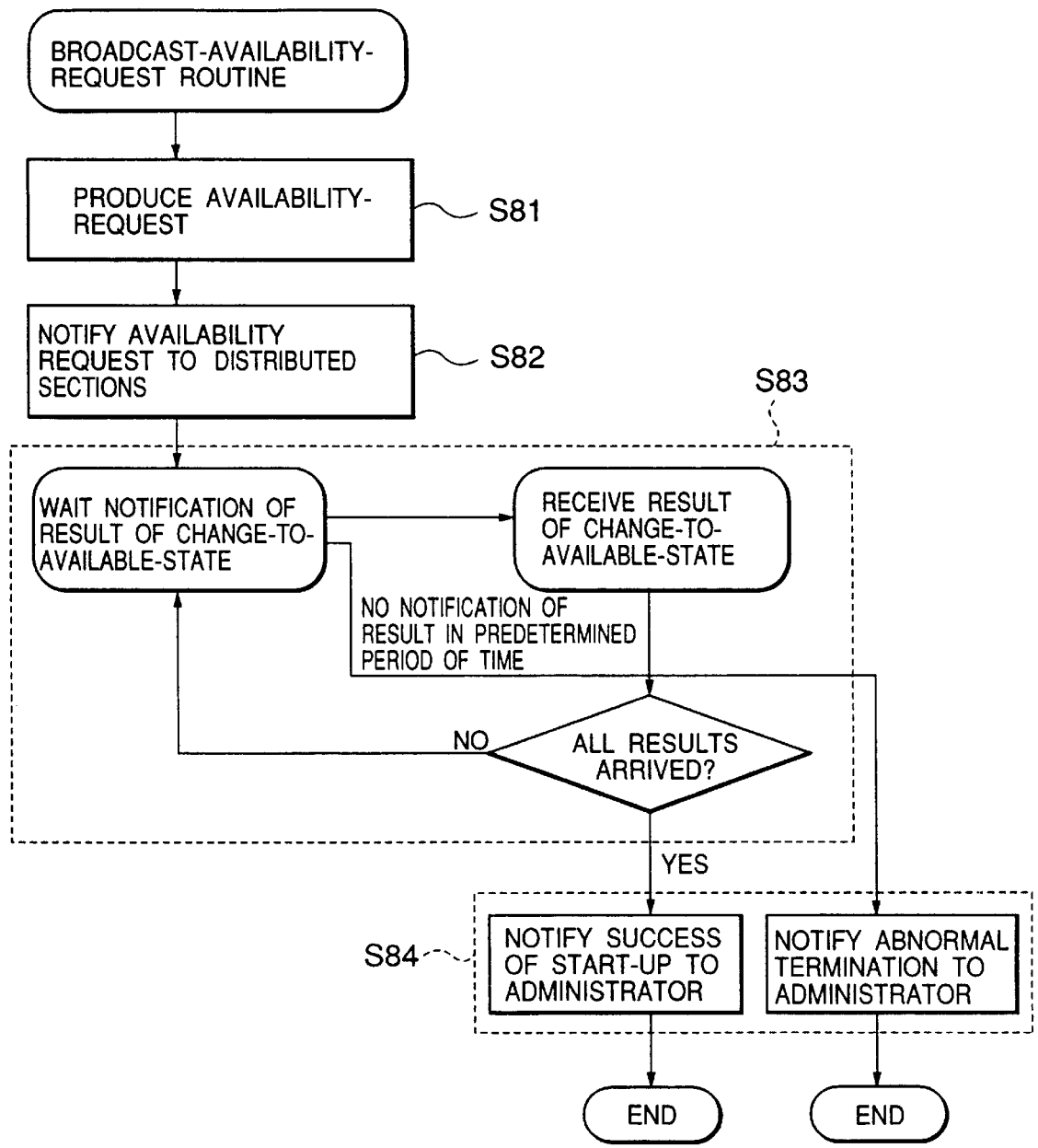
FIG. 15 is a flowchart showing an example of processing in broadcast-availability-request means 413.

The broadcast-availability-request means 413 is activated when the notification of result that the state of all secondary devices successfully changes to the standby state is confirmed after the operation of the broadcast-standby-request means 412 in the general processing section 4. The broadcast-availability-request means 413 is implemented as a broadcast-availability-request routine for performing the processes, for example, as shown in FIG. 15. This routine performs the following processes:

Step S81: It produces an availability request including identification information for the file data storage structure based on identification information of the file data storage structure recorded in the general processing section 4.

Step S82: It notifies the produced availability request to all distributed processing section 5 running on the secondary storage device control processor.

Step S83: It waits until all results of change-to-available-state instruction are notified. If all notifications are not received within a predetermined period, the process notifies it as an abnormal state. In this case, the state of the file data structure becomes undetermined.

Step S84: Since the result of individual notification can be only normal for the change from the standby state to the available state, when all results of notification arrive in step S83, it is determined as normal, and the process notifies the administrator inputting the start-up instruction of normal start-up. The notification is output from the terminal T in the case of the multiprocessor computer system of FIG. 1. In addition, in this case, if the general processing section 4 is a resident process, it records the fact that the file data storage structure becomes the available state.

Change-to-standby-state Means 512

The change-to-standby-state means 512 serves substantially same as the change-to-standby-state means 502 of FIG. 5. However, since the applicable second storage has become the standby state, the change-to-standby-state means 512 only changes the sate from the standby state to the available state.

Broadcast-unavailability-request Means 414

Figure 16:
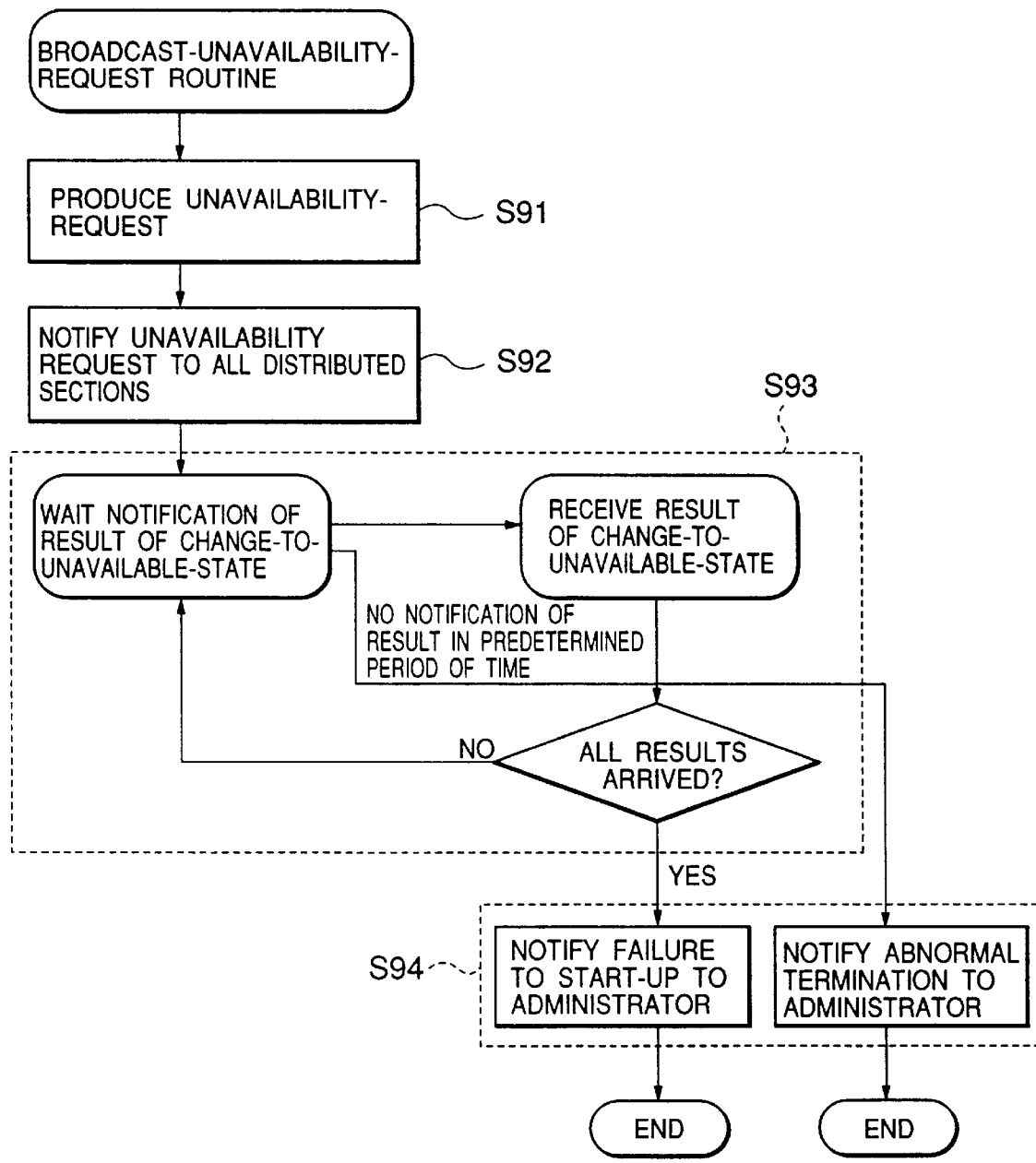
FIG. 16 is a flowchart showing an example of processing in broadcast-unavailability-request means 414.

The broadcast-unavailability-request means 414 is activated when it is confirmed that even a part is abnormal in changing to the standby state after the operation of the broadcast-standby-request means in the general processing section 4. The broadcast-unavailability-request means 414 is implemented as a broadcast-unavailability-request routine for performing the processes, for example, as shown in FIG. 16. This routine performs the following processes:

Step S91: It produces an unavailability request including identification information for the file data storage structure based on identification information of the file data storage structure recorded in the general processing section 4.

Step S92: It notifies the produced unavailability request to all distributed processing section 5 running on the secondary storage device control processor.

Step S93: It waits until all results of change-to-unavailable-state instruction are notified. If all notifications are not received within a predetermined period, the process assumes it as an abnormal state, and notifies the administrator. In this case, the state of the file data structure becomes undetermined.

Step S94: Since the result of individual notification can be only normal for the change from the standby state to the unavailable state, when all results of notification arrive in step S93, it is discriminated that all secondary storage devices changes to the unavailable state, and the process notifies the administrator inputting the start-up instruction of the fact that start-up fails. The notification is output from the terminal T in the case of the multiprocessor computer system of FIG. 1. In addition, in this case, if the general processing section 4 is a resident process, it records the fact that the file data storage structure becomes the unavailable state.

Change-to-unavailable-state Means 513

The change-to-unavailable-state means 513 serves substantially same as the change-to-unavailable-state means 503 of FIG. 5. However, since the applicable second storage has become the standby state, the change-to-unavailable-state means 513 only changes the state from the standby state to the unavailable state.

State Discrimination State 415

The state discrimination state 415 is substantially same as the state discrimination means 404 of FIG. 5. However, it differs from the state discrimination means 404 in that the state discrimination means 415 activates the broadcast-standby-request means 416 if the file data storage structure is in the available state.

Broadcast-standby-request Means 416

Figure 17:
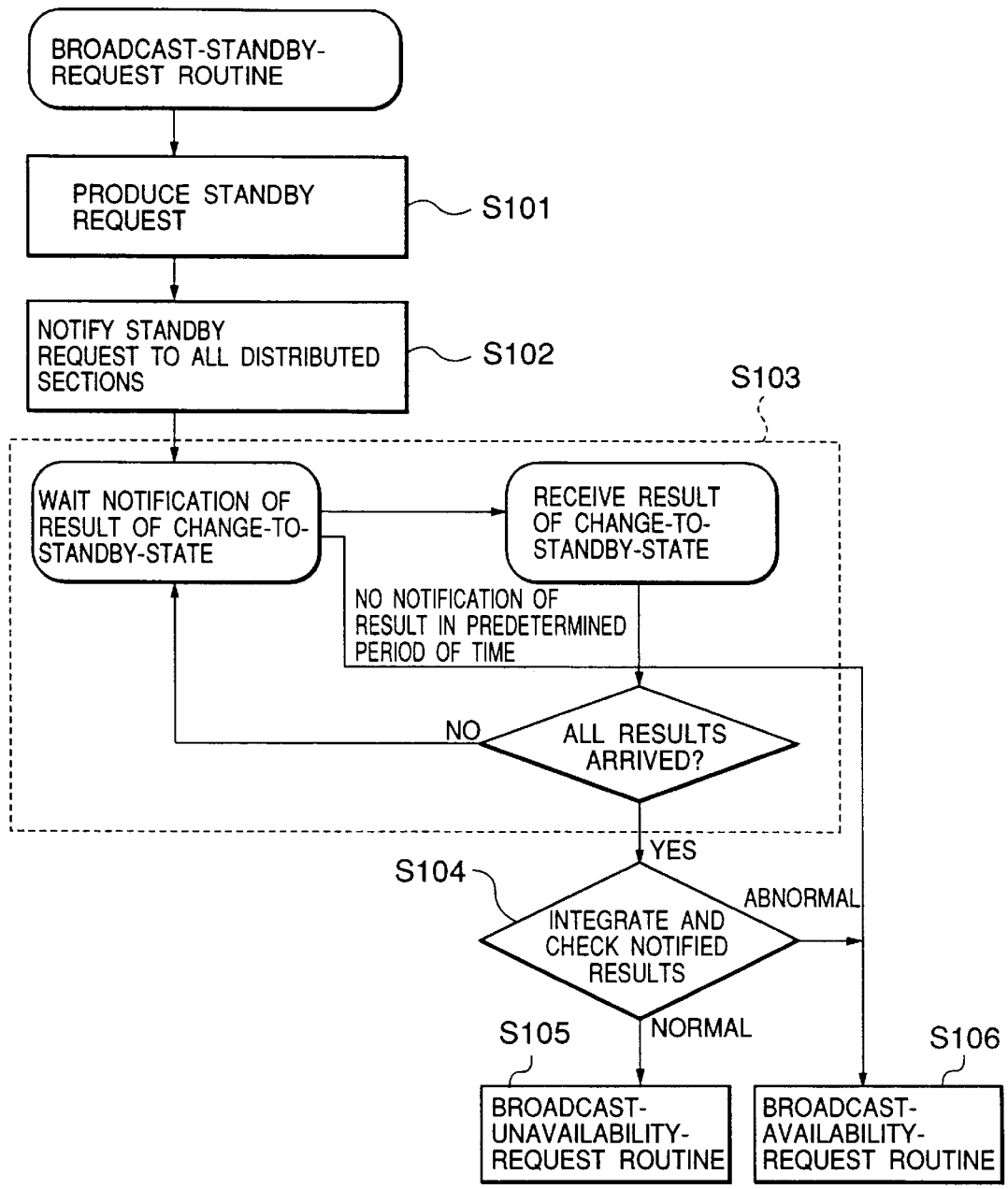
FIG. 17 is a flowchart showing an example of processing in broadcast-standby-request means 416.

The broadcast-standby-request means 416 is activated when the state discrimination means 415 determines that the file data storage structure is in the available state. The broadcast-standby-request means 416 is implemented as a broadcast-standby-request routine for performing the processes, for example, as shown in FIG. 17. This routine performs the following processes:

Step S101: It produces a standby request including identification information for the file data storage structure based on identification information of the file data storage structure passed from the input-termination-instruction means 102. The identification information is recorded in the general processing section 4 for the subsequent process.

Step S102: It notifies the produced standby request to all distributed processing section 5 running on the secondary storage device control processor. The notification is output from the terminal T in the case of the multiprocessor computer system of FIG. 1. In addition, in this case, if the general processing section 4 is a resident process, it records the fact that the file data storage structure is in the intermediate state.

Step S103: It waits until all results of change-to-standby-state instruction are notified. If all notifications are not received within a predetermined period, the process proceeds to step S106, and activates broadcast-availability-request routine (broadcast-availability-request means 418).

Step S104: It comprehensively checks all results of change-to-standby instruction notified in step S103. This checks to see whether or not individual notified results are normal, and whether or not all secondary storage devices complete change to the standby state.

Step S105: As the result of step S104, if all change-to-standby has successfully completed, the process activates a broadcast-unavailability-request routine (broadcast-unavailability-request means 417).

Step S106: As the result of step S104, if an abnormal condition is detected in even part of the change-to-standby, the process activates the broadcast-availability-request routine (broadcast-availability-request means 418).

Change-to-standby-state Means 514

Figure 18:
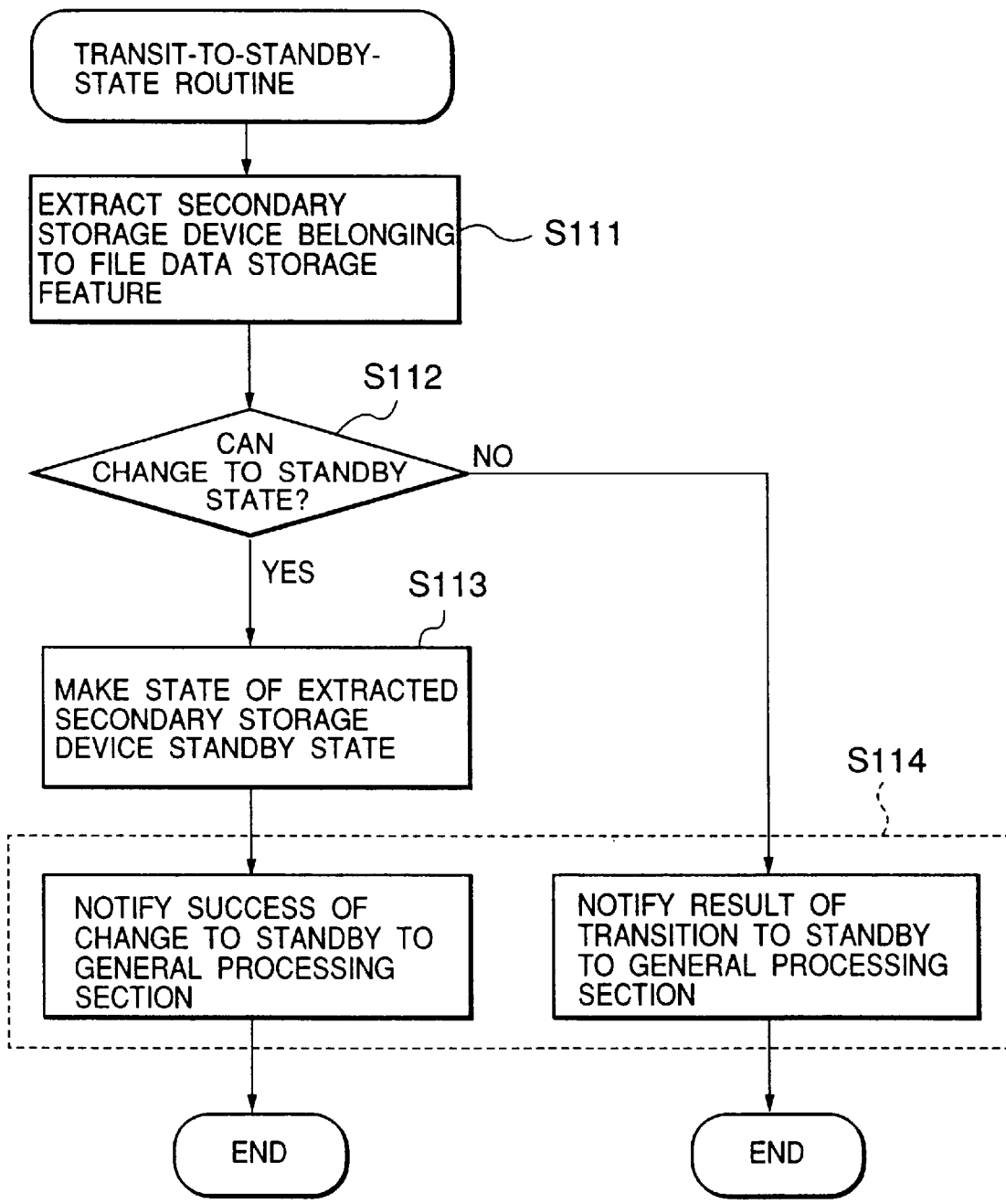
FIG. 18 is a flowchart showing an example of processing in change-to-standby-state means 514.

The change-to-standby-state means 514 is implemented as a change-to-standby-state routine for performing processes, for example, as shown in FIG. 18. This routine performs the following processes:

Step S111: It retrieves control data from each secondary storage device, extracts identification information contained in a standby request issued from the broadcast-standby-request means 416 in the general processing section 4, and compares it with the control data read out from each secondary storage device, thereby extracting a secondary storage device belonging to the requested file data storage structure.

Step S1 12: It determines whether or not the secondary storage device extracted in step S111 can change to the standby state. A case where it cannot change to the standby state may be a case where reading or writing is being performed for the secondary storage device at the moment.

Step S113: If it is discriminated that the secondary storage device can change to the standby state, the secondary storage device is caused to change to the standby state. In this case, it records the fact that the file data storage structure becomes the intermediate state.

Step S114: It notifies the requesting general processing section 4 of the result of change-to-standby request (succeed/fail). This notification is received by step S103 of the broadcast-standby-request means 416 in FIG. 17.

Broadcast-unavailability-request Means 417

Figure 19:
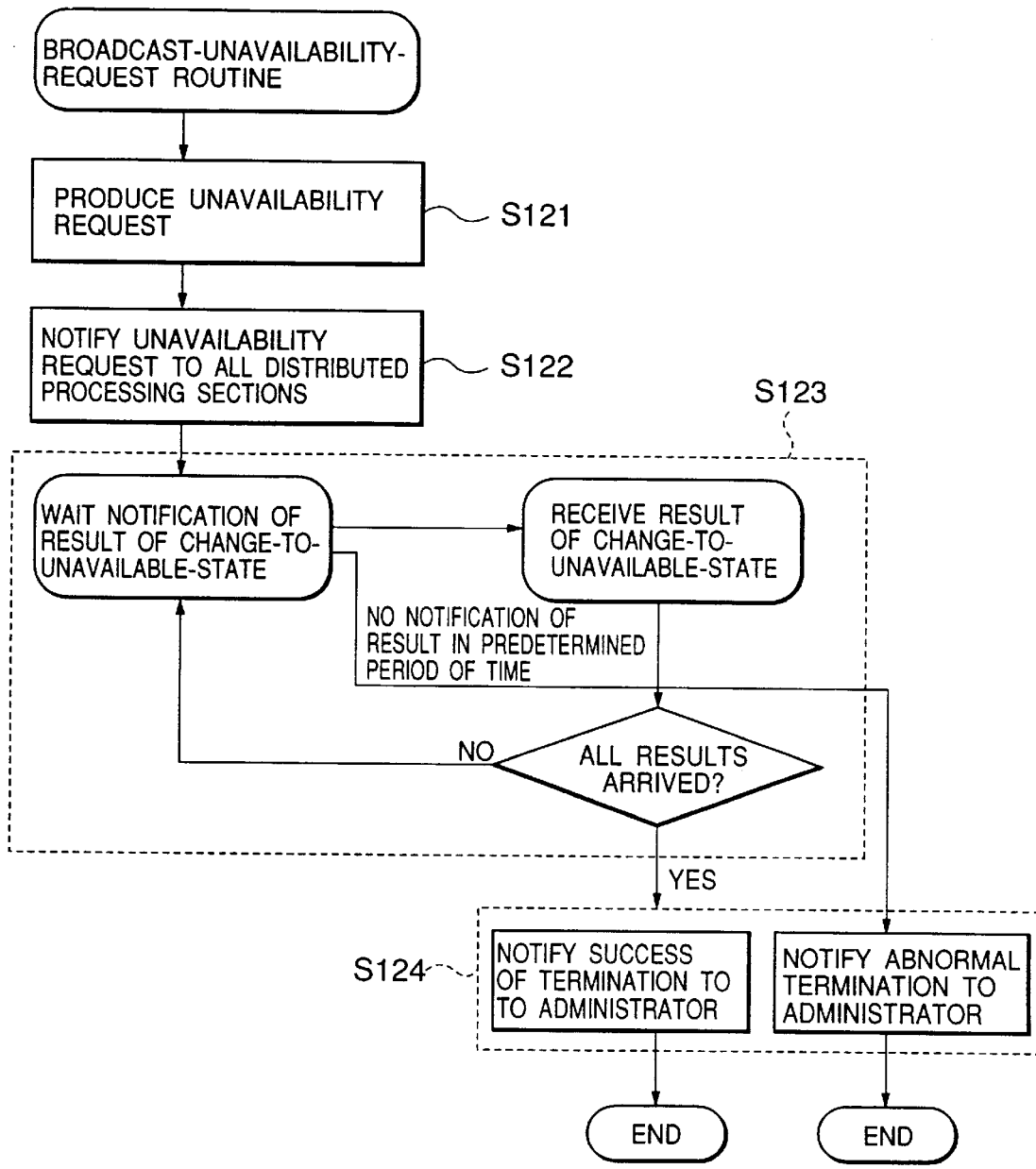
FIG. 19 is a flowchart showing an example of processing in broadcast-unavailability-request means 417.

The broadcast-unavailability-request means 417 is activated when it is confirmed that all secondary storage devices successfully changes to the standby state after the operation of the broadcast-standby-request means 416 in the general processing section 4. The broadcast-unavailability-request means 417 is implemented as a broadcast-unavailability-request routine for performing the processes, for example, as shown in FIG. 19. This routine performs the following processes:

Step S121: It produces an unavailability request including identification information for the file data storage structure based on identification information of the file data storage structure recorded in the general processing section.

Step S122: It notifies the produced unavailability request to all distributed processing section 5 running on the secondary storage device control processor.

Step S123: It waits until all results of change-to-unavailable-state instruction are notified. If all notifications are not received within a predetermined period, the process assumes it as an abnormal state, and notifies the administrator. In this case, the state of the file data structure becomes undetermined. The notification is output from the terminal T in the case of the multiprocessor computer system of FIG. 1.

Step S124: Since the result of individual notification can be only normal, when all results of notification arrive in step S123, it is determined to be normal, and the process notifies the administrator inputting the termination instruction of the successful termination. The notification is output from the terminal T in the case of the multiprocessor computer system of FIG. 1. In addition, in this case, if the general processing section 4 is a resident process, it records the fact that the file data storage structure becomes the unavailable state.

Change-to-unavailable-state Means 515

The change-to-unavailable-state means 515 is substantially same as the change-to-unavailable-state means 503 of FIG. 5. However, since the applicable secondary storage device has changed to the standby state, the change-to-unavailable-state means 515 only changes the state from the standby state to the unavailable state.

Broadcast-availability-request Means 418

Figure 20:
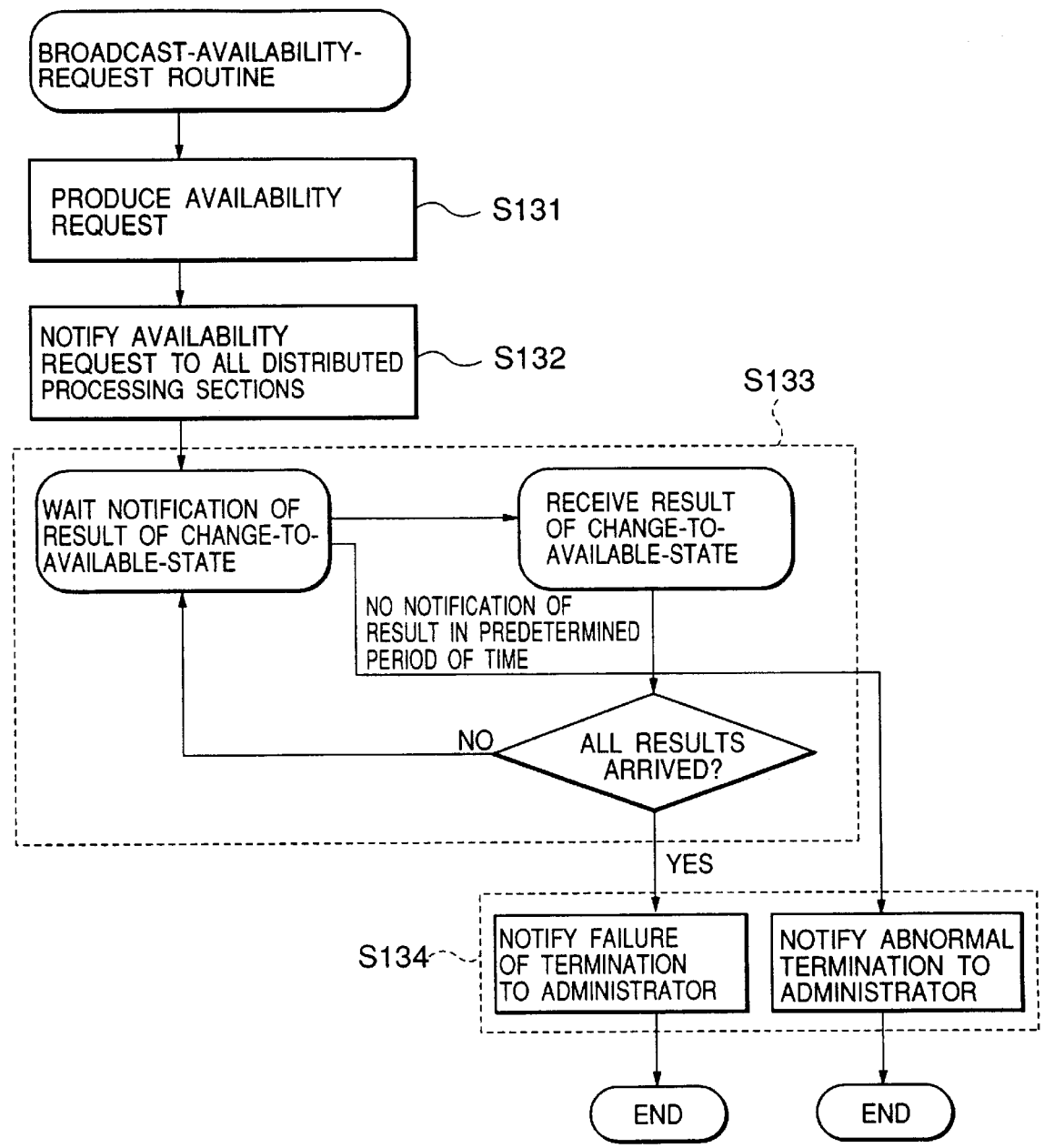
FIG. 20 is a flowchart showing an example of processing in broadcast-availability-request means 418.

The broadcast-availability-request means 418 is activated if an abnormal condition is detected in even part of the broadcast-standby-request after the operation of the broadcast-standby-request means 416. The broadcast-availability-request means 418 is implemented as a broadcast-availability-request routing for performing processes, for example, as shown in FIG. 20. This routine performs the following processes:

Step S131: It produces an availability request including identification information for the file data storage structure based on identification information of the file data storage structure recorded in the general processing section 4.

Step S132: It notifies the produced unavailability request to all distributed processing section 5 running on the secondary storage device control processor.

Step S133: It waits until all results of change-to-available-state instruction are notified. If all notifications are not received within a predetermined period, the process assumes it as an abnormal state, and notifies the administrator. In this case, the state of the file data structure becomes undetermined.

Step S134: Since the result of individual notification can be only normal, when all results of notification arrive in step S133, it is discriminated that all secondary storage devices change to the available state, and the process notifies the administrator inputting the termination instruction of the failed termination. In this case, the file data storage structure is in the available state. The notification is output from the terminal T in the case of the multiprocessor computer system of FIG. 1. In addition, if the general processing section 4 is a resident process, it records the fact that the file data storage structure becomes the available state.

Change-to-available-state Mean 516

The change-to-available-state mean 516 is substantially same as the change-to-available-state mean 502 of FIG. 5. However, it differs from the change-to-available-state mean 502 in that this means changes the state from the standby state to the available state.

Now, a third embodiment of the present invention will be described by referring to the drawings. A structure of this embodiment lies in that the user of the computer system can examine usage of the file data storage structure in the available state.

Figure 21:
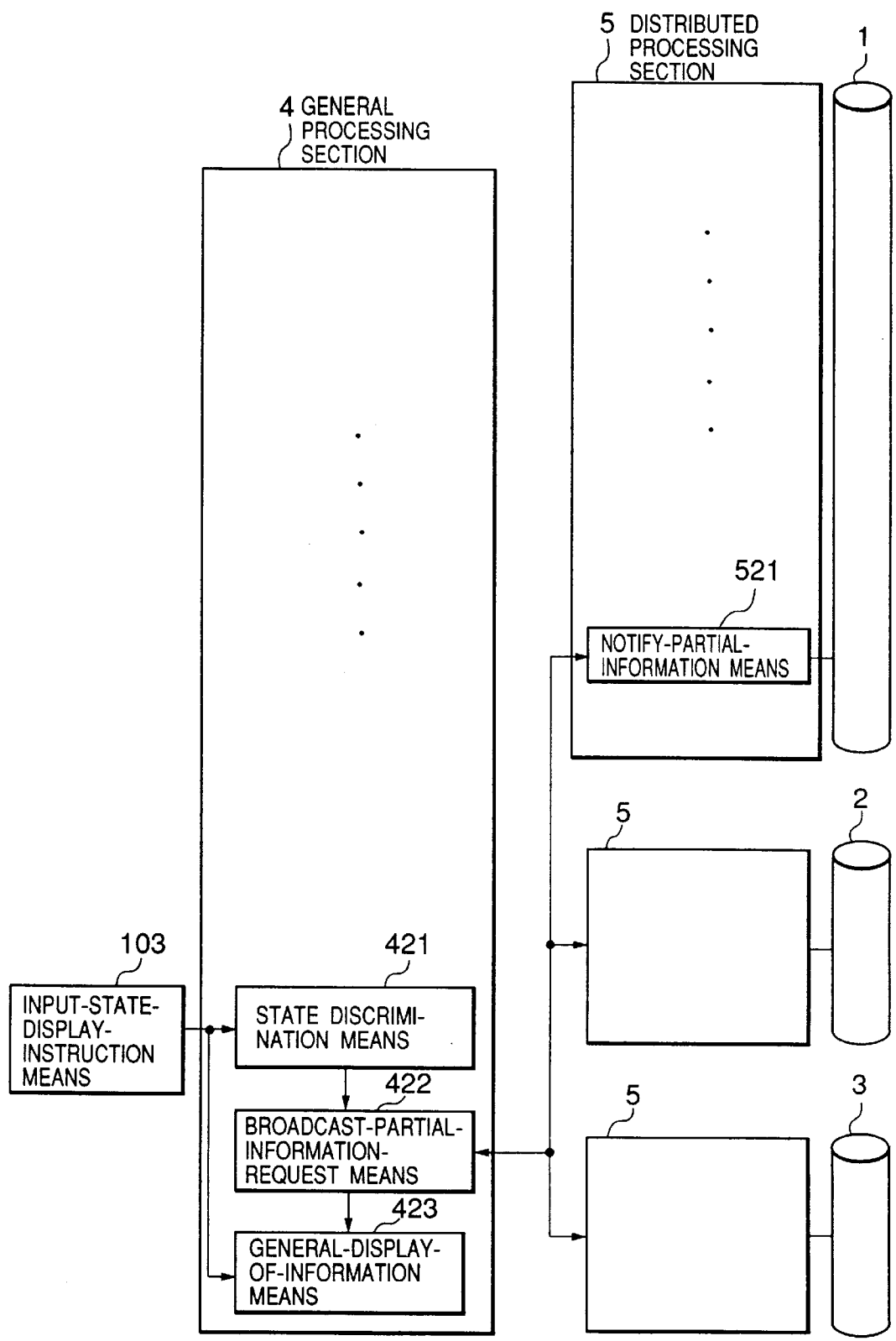
FIG. 21 is a block diagram of a third embodiment of the present invention.

Referring to FIG. 21, the general processing section 4 comprises state discrimination means 421, broadcast-partial-information-request means 422, and general-display-of-information means 423. Each of distributed processing sections 5 comprises notify-partial-information means 521. In addition, as means for providing an instruction to the general processing section 4, there is provided input-state-display-instruction means 103. All other components are same as those of the first or second embodiment, and not shown.

The input-state-display-instruction means 103 is an interface allowing the user of the computer system to examine usage of the file data storage structure. The user of the computer system uses the input-state-display-instruction means 103 to specify the file data storage structure that he or she examine usage. The state discrimination means 421 determines whether or not the file data storage structure is in the available state. If it is in the unavailable state, the process terminates here. If it is in the available state, the process is started to display the state.

The file data storage structure of the embodiment distributes and manages information on usage of the secondary storage devices across a plurality of secondary storage device control processor. Thus, it is necessary to collect and integrate distributed partial control information to one location before displaying it. The broadcast-partial-information-request means 422 operates at one location of the computer system, and issues a partial information request to all notify-partial-information means to collect distributed control information at one location. Thus, distributed partial control information is collected at a location. The notify-partial-information means 521 runs on each distributed processing section 5, extracts information for each secondary storage device as partial information, and notifies it to the requesting source. The general-display-of-information means 423 displays all partial information collected at one location as integrated information for presentation to the user in a format instructed by the user.

Now, the operation of the embodiment will be described.

When input is performed to the construction-instruction means 100, the input-start-up-instruction means 101, and the input-termination-instruction means 102, all of which are not shown, the operation is same as that in the first or second embodiment. When the user of the computer system instructs the input-state-display-instruction means 103 to display the state of file data storage structure with its display format, the state discrimination means 421 of the general processing section 4 determines whether the file data storage structure for which the user instruct to display its state is in the available state or the unavailable state at the moment. If it is in the available state, the broadcast-partial-information-request means 422 broadcasts a partial information request to all notify-partial-information means 521 of each distributed processing section 5. Each notify-partial-information means 521 receives the partial information request, extracts secondary storage devices belonging to the file data storage structure specified by the request, and notifies the requesting source of the usage of the secondary storage devices. The general-display-of-information means 423 integrates all partial information notified by the notify-partial-information means 521, and displays it on a user terminal in a format instructed by the input-state-display-instruction means 103.

Now, the operation of each component of this embodiment will be described in detail.

Input-state-display-instruction Means 103

The input-state-display-instruction means 103 is implemented in a form like a command in UNIX. This command is input from a terminal T in a case of a multiprocessor system of FIG. 1. Information specified together with a command includes identification information (name or the like) for the file data storage structure. After the command is input, the information is passed to the general processing section 4.

State Discrimination Means 421

The state discrimination means 421 is substantially same as the state discrimination means 402 shown in FIG. 5. However, it differs in the following point. If the file data storage structure is in the unavailable state, the state discrimination means 421 notifies it to the user inputting the state display instruction, and terminates the process. If the file data storage structure is in the available state, the state discrimination means 421 activates the broadcast-partial-information-request means 422. The notification is output from the terminal T in the case of the multiprocessor computer system of FIG. 1.

Broadcast-partial-information-request Means 422

Figure 22:
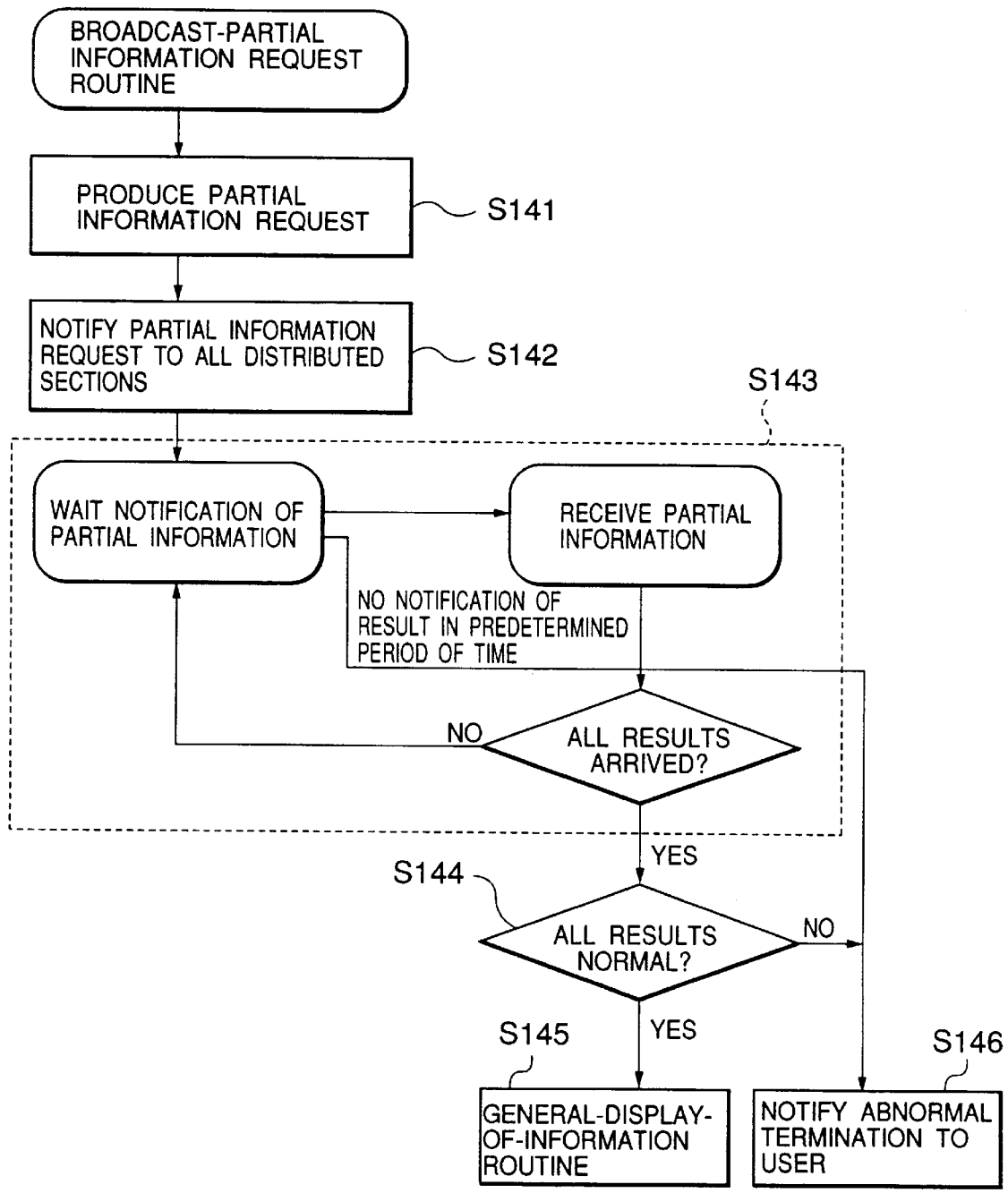
FIG. 22 is a flowchart showing an example of processing in broadcast-partial-information-request means 422.

The broadcast-partial-information-request means 422 is implemented as a broadcast-partial-information-request routine for performing a process as shown in FIG. 22. This performs the following processes:

Step S141: It produces a partial information request based on identification information passed from the input-state-display-instruction means 103.

Step S142: It notifies the produced common control data request to all distributed processing sections 5 running on the secondary storage device control processor.

Step S143: It wait until all partial information are notified. If all notifications are not received within a predetermined period, the process jumps to step S146 and causes abort.

Step S144: It checks to see whether or not all partial information are successfully returned.

Step S145: If the result of check in step S144 reveals that all partial information are successfully returned, it activates a general-display-of-information routine (general-display-of-information means 423).

Step S146: If an abnormal state is detected in step S143 or S144, it notifies the user inputting the state display instruction of detection of the abnormal state, and terminates. The notification is output from the terminal T in the case of the multiprocessor computer system of FIG. 1.

Notify-partial-information Means 521

Figure 23:
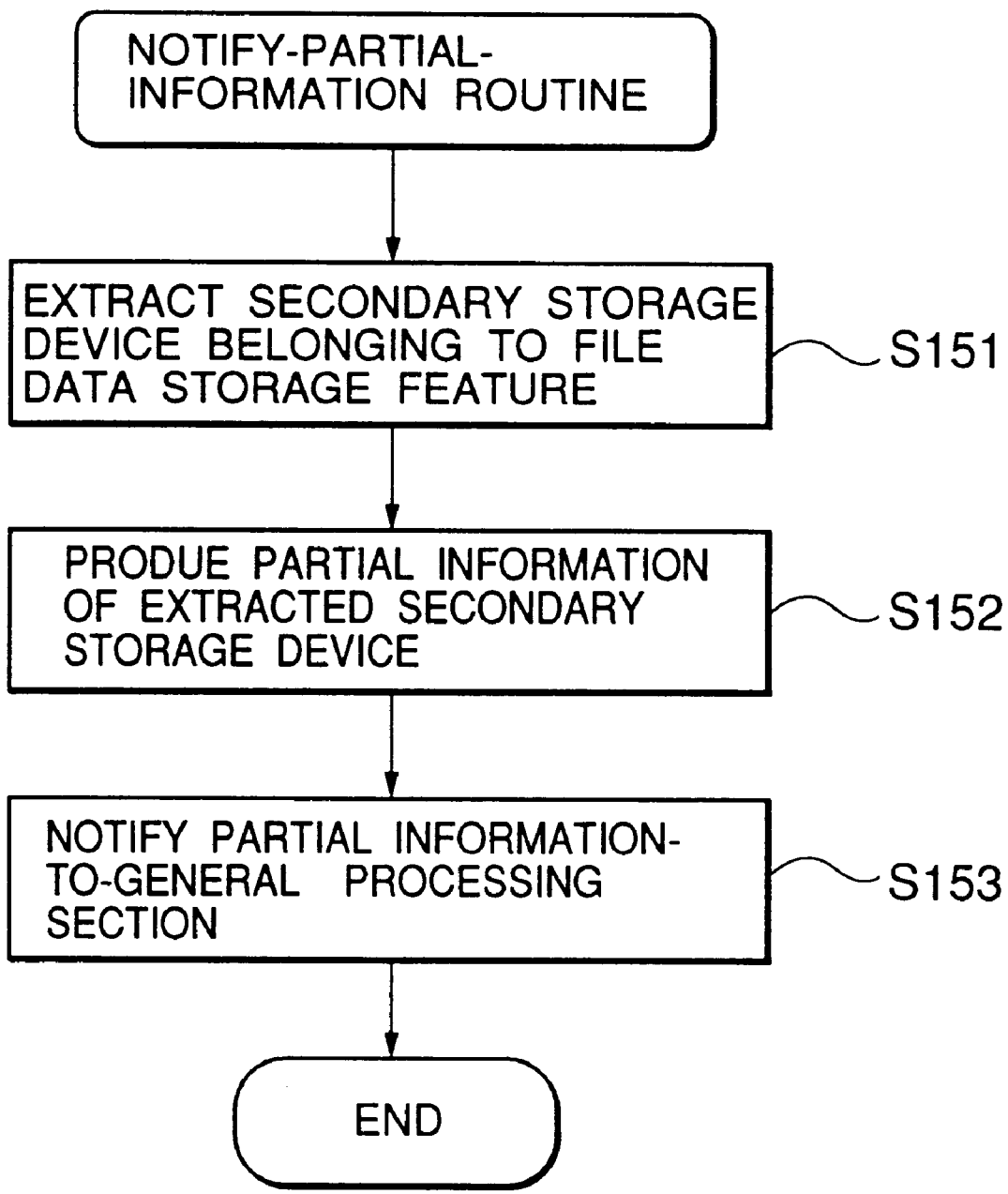
FIG. 23 is a flowchart showing an example of processing in notify-partial-information means 521.

The notify-partial-information means 521 is implemented as a notify-partial-information routine for performing a process as shown in FIG. 23. This performs the following processes:

Step S151: It retrieves identification information contained in the partial information request issued from the broadcast-partial-information-request means 422, and compares it with the control data of each secondary storage device, thereby extracting the second storage devices belonging to the requested file data storage structure.

Step S152: It retrieves necessary data (a partial file control data, an unused block control list, or the like) from the control data for each secondary storage device retrieved in step S151, and produces partial information on the file data storage structure.

Step S153: It notifies the partial information produced in step S152 to the requesting general processing section.

General-display-of-information Means 423

The general-display-of-information means 423 is activated when all partial information is successfully returned in the broadcast-partial-information-request means 422. The general-display-of-information means 423 is implemented by a routine for editing and displaying the partial information in a display format passed from the input-state-display-instruction means 103.

Now, a fourth embodiment of the present invention will be described by referring to the drawings. A data structure may be destroyed by some reason during operation. A structure of this embodiment lies in that the administrator of the computer system can examine whether or not the data structure is normal in the file data storage structure.

Figure 24:
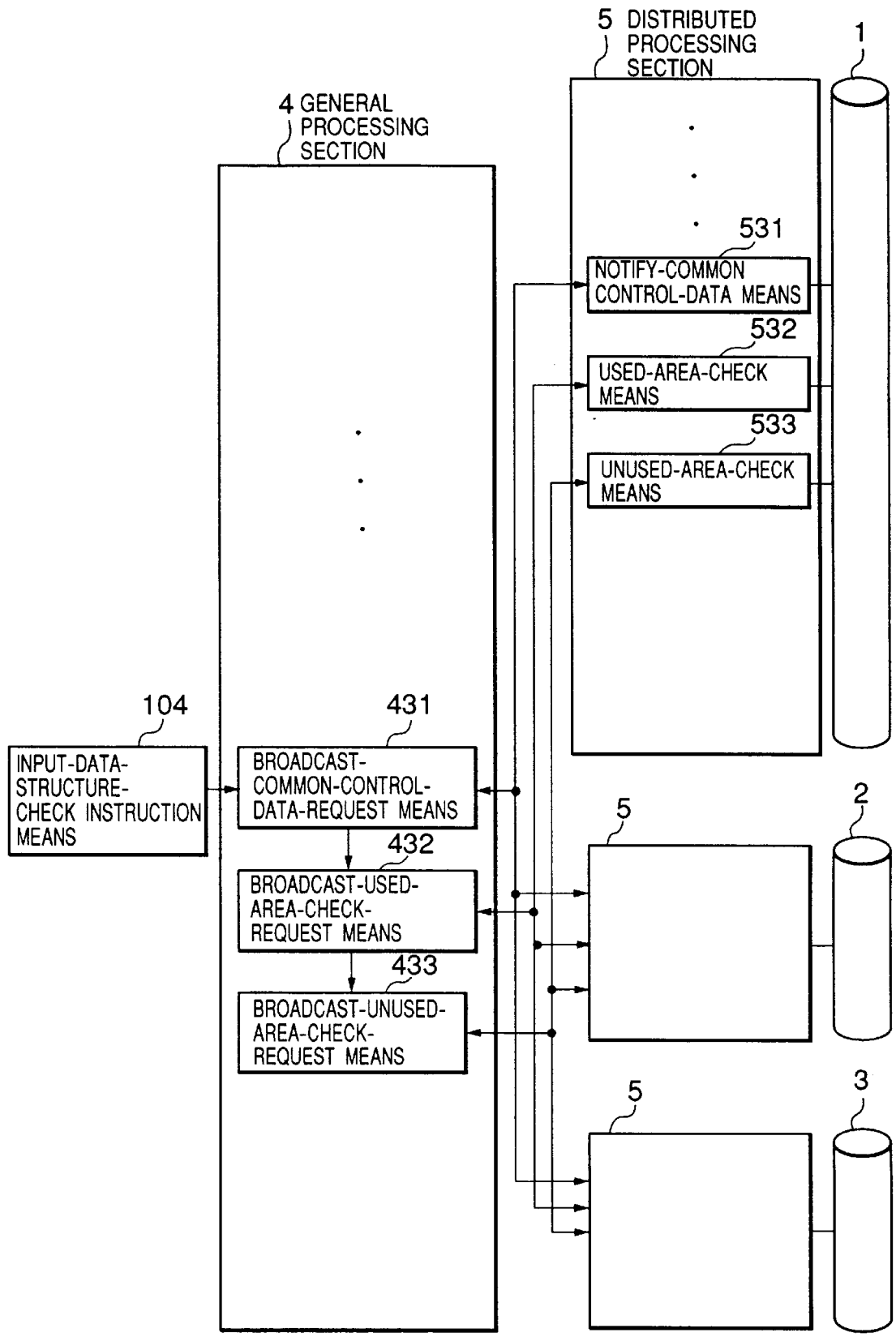
FIG. 24 is a block diagram of a fourth embodiment of the present invention.

Referring to FIG. 24, the general processing section 4 comprises broadcast-common-control-data-request means 431, broadcast-used-area-check-request means 432, and broadcast-unused-area-check-request means 433. Each of distributed processing section 5 comprises notify-common-control-data means 531, used-area-check means 532, and unused-area-check means 533. In addition, as means for providing an instruction to the general processing section 4, there is provided input-data-structure-check-instruction means 104. All other components are same as those of the first or second embodiment, and not shown.

The input-data-structure-check-instruction means 104 is an interface allowing the administrator of the computer system to check the state of data structure in the file data storage structure. The administrator of the computer system uses the input-data-structure-check-instruction means 104 to specify the file data storage structure that is checked for the state of data structure.

The data structure of the file data storage structure of this embodiment is a collection of partial data structures distributed across a plurality of secondary storage devices. The partial data structure contains common control data common to all secondary storage devices, and individual control data different to each secondary storage device. Procedure for checking the state of such data structure begins with first examining whether or not the common control data is normal. To this end, the common control data are collected and collated at one location. For example, since the common control data on each secondary storage device contains the name of file data storage structure, it is examined whether or not these names are matched each other. In addition, for an arrangement where the number of secondary storage devices constituting the file data storage structure is included in the common control data on each secondary storage device, it is checked whether or not these numbers are matched each other, and whether or not the actual number of secondary storage devices constituting the file data storage structure matches the number of secondary storage devices described in the common control data.

Following checking of the common control data, checking is conducted on the individual control data different for each secondary storage device. This process is parallel processes independently performed on each secondary storage device.

The notify-common-control-data means 531 runs on each distributed processing section 5. When it receives a common control data request, it extracts the common control data out of the partial data structure of each secondary storage device, and notifies it to the requesting source. The broadcast-common-control-data-request means 431 runs on one location in the computer system, and notifies a common control data request to all notify-common-control-data means 531. Since all notify-common-control-data means 531 returns common control data to the notification of request, the common control data would be collected at one location. The common control data collected at one location is checked by the broadcast-common-control-data-request means 431.

Checking of common control data for the data structure completes with the above. Then, the procedure proceeds to checking of individual control data different for each secondary storage device. In checking the individual control data different for each secondary storage device, it checks overlapping of used areas between files, and each unused area. Overlapping of used areas between files represents a state where a same storage area is used for storing data of separate files. This is an abnormal state that should not occur. This is first checked.

The used-area-check means 532 runs on each distributed processing section 5, and checks whether or not a same area is used by files upon receipt of a used-area-check request. Since this process is independent for each used-area-check means 532, checking can be performed in parallel on separate distributed processing sections 5. The broadcast-used-area-check-request means 432 runs on one location in the computer system, and broadcasts a used-area-check request to all used-area-check means 532. This enables all used-area-check means 532 to start checking simultaneously. That is, checking on overlapping of area between files is performed in parallel on the distributed processing sections 5, so that processing time is shortened as the number of distributed processing sections 5 is increased.

Following the checking on overlapping of area between files, an unused area is started to be checked. The unused area is an area not used by any file for storing data. In a state where the file data storage structure is in an abnormal condition, there may arise a situation where an area controlled as unused is used for storing data of a file.

The unused-area-check means 533 runs on each distributed processing section 5, and checks to see whether or not there is any conflict in unused areas. Since this process is independent for each unused-area-check means 533, checking can be performed for the unused area in parallel on separate distributed processing sections 5. The broadcast-unused-area-check-request means 433 runs on one location in the computer system, and broadcasts an unused-area-check request to all unused-area-check means 533. This enables all unused-area-check means 533 to start checking simultaneously. That is, checking on conflict between unused areas is performed in parallel on the distributed processing sections 5, so that processing time is shortened as the number of distributed processing sections 5 is increased.

Now, the operation of the embodiment will be described.

When input is performed to the construction-instruction means 100, the input-start-up-instruction means 101, and the input-termination-instruction means 102, all of which are not shown, the operation is same as that in the first or second embodiment. When the administrator of the computer system instructs the input-data-structure-check-instruction means 104 to check the data structure of the file data storage structure, the broadcast-common-control-data-request means 431 broadcasts a common control data request to the notify-common-control-data means 531 of each distributed processing section 5. Each notify-common-control-data means 531 receives the common control data request, and notifies the requesting source of the common control data on the secondary storage devices belonging to the file data storage structure specified by the request. Upon receipt of the notification, the broadcast-common-control-data-request means 431 checks all common control data, and notifies the result to the administrator of the computer system.

If all common control data are normal, the broadcast-used-area-check-request means 432 is activated, and broadcasts a used area check request to the used-area-check means 532 of each distributed processing section 5. Each used-area-check means 532 receives the used area check request, checks the used area in each file for the data storage area on the secondary storage devices belonging to the file data storage structure specified by the request, and notifies the result of check to the requesting source. The broadcast-used-area-check-request means 432 integrates these results of check, and notifies it to the administrator.

Furthermore, if there is no abnormal state in all results of check on used area, the broadcast-unused-area-check-request means 433 is activated, and broadcasts an unused area check request to the unused-area-check means 533 of each distributed processing section 5. Each unused-area-check means 533 receives the unused area check request, checks information managing unused areas for the data storage area on secondary storage devices belonging to the file data storage structure specified by the request, and notifies the result of check to the requesting source. The broadcast-unused-area-check-request means 433 integrates these results of check, and notifies it to the administrator.

Now, the operation of each component of this embodiment will be described in detail.

Input-data-structure-check-instruction Means 104

The input-data-structure-check-instruction means 104 is implemented in a form like a command in UNIX. This command is input from a terminal T in a case of a multiprocessor system of FIG. 1. Information specified together with the command is identification information for the file data storage structure (name or the like). After the command is input, the information is passed to the general processing section 4.

Broadcast-common-control-data-request Means 431

Figure 25:
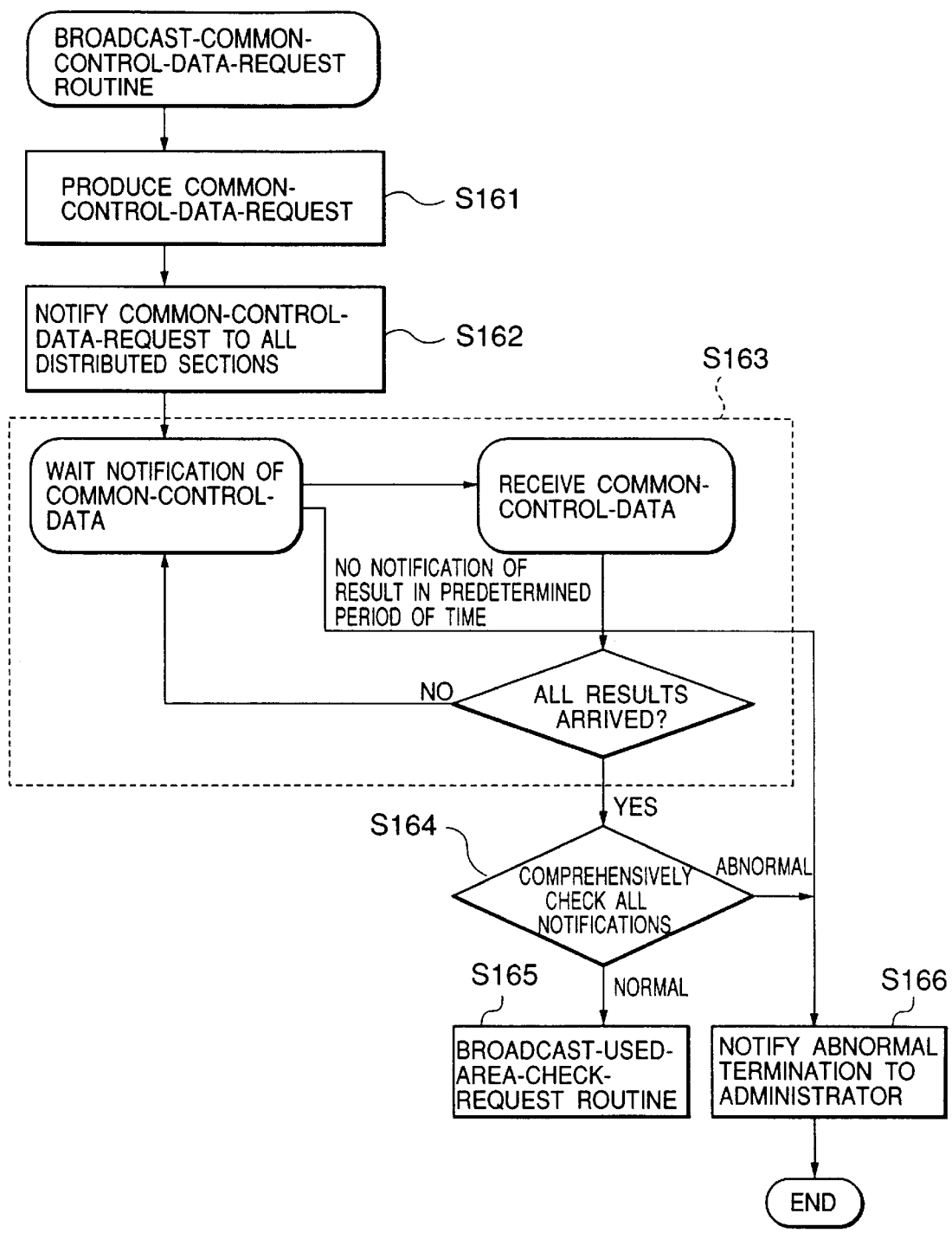
FIG. 25 is a flowchart showing an example of processing in broadcast-common-control-data-request means 431.

The broadcast-common-control-data-request means 431 is activated when identification information of the file data storage structure is passed from the command implementing the input-data-structure-check-instruction means 104. The broadcast-common-control-data-request means 431 is implemented as a broadcast-common-control-data-request routine for performing the processes, for example, as shown in FIG. 25. This routine performs the following processes:

Step S161: It produces a common control data request including identification information for the file data storage structure based on identification information of the file data storage structure passed from the input-data-structure-check-instruction means 104. The identification information of the file data storage structure is recorded in the general processing section 4 for the subsequent process.

Step S162: It notifies the produced common control data request to all distributed processing sections 5 running on the secondary storage device control processor.

Step S163: It waits until all common control data are notified. If all notifications are not received within a predetermined period, the process proceeds to step S166, and causes abort.

Step S164: It checks all common control data notified in step S163. Here, all secondary storage devices are checked for information to be matched (identification information of the file data storage structure or the like), and the total number of secondary storage devices.

Step S165: If the result in step S164 reveals that the common control data is normal, it activates a broadcast-used-area-check-request routine (broadcast-used-area-check-request means 432).

Step S166: When an abnormal condition is detected in step S163 or S164, it notifies the administrator inputting a check-data-structure instruction of the fact that there is an abnormal condition, and terminates. The notification is output from the terminal T in the case of the multiprocessor computer system of FIG. 1.

Notify-common-control-data Means 531

Figure 26:
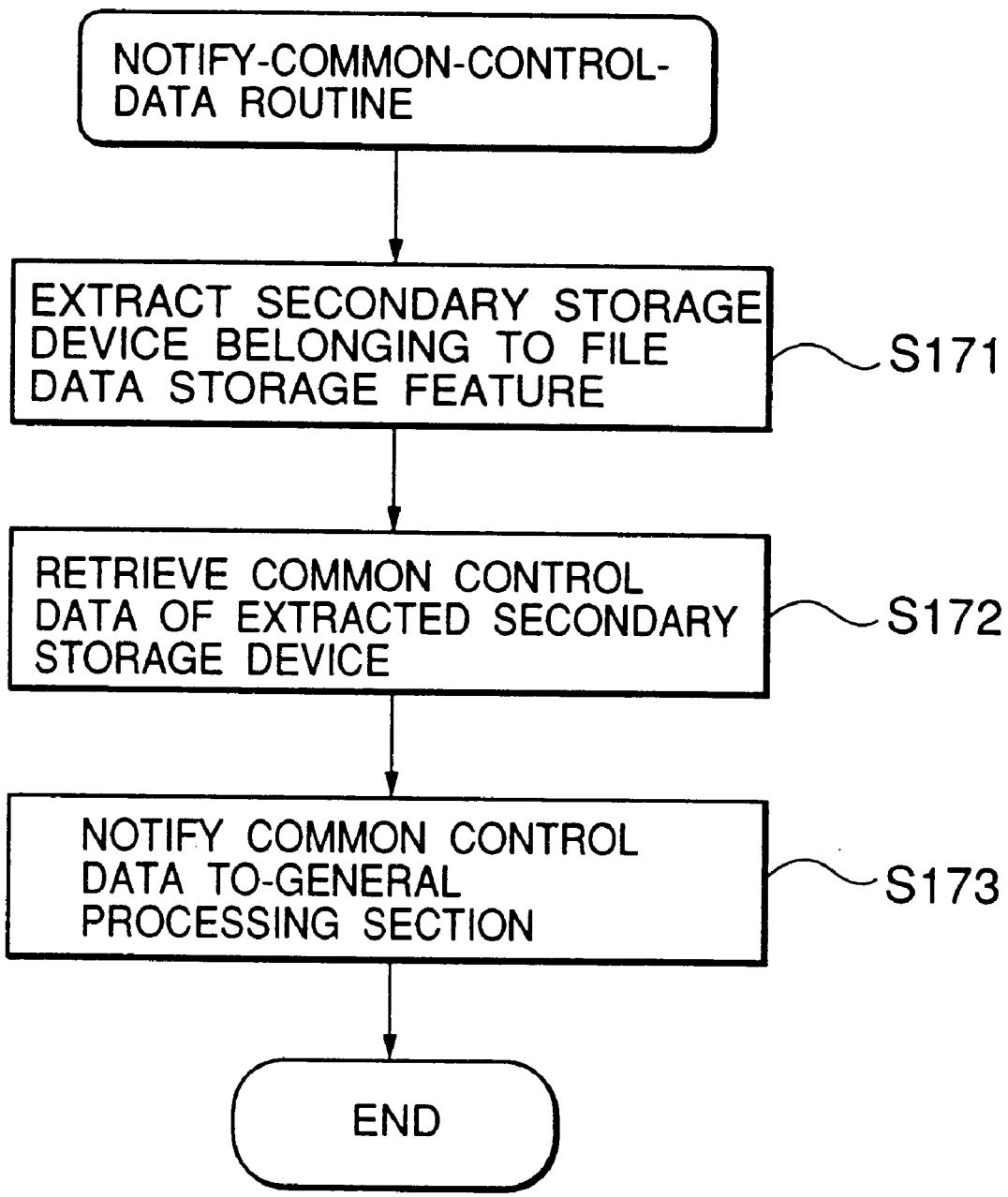
FIG. 26 is a flowchart showing an example of processing in notify-common-control-data means 531.

The notify-common-control-data means 531 is implemented as a notify-common-control-data routine for performing processes, for example, as shown in FIG. 26. This routine performs the following processes:

Step S171: It retrieves identification information contained in a common control data issued from the broadcast-common-control-data-request means 431 of the general processing section 4, and compares it with the control data read out from the secondary storage device, thereby extracting a secondary storage device belonging to the requested file data storage structure.

Step S172: For each secondary storage device extracted in step S171, it extracts the common control data from its control data.

Step S173: It notifies the requesting general processing section 4 of the common control data.

Broadcast-used-area-check-request Means 432

Figure 27:
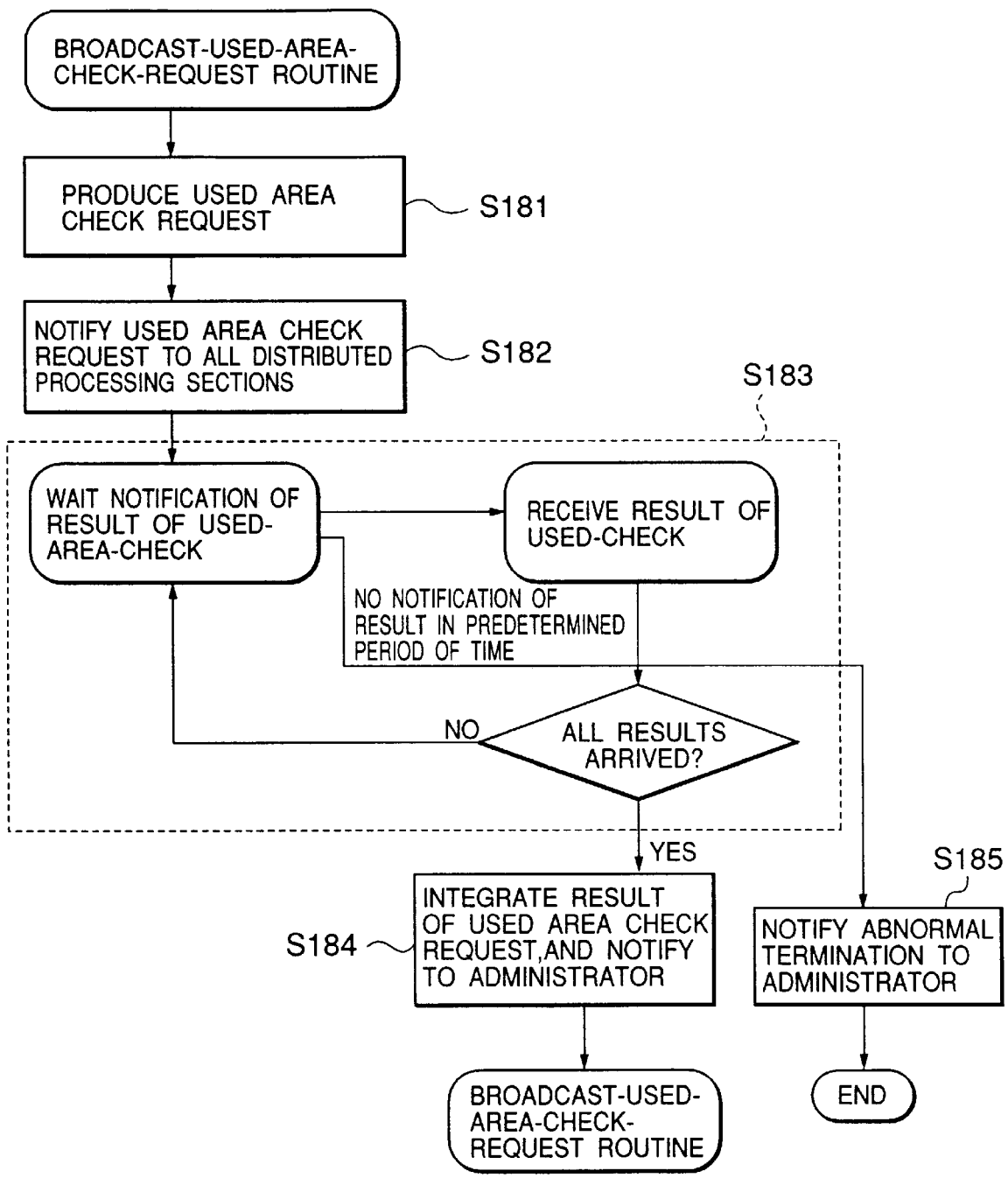
FIG. 27 is a flowchart showing an example of processing in broadcast-used-area-check-request means 432.

The broadcast-used-area-check-request means 432 is activated when a normal condition is confirmed after operation of the broadcast-common-control-data-request means 431 in the general processing section 4. The broadcast-used-area-check-request means 432 is implemented as a broadcast-used-area-check-request routine for performing the processes, for example, as shown in FIG. 27. This routine performs the following processes:

Step S181: It produces a used area check request including identification information for the file data storage structure based on identification information of the file data storage structure recorded in the general processing section 4.

Step S182: It notifies the produced used area check request to all distributed processing sections 5 running on the secondary storage device control processor.

Step S183: It wait until all results of used area check are notified. If all notifications are not received within a predetermined period, the process jumps to step S185 and causes abort.

Step S184: After all results of used area check request are received in step S183, it integrates the content of results of used area check after all results of used area check are received in step S183. It notifies the administrator inputting the data structure check instruction of information such as in which file the used area overlaps. The notification is output from the terminal T in the case of the multiprocessor computer system of FIG. 1. Then, it activates the broadcast-unused-area-check-request routine (broadcast-unused-area-check-request-means 433).

Step S185: If step S183 determines that all results are not notified, it notifies the administrator inputting the data structure check instruction of occurrence of an abnormal state, and terminates the process. The notification is output from the terminal T in the case of the multiprocessor computer system of FIG. 1.

Used-area-check Means 532

Figure 28:
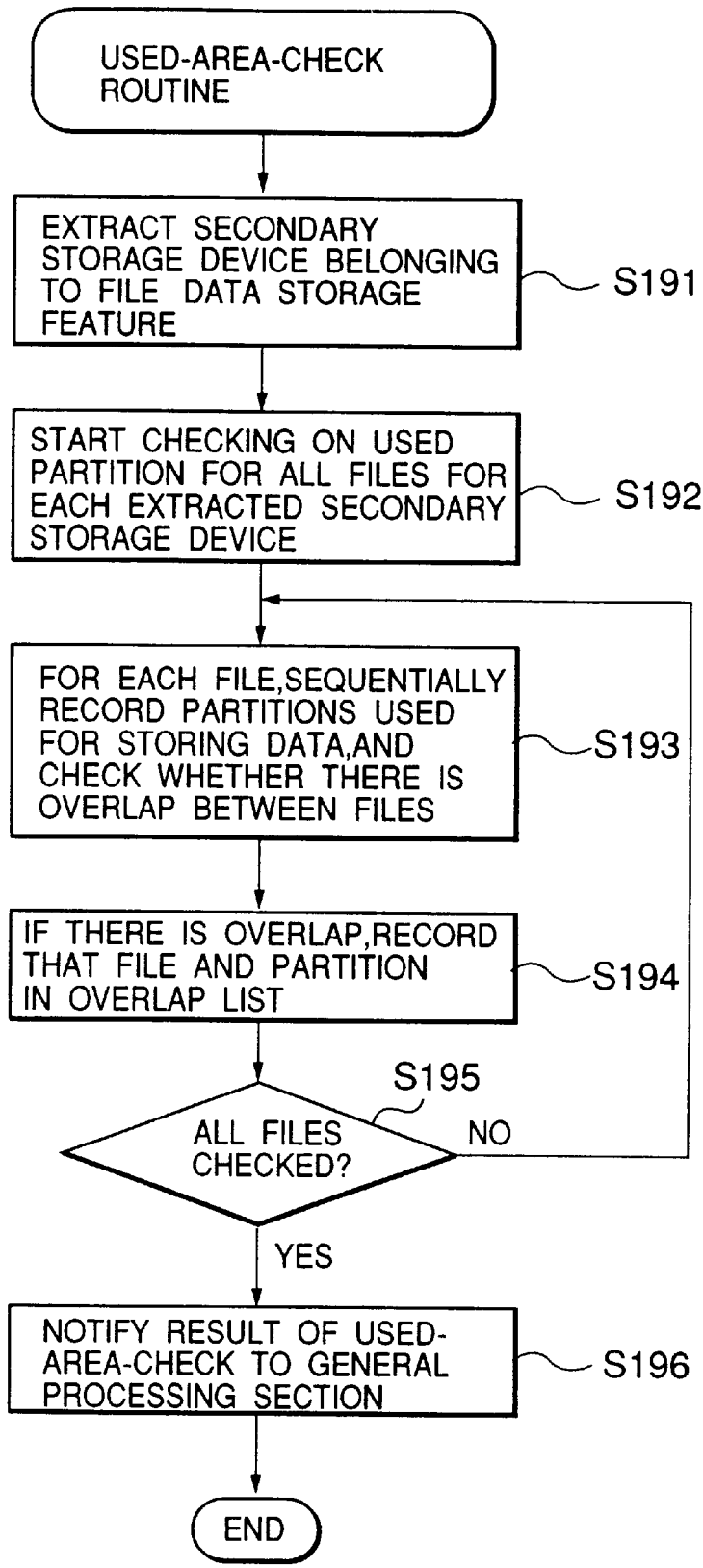
FIG. 28 is a flowchart showing an example of processing in used-area-check means 532.

The used-area-check means 532 is implemented as a used-area-check routine for performing processes, for example, as shown in FIG. 28. This routine performs the following processes:

Step S191: It retrieves identification information contained in the used area check request issued from the broadcast-used-area-check-request means 432, and compares it with the control data of each secondary storage device, thereby extracting a secondary storage device belonging to the requested file data storage structure.

Step S192: For the secondary storage device extracted in step S191, it starts the block check process performed in the following steps S193 and S194 for each file.

Step S193: It checks the partial file control data for each file to see whether or not a block used for storing data of the file is used by other file in overlap. The method for check includes to prepare an overlap control array for recording overlap state for each block. It checks a file, and updates a value of corresponding area in the overlap control array for a used block, whereby whether or not there is overlapped use can be discriminated by a value after update. The overlap control array is recorded in the distributed processing section 5 while the data structure is being checked.

Step S194: If there is overlapped use in step S193, it adds that file and block in an overlapped file list and an overlapped block list, respectively.

Step S195: It assures whether or not all files are checked. If check does not complete on all files, then it repeats the block check in steps S193 and S194.

Step S196: It notifies the requesting general processing section 4 of the overlapped file list as the result of used area check. The overlap control array, the overlapped file list and the overlapped block list are recorded in the distributed processing section 5 while the data structure is being checked.

Broadcast-unused-area-check-request Means 433

Figure 29:
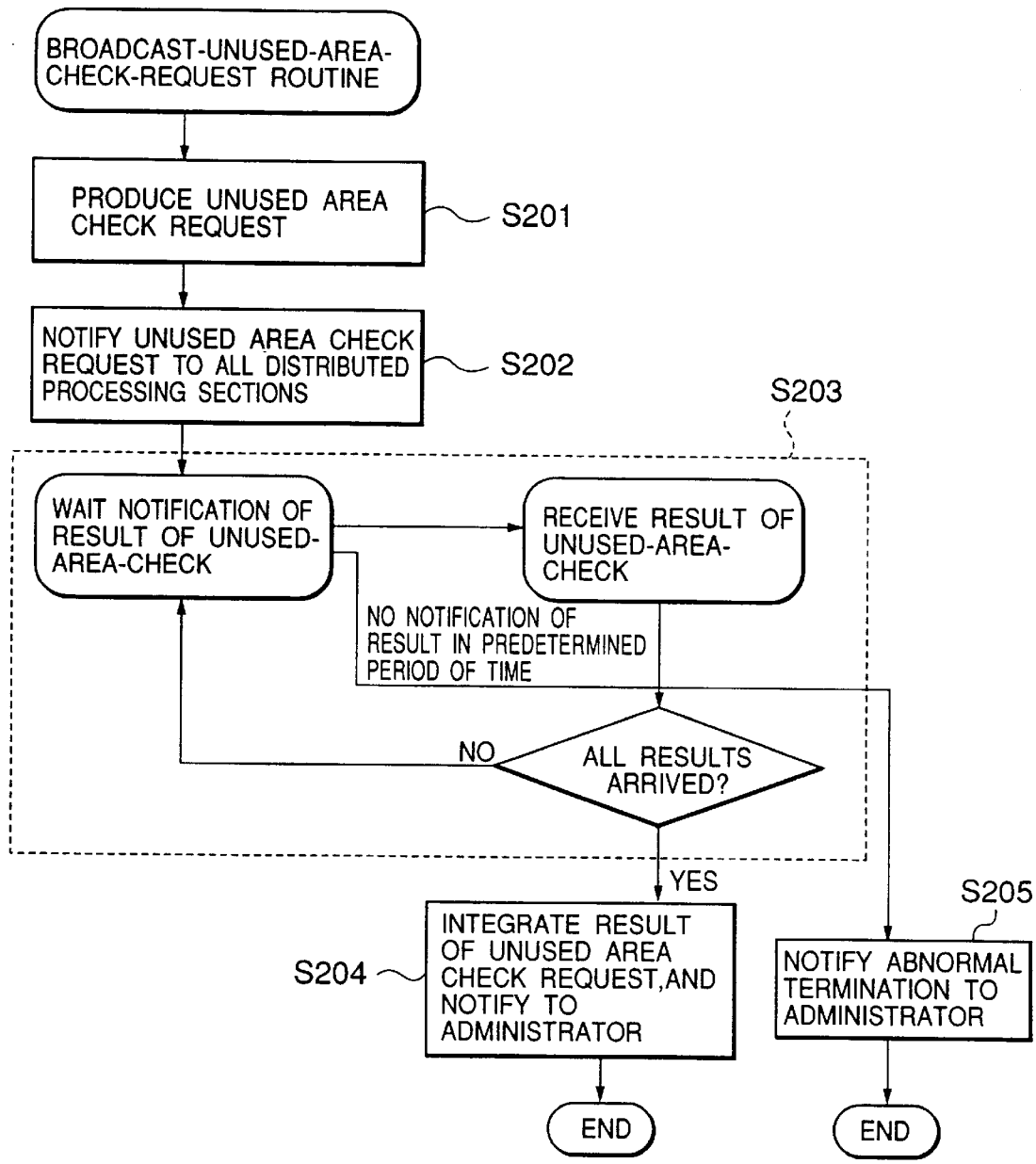
FIG. 29 is a flowchart showing an example of processing in broadcast-unused-area-check-request means 433.

The broadcast-unused-area-check-request means 433 is activated after all results of used area check are integrated and displayed in the broadcast-used-area-check-request means 432 in the general processing section 4. The broadcast-unused-area-check-request means 433 is implemented as a broadcast-unused-area-check-request routine for performing the processes, for example, as shown in FIG. 29. This routine performs the following processes:

Step S201: It produces an unused area check request including identification information of file data storage structure based on identification information recorded in the general processing section 4.

Step S202: It notifies the produced unused area check request to all distributed processing sections 5 running on the secondary storage device control processor.

Step S203: It wait until all results of unused area check are notified. If all notifications are not received within a predetermined period, the process jumps to step S205 and causes abort.

Step S204: It integrates the content of results of unused area check after all results of unused area check are received in step S203. Consequently, it terminates after notifying the administrator inputting the data structure check instruction of information such as whether a data structure controlling an unused area has an abnormal condition. The notification is output from a terminal T in a case of a multiprocessor system of FIG. 1.

Step S205: When it is discriminated in step S203 that all notifications of result are not received, it notifies the administrator inputting the data structure check instruction of the detail of abnormal condition. The notification is output from a terminal T in a case of a multiprocessor system of FIG. 1.

Unused-area-check Means 533

Figure 30:
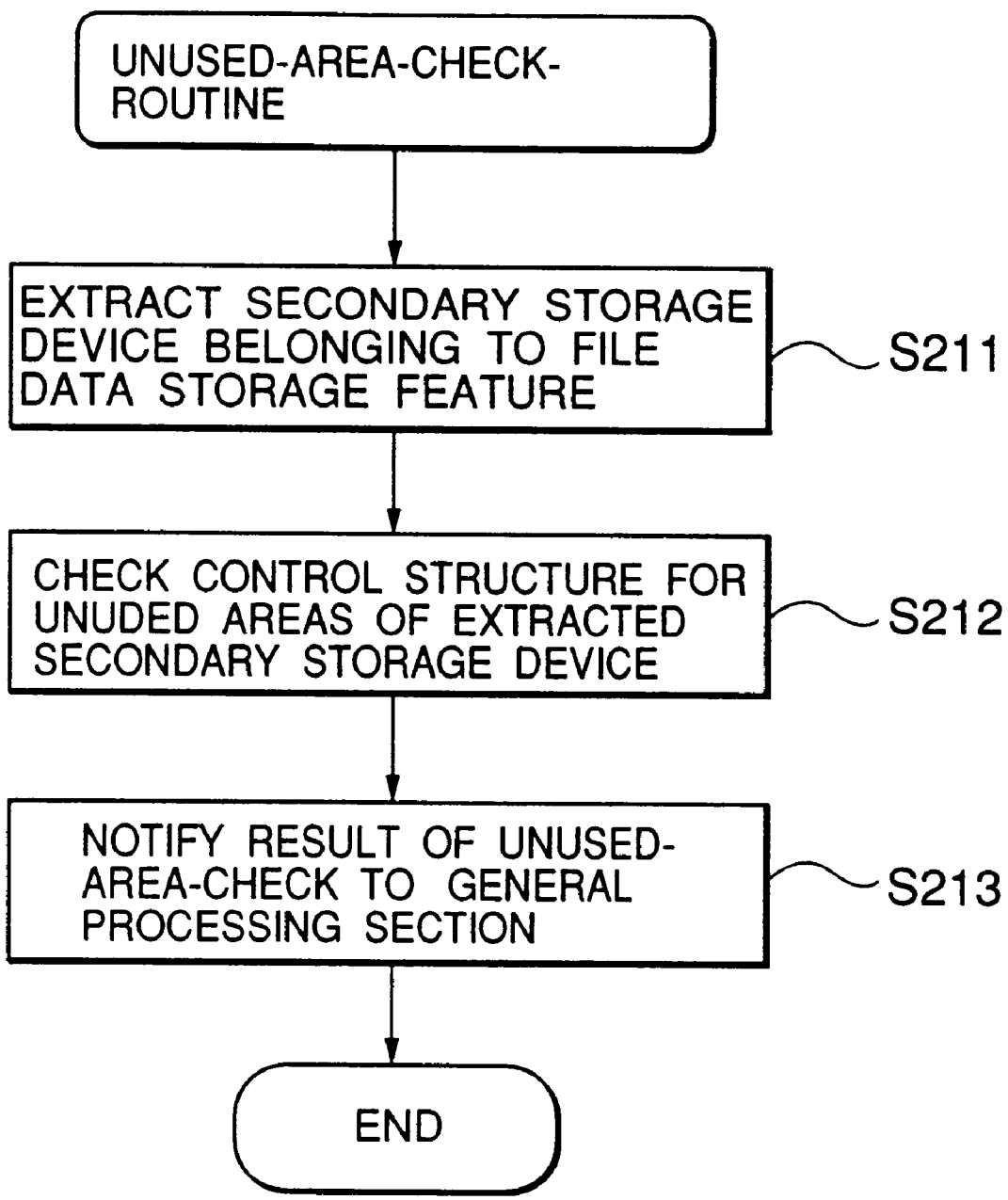
FIG. 30 is a flowchart showing an example of processing in unused-area-check means 533.

The unused-area-check means 533 is implemented as a unused-area-check routine for performing the processes, for example, as shown in FIG. 30. This routine performs the following processes:

Step S211: It retrieves identification information contained in the unused area check request issued from the broadcast-unused-area-check-request means 433, and compares it with the control data of each secondary storage device, thereby extracting the second storage devices belonging to the requested file data storage structure.

Step S212: It retrieves for the secondary storage device extracted in step S211 an overlap control array that records the overlap state of block in the used-area-check means 532. By matching it with the unused block control list, it checks a block that, although it is a block used by some file, is controlled as an unused block, or a block that, although it is not used by any file, is not controlled as an unused area.

Step S213: It notifies the result of unused area check in step S212 to the requesting general processing section 4. The notification is received by step S203 of the broadcast-unused-area-check-request means 433 in FIG. 29.

While this embodiment employs an arrangement where the process terminates without performing the used area check and the unused area check if there is an abnormal condition in the common control data, it may be possible to perform the used area check and the unused area check regardless of whether or not there is an abnormal condition in the common control data. In addition, while this embodiment employs an arrangement where the process terminates without performing the unused area check if an abnormal condition is detected in the used area check, it may be possible to perform the unused area regardless of whether or not an abnormal condition is detected in the used area check.

Now, a fifth embodiment of the present invention will be described by referring to the drawings. A data structure in the file data storage structure may be destroyed by some reason during operation. The administrator of the computer system is necessary to recover the data structure in the file data storage structure. A structure of this embodiment enables it to perform such recovery of the data structure.

Figure 31:
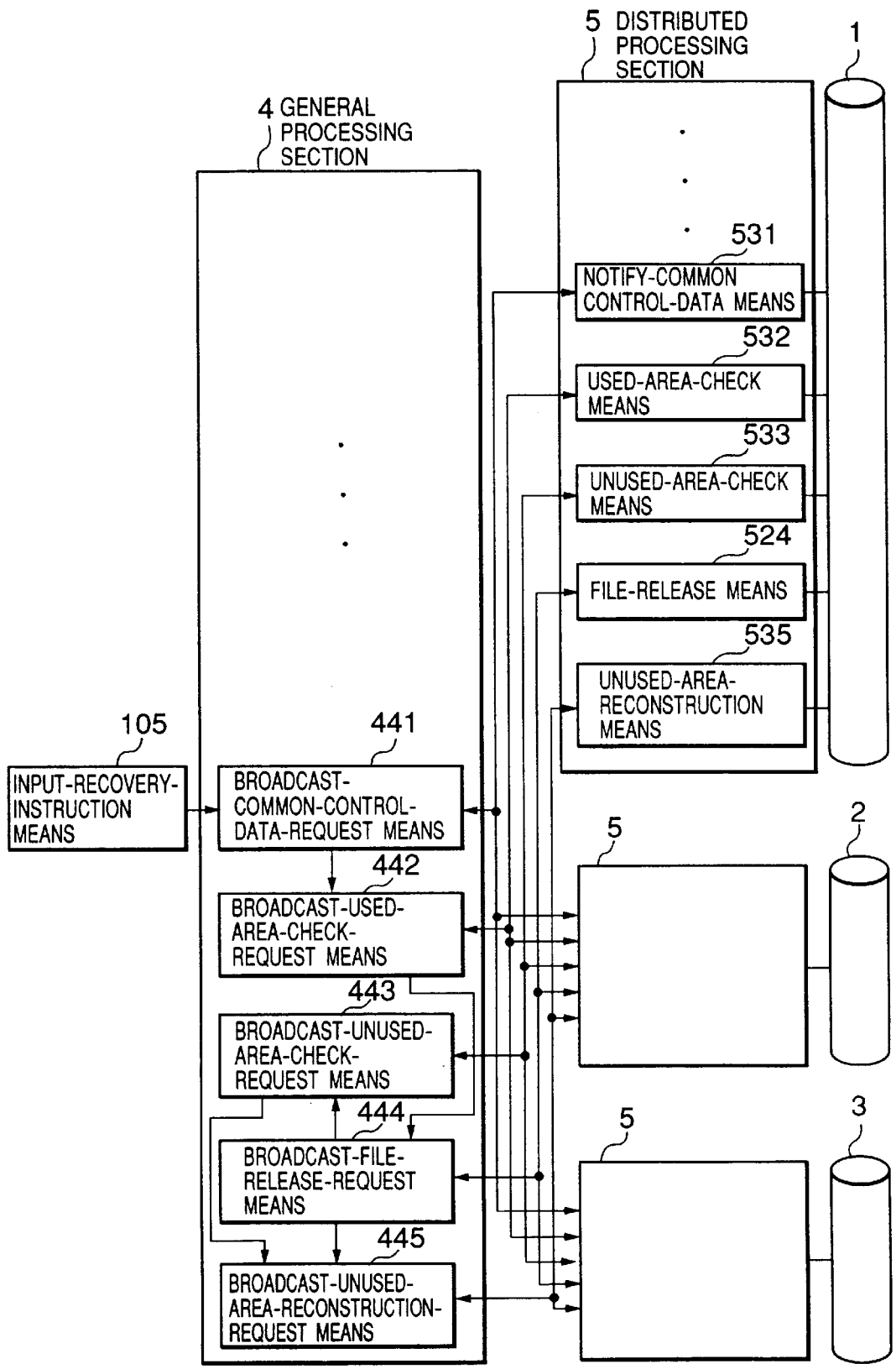
FIG. 31 is a block diagram of a fifth embodiment of the present invention.

Referring to FIG. 31, the general processing section 4 comprises broadcast-common-control-data-request means 441, broadcast-used-area-check-request means 442, broadcast-unused-area-check-request means 443, broadcast-file-release-request means 444, and broadcast-unused-area-reconstruction-request means 445. Each of the distributed processing sections 5 comprises notify-common-control-data means 531, used-area-check means 532, unused-area-check means 533, file-release means 534, and unused-area-reconstruction means 535. As means for providing an instruction to the general processing section 4, there is provided input-recovery-instruction means 105. All other components are same as those of the first or second embodiment, and not shown.

The input-recovery-instruction means 105 is an interface allowing the administrator of the computer system to recover a data structure of the file data storage structure. The administrator uses the input-recovery-instruction means 105 to specify a file data structure that he or she wants to recover a data structure if it is destroyed.

This embodiment checks what abnormal state the data structure exhibits, and recovers it accordingly. Therefore, it performs similar checking to the fourth embodiment, and takes several recovery methods according to each state detected. In addition, it recovers independently and in parallel partial data structures distributed across a plurality of secondary storage devices by using a plurality of secondary storage device control processors.

The broadcast-used-area-check-request means 442 and the used-area-check means 532 checks whether or not there is overlap on a used area between files. When this check reveals an abnormal state, it is necessary to release the situation where the same area is used between files. Thus, for files participating in overlapped use, this embodiment sequentially releases all areas used by these files so that they cannot be used as the areas for them. In this manner, it finally brings to a state where only one file can use these areas. The broadcast-used-area-check-request means 442 and the used-area-check means 532 concentrate to one location in the computer system information on which files use an area in overlap. In this case, the embodiment activates the broadcast-file-release-request means 444 that runs on one location in the computer system, and broadcasts a file release request on files required to be released to all file-release means 534. Then, each file-release means 534 simultaneously releases the area used by files to attain parallel processing for a plurality of distributed processing sections 5. If there exist a number of overlapping files, broadcasting of file release is repeated, so that overlapping use of an area between files can be eliminated.

On the other hand, when it is found by the broadcast-used-area-check-request means 442 and the used-area-check means 532 that there is no overlapping use of an area between files, then the broadcast-unused-area-check-request means 443 and the unused-area-check means 533 check in turn whether or not there is any abnormal management on an unused area. If an abnormal state is detected by this unused area check, it means that a data structure controlling unused areas is destroyed. Thus, it is necessary to reconstruct the data structure. In addition, even when overlapping of a used area is detected by the broadcast-used-area-check-request means 442 and the used-area-check means 532, and thus the overlapped used area is released as described above, it is necessary to reconstruct data controlling the unused area. As described above, the broadcast-unused-area-check-request means 443 is activated in one case where an abnormal condition is detected in the unused area check, and in the other case where overlapping use of an area between files is detected, and the overlapped use is released. In either cases, areas for which there is no overlapped use at this point of time and that are not used by any file are collected as unused areas to reconstruct the data structure controlling the unused areas. In reconstructing the unused areas, the broadcast-unused-area-reconstruction-request means 445 running on one location in the computer system is activated, and broadcasts an unused area reconstruction request to all unused-area-reconstruction means 535. The unused-area-reconstruction means 535 runs on each distributed processing section 5, and reconstructs the data structure controlling the unused areas upon receipt of the unused area reconstruction request. This causes the reconstruction process to be independently performed in parallel on each distributed processing section 5, so that the processing time can be reduced when the number of the distributed processing section 5 is increased.

Now, the operation of the embodiment will be described.

When input is performed to the construction-instruction means 100, the input-start-up-instruction means 101, and the input-termination-instruction means 102, all of which are not shown, the operation is same as that in the first or second embodiment. When the administrator of the computer system instructs the input-recovery-instruction means 105 to recover the data structure of the file data storage structure, the broadcast-common-control-data-request means 441 of the general processing section 4 broadcasts a common control data to the notify-common-control-data means 531 of each distributed processing section 5. Each notify-common-control-data means 531 receives the common control data request, and notifies the requesting source of the common control data on the secondary storage devices belonging to the file data storage structure specified by the request. Upon receipt of the notification, the broadcast-common-control-data-request means 441 checks all common control data, and, if all common control data are normal, activates the broadcast-used-area-check-request means 442. If there is any abnormal state, then it notifies the result to the administrator of the computer system, and terminates the process. This is because the common control data cannot be automatically recovered.

When the broadcast-used-area-check-request means 442 is activated, it broadcasts a used area check request to the used-area-check means 532 of each distributed processing section 5. Each used-area-check means 532 receives the used area check request, checks area used by each file for the data storage areas on the secondary storage devices belonging to the file data storage structure specified by the request, and notifies the check result to the requesting source. The broadcast-used-area-check-request means 442 integrates these check results, and activates the broadcast-file-release-request means 444.

The broadcast-file-release-request means 444 examines the check results on the used areas integrated by the broadcast-used-area-check-request means 442. If there is no overlapping on used area, it activates the broadcast-unused-area-check-request means 433 to check the data structure of unused areas. On the other hand, if there is overlapping on the used area, it broadcasts a file release request to all file-release means 534 of each distributed processing section 5 to eliminate overlapping of used area between files. The file-release means 534 receives the file release request, and makes that all data storage areas used by the file specified by the request cannot be used as the data file storage areas of that file. When overlapping of used area between files is thus eliminated, the broadcast-file-release-request means 444 activates the broadcast-unused-area-reconstruction-request means 445.

On the other hand, the broadcast-unused-area-check-request means 443 that is activated from the broadcast-file-release-request means 444 due to no overlapping on the used area by a file broadcasts an unused area check request to the unused-area-check means 533. Each unused-area-check means 533 receives the unused area check request, checks information controlling unused areas for the data storage areas on the secondary storage devices belonging to the file data storage structure specified by the request, and notifies the check result to the requesting source. The broadcast-unused-area-check-request means 443 integrates these check results, and activates the broadcast-unused-area-reconstruction-request means 445.

When the broadcast-unused-area-reconstruction-request means 445 is activated from the broadcast-unused-area-check-request means 443, it determines the check result on unused areas, and performs a process on reconstruction of unused area if there is an abnormal state on the unused area control. In addition, if there is no abnormal state on the unused area control, it means that the data structure is normal for the file data storage structure, and terminates the process. On the other hand, if it is activated from the broadcast-file-release-request means 444, it performs the process on reconstruction of unused area.

In the process on reconstruction of unused area, the broadcast-unused-area-reconstruction-request means 445 broadcasts an unused area reconstruction request to all unused-area-reconstruction means 535 of each distributed processing section 5. Each unused-area-reconstruction means 535 receives the unused area reconstruction request, for the data storage areas on the secondary storage devices belonging to the file data storage structure specified by the request, lists all areas not belonging to the file, and reconstruct the data structure controlling the unused areas.

Now, the operation of each component of this embodiment will be described in detail. In FIG. 31, the notify-common-control-data means 531, the used-area-check means 532, and the unused-area-check means 533 are same as those of FIG. 24, and their description is omitted.

Input-recovery-instruction Means 105

The input-recovery-instruction means 105 is implemented in a form like a command in UNIX. Information specified together with a command includes identification information (name or the like) for the file data storage structure. This command is input from a terminal T in a case of a multiprocessor system of FIG. 1. After the command is input, the information is passed to the general processing section 4.

Broadcast-common-control-data-request Means 441

The broadcast-common-control-data-request means 441 is substantially same as the broadcast-common-control-data-request means 431 of FIG. 24. However, it differs in that it accepts the input-recovery-instruction means 105 as input.

Broadcast-used-area-check-request Means 442

The broadcast-used-area-check-request means 442 is substantially same as the broadcast-used-area-check-request means 432 of FIG. 24. However, difference lies in that, in step 184 of FIG. 27 showing a process example of the broadcast-used-area-check-request means 432, it only integrates the check results of used area, but does not present it to the administrator, and activates the broadcast-file-release-request means 444.

Broadcast-file-release-request Means 444

Figure 32:
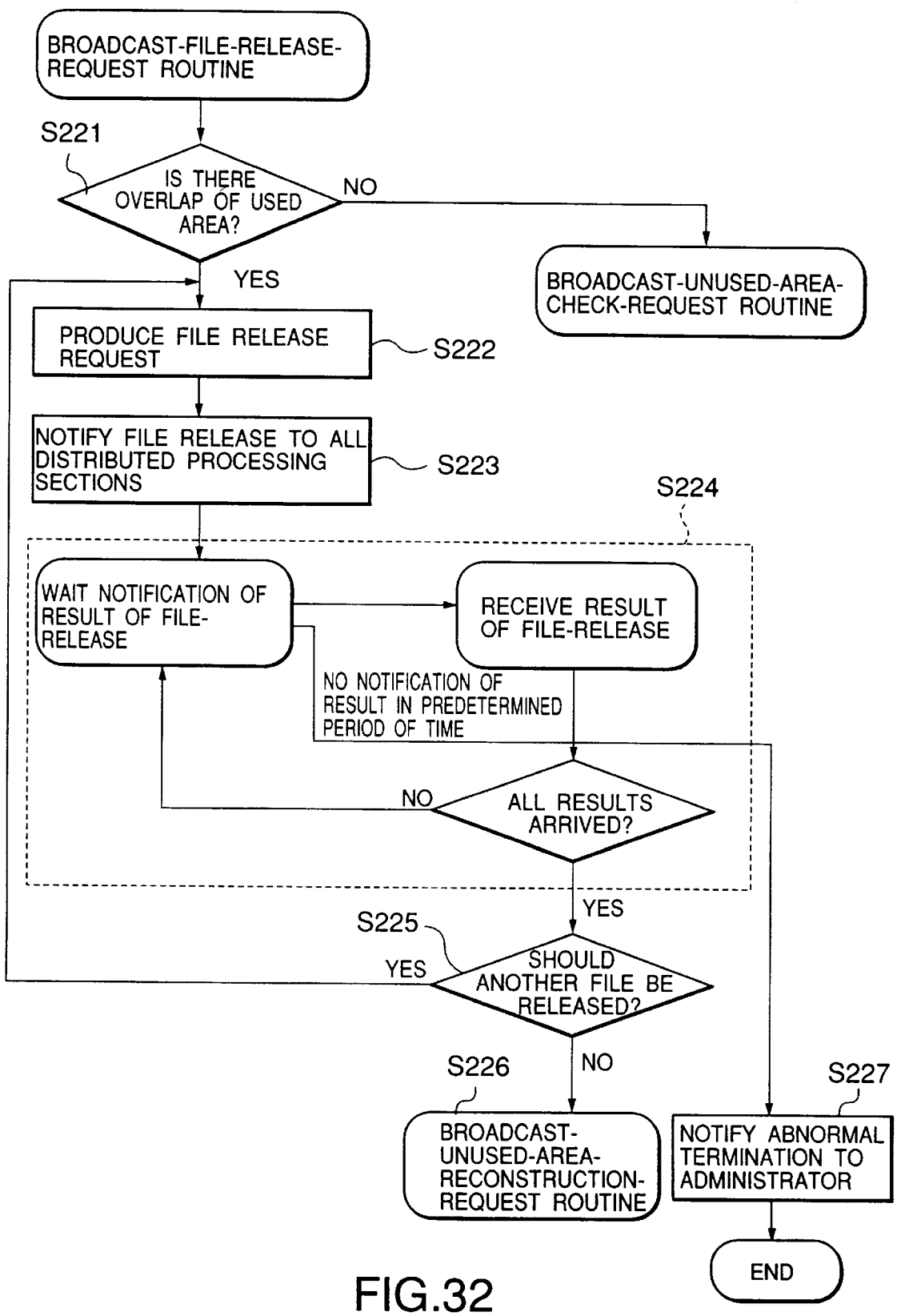
FIG. 32 is a flowchart showing an example of processing in broadcast-file-release-request means 444.

The broadcast-file-release-request means 444 is subsequently activated after all check results of used area are integrated in the broadcast-used-area-check-request means 442. The broadcast-file-release-request means 444 is implemented as a broadcast-file-release-request routine for performing the processes, for example, as shown in FIG. 32. This routine performs the following processes:

Step S221: It determines whether or not there is overlapping of used areas based on the check result of used area, and, if there is not overlapping of used area, activates a broadcast-unused-area-check-request routine (broadcast-unused-area-check-request means 443).

Step S222: If it is discriminated in step S221 that there is overlapping of used area, it determines of which file the used area is released, and produces a file release request specifying the file to be released.

Step S223: It notifies the produced file release request to all distributed processing section 5 running on the secondary storage device control processor.

Step S224: It waits until all results of file release instruction are notified. If all notifications are not received within a predetermined period, the process jumps to step S227 and causes abort.

Step S225: It integrates all results of file release, and determines whether the file release should be further performed on another file. If it is discriminated that the file release should be performed on another file, it returns to step S222.

Step S226: If it is discriminated in step S225 that there is no need to release a file, it activates a broadcast-unused-area-reconstruction-request routine (broadcast-unused-area-reconstruction-request means 435).

Step S227: If an abnormal condition is detected in step S224, it notifies occurrence of abnormal condition to the administrator inputting the recovery instruction, and terminates the process.

File-release Means 534

Figure 33:
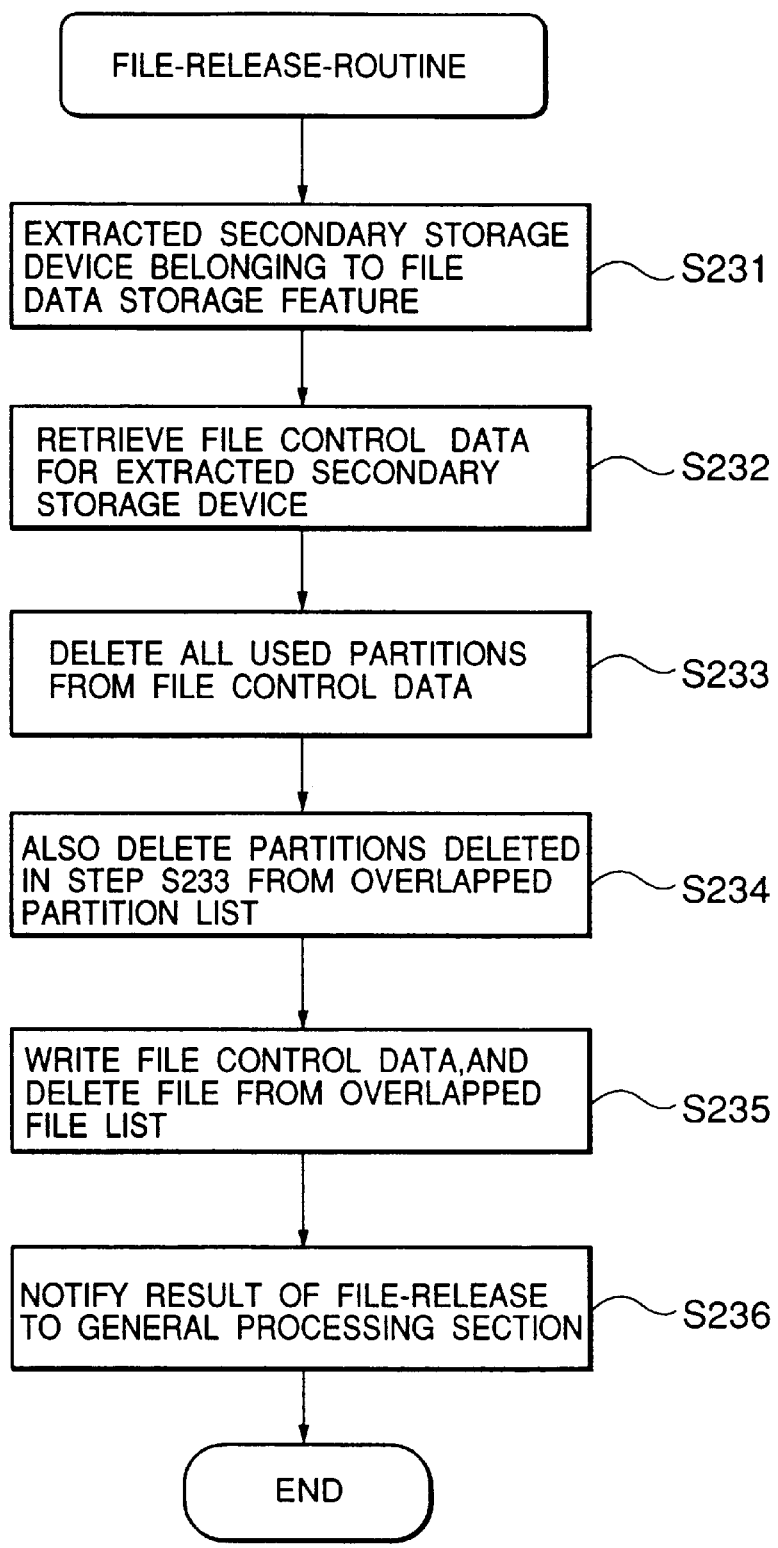
FIG. 33 is a flowchart showing an example of processing in file-release means 534.

The file-release means 534 is implemented as a file release routine for performing the process, for example, as shown in FIG. 33. This routine performs the following processes:

Step S231: It retrieves identification information of the file data storage structure contained in the file release request issued from the broadcast-file-release-request means 444, and compares it with the control data of the secondary storage device, thereby extracting a secondary storage device belonging to the requested file data storage structure.

Step S232: For the secondary storage devices extracted in step S231,: It retrieves partial file control data of the file specified in the file release request.

Step S233: Since the extracted partial file control data contains information on blocks the file uses, it deletes information on these blocks from the partial file control data.

Step S234: It deletes the blocks deleted in step S233 from the overlapped block list as well. At the same time, it updates the overlap control array recorded in the used area check means (used area check routine) 532.

Step S235: It writes the file control data in the secondary storage device, and deletes the file from the overlapped file list.

Step S236: It notifies the overlapped file list to the general processing section 4 as a file release result.

Broadcast-unused-area-check-request Means 443

The broadcast-unused-area-check-request means 443 is substantially same as the broadcast-unused-area-check-request means 433 of FIG. 24. Difference lies in that step S204 of FIG. 29 showing a process example of the broadcast-unused-area-check-request means 433 integrates the check results of unused areas, and activates the broadcast-unused-area-reconstruction-request means 445.

Broadcast-unused-area-reconstruction-request Means 445

Figure 34:
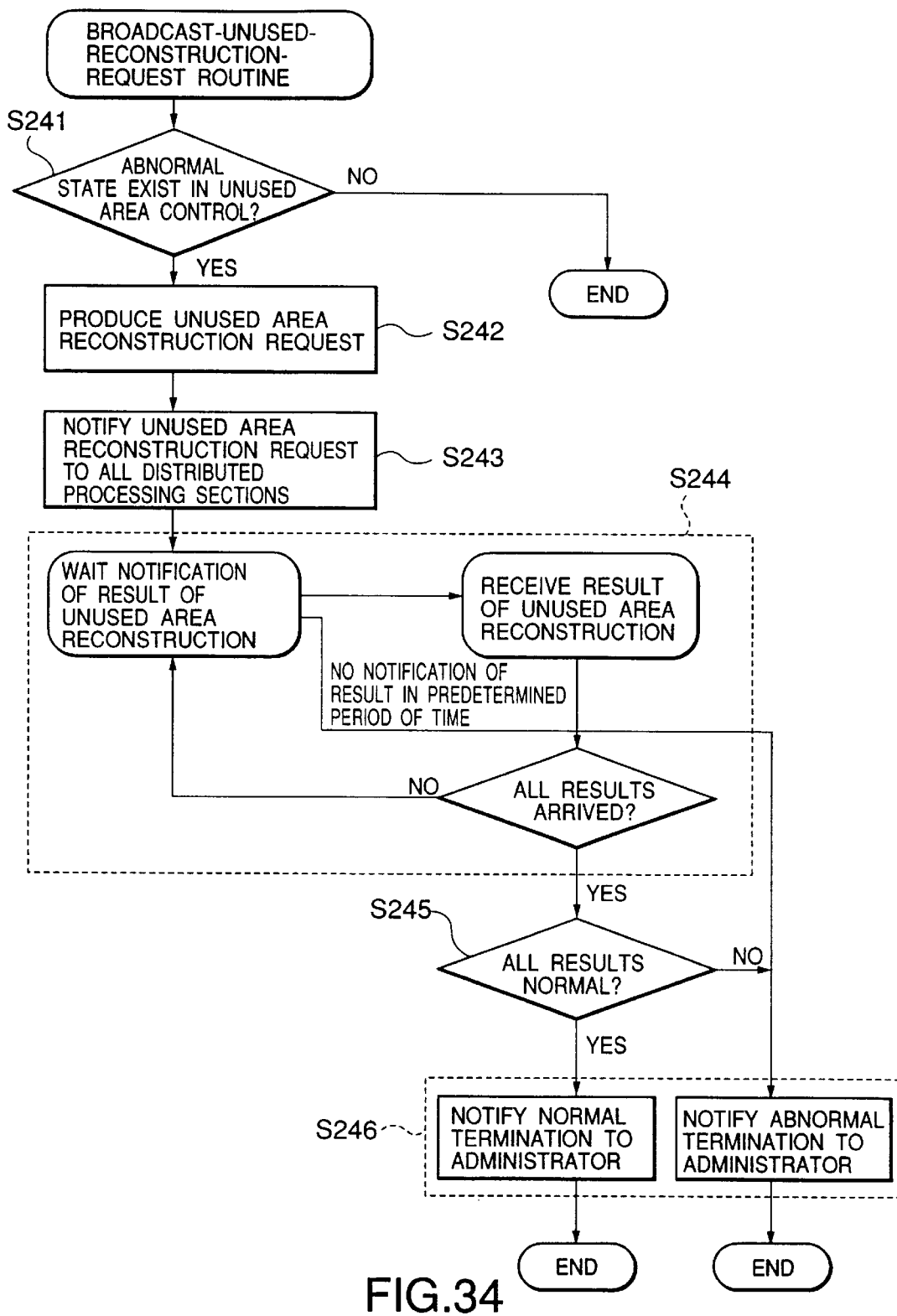
FIG. 34 is a flowchart showing an example of processing in broadcast-unused-area-reconstruction-request means 445.

The broadcast-unused-area-reconstruction-request means 445 is activated in two cases. First, it is a case where it is invoked after all results of unused area check are integrated in the broadcast-unused-area-check-request means 443. The other is a case where it is invoked after overlapping of used area is eliminated by releasing files in the broadcast-file-release-request means 444. The broadcast-unused-area-reconstruction-request means 445 is implemented as a broadcast-unused-area-reconstruction-request routine for performing the process, for example, as shown in FIG. 34. This routine performs the following processes:

Step S241: It determines whether or not there is any abnormal state in the control of unused area based on results of unused area check, and, if there is no abnormal state, terminates the process. If this routine is invoked from the broadcast-file-release-request means 444, this step is skipped.

Step S242: It produces an unused area reconstruction request including identification information of the file data storage structure based on the identification information of the file data storage structure recorded in the general processing section 4.

Step S243: It notifies the produced unused area reconstruction request to all distributed processing sections 5 running on the secondary storage device control processor.

Step S244: It waits until all results of unused area reconstruction request are notified. If all notifications are not received within a predetermined period, the process jumps to step S246 and causes abort.

Step S245: It examines the results of unused area reconstruction request notified in step S244 to check whether or not all unused area reconstruction requests successfully terminate.

Step S246: It notifies the check result of step S245 to the administrator inputting the recovery instruction and terminates the process.

Unused-area-reconstruction Means 535

Figure 35:
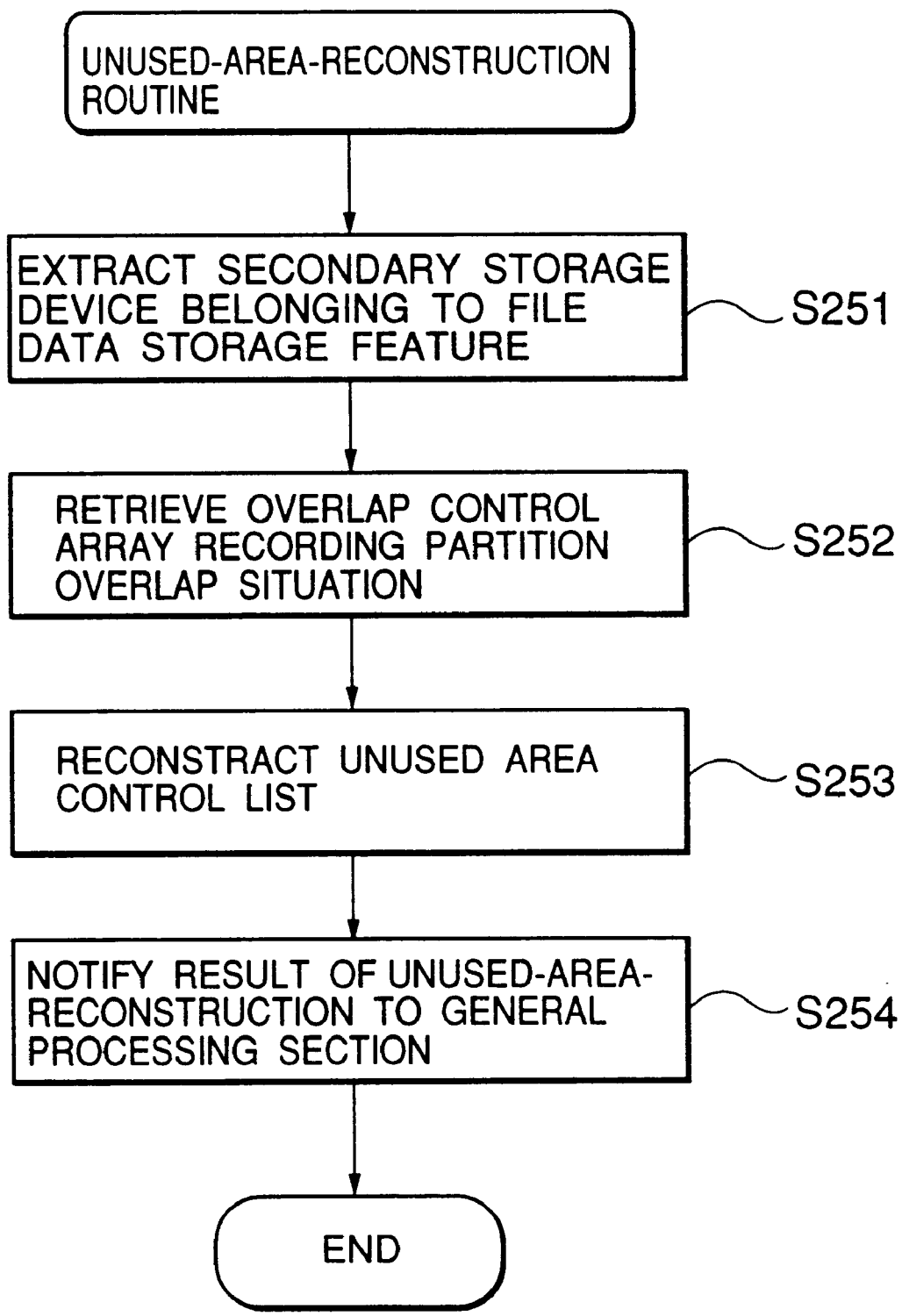
FIG. 35 is a flowchart showing an example of processing in unused-area-reconstruction means 535.

The unused-area-reconstruction means 535 is implemented as a unused-area-reconstruction routine for performing the processes, for example, as shown in FIG. 35. This routine performs the following processes:

Step S251: It retrieves identification information of the file data storage structure contained in the unused area reconstruction request issued from the broadcast-unused-area-reconstruction-request means 435, and compares it with the control data of the secondary storage device, thereby extracting a secondary storage device belonging to the requested file data storage structure.

Step S252: For the secondary storage devices extracted in step S251, it retrieves the overlap control array recorded in a used-area-check routine (used-area-check means 532).

Step S253: It lists blocks not used by any file from the overlap control array retrieved in step S252, and adds them in the unused area control list.

Step S254: It writes the unused area control list in the secondary storage device, and notifies the result of unused area reconstruction to the general processing section 4. This notification is received by step S244 of the broadcast-unused-area-reconstruction-request means 445 in FIG. 34.

Figure 36:
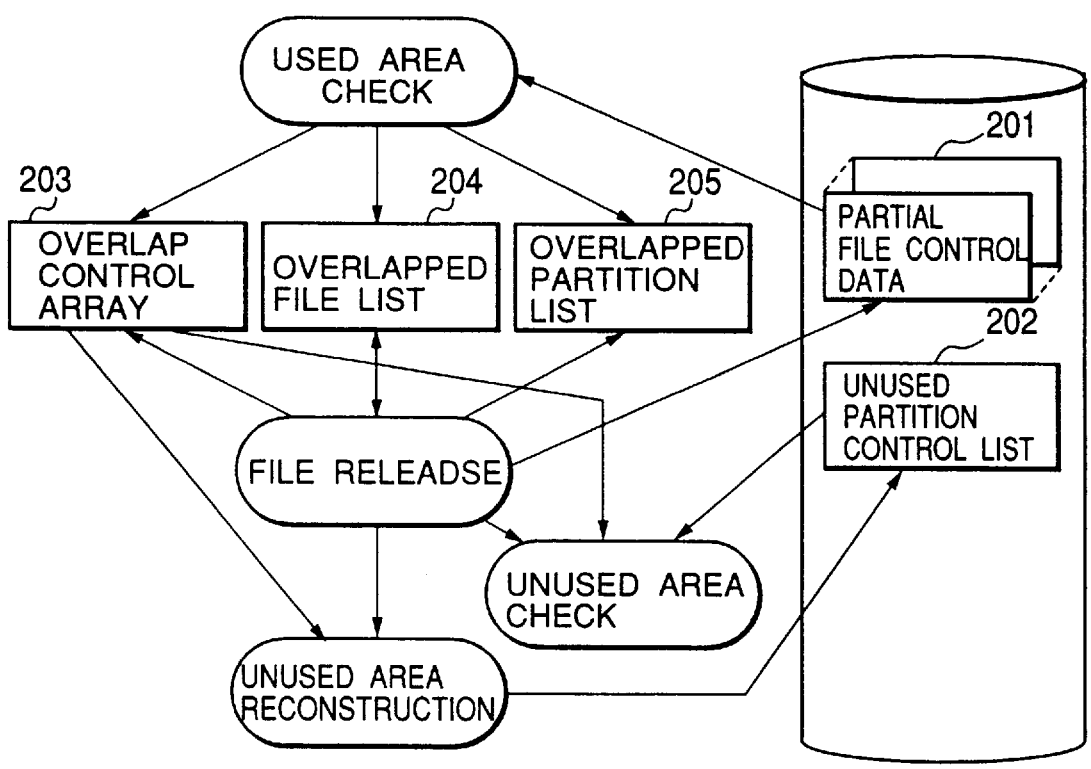
FIG. 36 is a diagram showing the operation of a fifth embodiment of the present invention.
Figure 37:
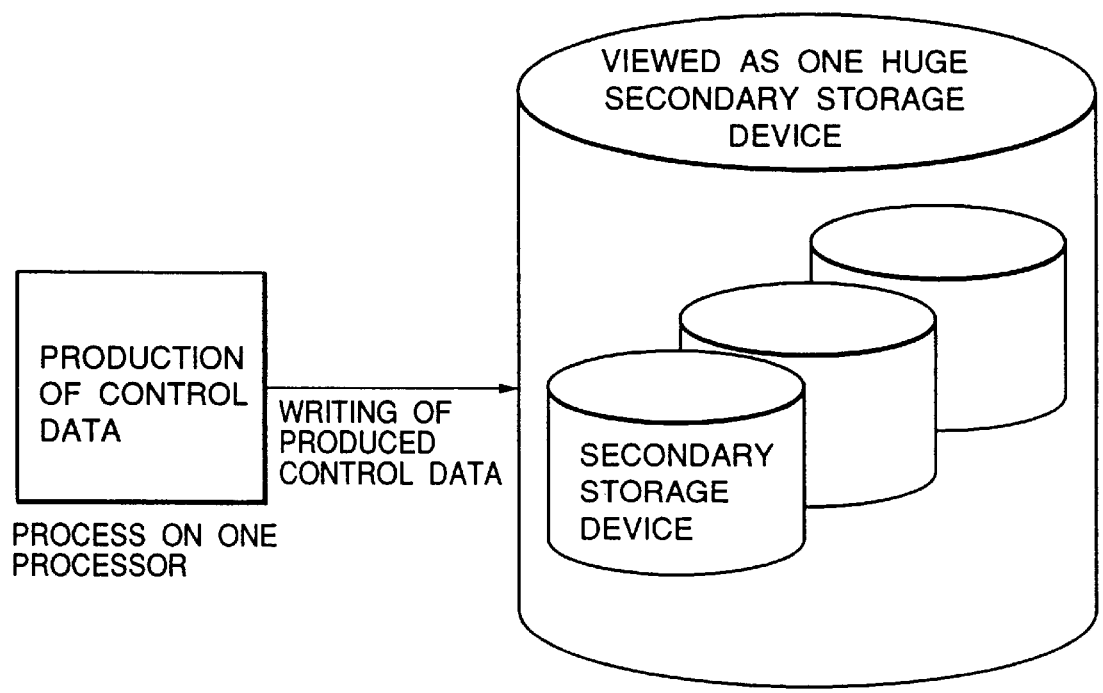
FIG. 37 is a block diagram showing a scheme for constructing a file data storage structure according to a conventional technique.

FIG. 36 is a diagram illustrating operation of the embodiment of FIG. 31. In the figure, there are shown partial file control data 201 for controlling information for each file on blocks of the secondary storage devices used by the file, and an unused block control list 202 for controlling information on blocks of the secondary storage devices not used by any file. They exist as parts of individual control data. On the other hand, there are shown an overlap control array 203 for recording overlapping states for each block of the secondary storage device, an overlapped file list 204 for recording files with overlap in used areas of the secondary storage device, and an overlapped block list 205 for recording overlapped blocks of the secondary storage device. They are data dynamically generated in the recovery process of data structure.

The overlapped block list has areas corresponding to blocks of the secondary storage device in one-to-one relationship, with all areas having a value of 0 in the initial state. The used area check examines each file for the partial file control data 201, and increments by one the value of area corresponding to the overlap control array 203 for the used block. If the value is two or more after addition, it means that the block is used by a plurality of files. Then, the current file name is added to the overlapped file list 204, and the current block is added to the overlapped block list 205.

In the file release process, one file is retrieved from the overlapped file list, and all information of blocks in the partial file control data 201 corresponding to the retrieved file are deleted. The deleted block is deleted from the overlapped block list 205, and the value of area corresponding to the overlap control array 203 is decremented by one.

The unused area check lists blocks not used by any file from the overlap control array 203, and matches it with the unused block control list 202, thereby listing blocks controlled as unused in the unused block control list 202 although they are used by some files, and blocks identified and not controlled as unused in the unused block control list 202 although they are not used by any files.

The unused area reconstruction process lists blocks not used by any file from the overlap control array 203, adds them to the unused block control list 202, writes them in the secondary storage device to update the unused block control list 202.

Also in this embodiment, it may be arranged similar to the fourth embodiment such that the common control data is checked by the broadcast-common-control-data-request means and the notify-common-control-data means, and subsequent processes are performed only if there is no abnormal condition in the common control data.

As described above, the present invention can provide the following advantages.

The present invention provides a secondary storage device control processor in correspondence to each of secondary storage devices, and causes each secondary storage device control processor to perform the data structure construction process of the file data storage structure. Thus, the processing time can be reduced for the data structure construction process for the file data storage structure with a large capacity consisting of a plurality of secondary storage devices with parallel processing.

In addition, the present invention provides the change-to-available-state means in correspondence to each of secondary storage device control processors, which receives a start-up request and changes the state of secondary storage devices belonging to the file data storage means specified by a request to the available state, and broadcast-start-up-request means that broadcasts a start-up request to all change-to-available-state means. Thus, it is possible to transfer the state of file data storage structure with a large capacity consisting of a plurality of secondary storage devices to the available state all at once, thereby starting operation.

Furthermore, the present invention provides change-to-unavailable-state means in correspondence to each of secondary storage device control processors, which receives a termination request, and changes the state of secondary storage devices belonging to the file data storage structure specified by the request to the unavailable state, and broadcast-termination-request means that broadcasts a termination request to all change-to-unavailable-state means. Thus, it is possible to transfer the state of file data storage structure with a large capacity consisting of a plurality of secondary storage devices to the unavailable state all at once, thereby terminating operation.

Furthermore, the present invention provides each of secondary storage device control processors with change-to-standby-state means that receives a standby request, and changes the state of secondary storage device to an intermediate state called standby state, change-to-available-state means that receives a start-up request and changes the state of secondary storage device from the standby state to the available state, and change-to-unavailable-state means that receives an unavailability request and returns the state of secondary storage devices from the standby state to the unavailable state. It also provides broadcast-standby-request means that broadcasts a standby request to all change-to-standby-state means, broadcast-availability-request means that confirms that change to the standby state succeeds in all change-to-standby-state means, and broadcasts a start-up request to all change-to-available-state means, and broadcast-unavailability-request means that confirms that change to the standby state fails in part of the change-to-standby-state means, and broadcasts an unavailability request to all change-to-unavailable-state means. Thus, it is possible to change the state of file data storage structure with a large capacity consisting of a plurality of secondary storage devices to the available state all at once, thereby starting operation. In this case, in case where an error occurs in part of the file data storage structure, it is possible to return the file data storage structure to the unavailable state all at once.

Furthermore, the present invention provides each of secondary storage device control processors with change-to-standby-state means that receives a standby request, and changes the state of secondary storage device to an intermediate state called standby state, change-to-unavailable-state means that receives a termination request and changes the state of secondary storage device from the standby state to the unavailable state, and change-to-available-state means that receives an availability request and returns the state of secondary storage devices from the standby state to the available state. It also provides broadcast-standby-request means that broadcasts a standby request to all change-to-standby-state means, broadcast-unavailability-request means that confirms that change to the standby state succeeds in all change-to-standby-state means, and broadcasts a termination request to all change-to-unavailable-state means, and broadcast-availability-request means that confirms that change to the standby state fails in part of the change-to-standby-state means, and broadcasts an availability request to all change-to-available-state means. Thus, it is possible to change the state of file data storage structure with a large capacity consisting of a plurality of secondary storage devices to the unavailable state, thereby terminating operation. In this case, in case where an error occurs in part of the file data storage structure, it is possible to return the file data storage structure to the available state all at once.

Furthermore, the present invention provides notify-partial-information means that runs on each secondary storage control processor, receives a partial information request, and notifies usage of the secondary storage device to the requesting source, broadcast-partial-information-request means that broadcasts the partial information request to all notify-partial-information means, general-display-ofinformation means that integrates all partial information notified by the notify-partial-information means, and performs display in a display format instructed by input-state-display-instruction means. Thus, it is possible to display the state of file data storage structure with a large capacity consisting of a plurality of secondary storage devices in a format instructed by the user.

Furthermore, the present invention provides each of secondary storage devices with notify-common-control-data means that receives a common control data request and notifies the common control data on the secondary storage devices to the requesting source, used-area-check means that receives a used area check request, checks used areas of each file for the data storage areas on the secondary storage devices, and notifies the check result to the requesting source, and unused-area-check means that receives an unused area check request, checks information controlling unused areas for the data storage areas on the secondary storage devices, and notifies the check result to the requesting source. Thus, the processing time can be reduced for the data structure check process for the file data storage structure with a large capacity consisting of a plurality of secondary storage devices with parallel processing.

Furthermore, the present invention provides each of secondary storage device control processors with used-area-check means that receives a used area check request, checks used areas of each file for the data storage areas on the secondary storage devices, and notifies the check result to the requesting source, unused-area-check means that receives an unused area check request, checks information controlling unused areas for the data storage areas on the secondary storage devices, and notifies the check result to the requesting source, file-release means that receives a file release request, and makes all data storage areas used by the file specified by the request unavailable as the data storage area for that file, and unused-area-reconstruction means that receives an unused area reconstruction request, lists all areas not belonging to the file for the data storage area on the secondary storage devices belonging to the file data storage structure specified by the request, and reconstructs a data structure controlling the unused areas. Thus, the processing time can be reduced for the data structure recovery process for the file data storage structure with a large capacity consisting of a plurality of secondary storage devices with parallel processing.

In above embodiments, broadcast-partial-data-structure-construct-request means 401, broadcast-start-up -request means 403, broadcast-termination-request means 405, broadcast-standby-request means 412, broadcast-availability-request means 413, broadcast-unavailability-request means 414, broadcast-standby-request means 416, broadcast-unavailability-request means 417, broadcast-availability-request means 418, broadcast-partial-information-request means 422, broadcast-common-control-data-request means 431, broadcast-used-area-check-request means 432, broadcast-unused-area-check-request means 433, broadcast- file -release-request means 444 and broadcast-unused-area-reconstruction-request means 445 are all broadcast requests to all distributed processing section 5, however, it may be possible that they broadcast requests to corresponding distributed processing section 5 in response to the configuration of secondary storage devices of the desired file data storage structure.

While this invention has been described in conjunction with the preferred embodiments thereof, it will now readily be possible for those skilled in the art to put this invention into practice in various other manners.

What is claimed is:

1. A parallel management system for a file data storage structure, comprising:

a plurality of secondary storage devices recording respective distributed data;

a plurality of control units each of which is connected to at least one corresponding one of said secondary storage devices, for generating control data by structuring said distributed data stored in said at least one corresponding secondary storage device, and for storing said control data into said at least one corresponding secondary storage device;

input means for instructing start-up of a desired file data storage structure;

discrimination means for discriminating whether said desired file data storage structure instructed start-up by said input means is in an available state or an unavailable state;

first broadcast means for broadcasting standby request to at least one corresponding control unit in response to the configuration of said secondary storage device of said desired file data storage structure when the state of said desired file data storage structure instructed start-up by said input means is discriminated to be the unavailable state by said discrimination means;

first change means provided in each of said plurality of control units, for receiving said standby request from said first broadcast means, and for changing the state of said secondary storage device belonging to said desired file data storage structure specified by said standby request to an intermediate state between the available state and the unavailable state;

second broadcasting means for broadcasting at least one start-up request to said corresponding control unit when confirming that change to said intermediate state succeeds on all of said first change means;

second change means provided in each of said plurality of control units, for receiving said start-up request from said second broadcast means, and for changing the state of said secondary storage device belonging to said desired file data storage structure specified by said start-up request from said intermediate state to the available state;

third broadcasting means for broadcasting at least one unavailability request to said plurality of control units when confirming that change to said intermediate state fails on at least one of said second change means; and third change means provided in each of said plurality of control units, for receiving said unavailability request from said third broadcast means, and for changing the state of said secondary storage device belonging to said desired file data storage structure specified by said unavailability request from said intermediate state to the unavailable state.

2. A parallel management system for a file data storage structure, comprising:

a plurality of secondary storage devices recording respective distributed data;

a plurality of control units each of which is connected to at least one corresponding one of said secondary storage devices, for generating control data by structuring said distributed data stored in said at least one corresponding secondary storage device, and for storing said control data into said at least one corresponding secondary storage device;

input means for instructing termination of a desired file data storage structure;

discrimination means for discriminating whether said desired file data storage structure instructed termination by said input means is in an available state or an unavailable state;

first broadcast means for broadcasting standby request to at least one corresponding control unit in response to the configuration of said secondary storage device of said desired file data storage structure when the state of said desired file data storage structure instructed termination by said input means is discriminated to be the unavailable state by said discrimination means;

first change means provided in each of said plurality of control units, for receiving said standby request, and for changing the state of said desired file data storage structure specified by said standby request to an intermediate state between the available state and the unavailable state;

second broadcasting means for broadcasting termination requests to said corresponding control unit when confirming that change to said standby state succeeds on all of said first change means;

second change means provided in each of said plurality of control units, for receiving said termination request, and for changing the state of said desired file data storage structure specified by said termination request from said intermediate state to the available state;

third broadcasting means for broadcasting availability request to said corresponding control unit when confirming that change to said standby state fails on at least one of said second change means; and third change means provided in each of said plurality of control units, for receiving said availability request, and for changing the state of said desired file data storage structure specified by said availability request from said intermediate state to the available state.

3. A parallel management system for a file data storage structure, comprising:

a plurality of secondary storage devices recording respective distributed data;

a plurality of control units each of which is connected to at least one corresponding one of said secondary storage devices, for generating control data by structuring said distributed data stored in said at least one corresponding secondary storage device, and for storing said control data into said at least one corresponding secondary storage device;

input means for instructing display of the state of a desired data storage structure and a display format;

discrimination means for discriminating whether said desired file data storage structure instructed by said input means is in an available state or an unavailable state;

broadcast means for broadcasting partial information request to get partial information stored in each one of corresponding secondary storage device of said desired file data storage structure when the state of said desired file data storage structure instructed by said input means is discriminated to be the available state by said discrimination means;

notify means provided in each of said plurality of control units, for receiving said partial information request from said broadcast means, for getting said partial information stored in at least one secondary storage device belonging to said desired file data storage structure, and for notifying said partial information; and display means for integrating all partial information notified by said notify means, and for displaying them in accordance with said display format instructed by said input means.

4. A parallel management system for a file data storage structure, comprising:

a plurality of secondary storage devices recording respective distributed data;

a plurality of control units each of which is connected to at least one corresponding one of said secondary storage devices, for generating control data by structuring said distributed data stored in said at least one corresponding secondary storage device, and for storing said control data into said at least one corresponding secondary storage device;

input means for instructing a check of a desired data structure of the file data storage structure;

notify means provided in each of said plurality of control units, for receiving first request for requesting common control data in the secondary storage devices belonging to said desired file data storage structure, and for notifying said common control data;

first broadcast means for broadcasting said first request in accordance with an instruction from said input means to said notify means, and for checking all common control data notified from said notify means;

first check means provided in each of said plurality of control units, for receiving second request for checking a used area in the secondary storage devices belonging to said desired file data storage structure, for checking said used areas, and for notifying check result;

second broadcast means for broadcasting said second request to said first check means in accordance with said instruction, and for integrating all check result notified by said first check means;

second check means provided in each of said plurality of control units, for receiving third request for checking an unused area in the secondary storage devices belonging to said desired file data storage structure, for checking said unused area, and for notifying check result; and third broadcast means for broadcasting said third result to said second check means in accordance with said instruction from said input means, and for integrating all check result notified by said second check means.

5. A parallel management system for a file data storage structure, comprising:

a plurality of secondary storage devices recording respective distributed data;

a plurality of control units each of which is connected to at least one corresponding one of said secondary storage devices, for generating control data by structuring said distributed data stored in said at least one corresponding secondary storage device, and for storing said control data into said at least one corresponding secondary storage device;

input means for instructing recovery of a desired file data storage structure;

first check means provided in each of said plurality of control units, for receiving first request for checking a used area in the secondary storage devices belonging to said desired file data storage structure, for checking said used area, and for notifying check result;

first broadcast means for broadcasting said first request to said first check means in accordance with an instruction from said input means, and for integrating all check result notified by said first check means;

second check means provided in each of said plurality of control units, for receiving second request for checking an unused area in the secondary storage devices belonging to said file data storage structure, for checking said unused area, and for notifying check result; and second broadcast means for broadcasting said second result to said second check means in accordance with said instruction, and for integrating all check result notified from said second check means;

release means provided in each of said plurality of control units, for receiving third request for releasing a file of said desired file data storage structure, and for making all data storage areas used by a file specified by said third request unavailable;

third broadcast means for broadcasting said third request to said release means to eliminate overlap of used area between files when the overlap of used area between files is detected in said first broadcast means;

reconstruction means provided in each of said plurality of control units, for receiving fourth request for reconstructing an unused area, for listing all areas not belonging to the file for the data storage area on the secondary storage devices belonging to said file data storage structure specified by said fourth request, and for reconstructing a data structure controlling the unused areas; and fourth broadcasting means for broadcasting said fourth request to said reconstruction means in response to integrated result by said second broadcast means and said third broadcast means.

6. A parallel management system for a file data storage structure, comprising:

a plurality of secondary storage devices recording respective distributed data;

a plurality of control units each of which is connected to at least one corresponding one of said secondary storage devices, for generating control data by structuring said distributed data stored in said at least one corresponding secondary storage device, and for storing said control data into said at least one corresponding secondary storage device, wherein said control data comprises:
common control data that identifies an entire file; and
individual control data that is specific for each of said plurality of secondary storage devices, wherein said common control data includes a name for the data file storage structure, and wherein the individual control data includes partial file control data for each file that manages information on blocks used by said each file, and an unused block management list for managing information of blocks not used by any file in each corresponding one of the secondary storage devices.

* * * * *